(12) United States Patent
Takemoto et al.

(10) Patent No.: US 8,570,660 B2
(45) Date of Patent: Oct. 29, 2013

(54) WIDE-ANGLE CONVERTER LENS

(75) Inventors: Shoichi Takemoto, Utsunomiya (JP); Masao Hori, Utsunomiya (JP); Kazuya Shimomura, Utsunomiya (JP); Yotaro Sanjo, Utsunomiya (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 13/567,860

(22) Filed: Aug. 6, 2012

(65) Prior Publication Data
US 2013/0038945 A1 Feb. 14, 2013

(30) Foreign Application Priority Data

Aug. 8, 2011 (JP) ................... 2011-172970
Aug. 8, 2011 (JP) ................... 2011-172971
Aug. 8, 2011 (JP) ................... 2011-172972

(51) Int. Cl.
*G02B 15/06* (2006.01)
*G02B 15/02* (2006.01)

(52) U.S. Cl.
USPC .......................... 359/673; 359/672

(58) Field of Classification Search
USPC ................... 359/672, 673, 674, 675
See application file for complete search history.

(56) References Cited

U.S. PATENT DOCUMENTS

| 6,097,547 A * | 8/2000 | Ogata et al. ............ 359/673 |
| 7,463,424 B2 | 12/2008 | Shinohara | |
| 2008/0019014 A1 * | 1/2008 | Kitahara ............. 359/663 |

FOREIGN PATENT DOCUMENTS

| JP | 3127007 A | 5/1991 |
| JP | 7013074 A | 1/1995 |
| JP | 2006119346 A | 5/2006 |
| JP | 2008026779 A | 2/2008 |

* cited by examiner

*Primary Examiner* — Scott J Sugarman
(74) *Attorney, Agent, or Firm* — Canon U.S.A., Inc. IP Division

(57) ABSTRACT

A wide-angle converter lens capable of being detachably mounted on an enlargement side of an imaging lens includes a first optical element, at least one optical element having negative refractive power, and at least one optical element having positive refractive power, wherein, when an average value of relative partial dispersions of the first optical element and all optical elements of which the sign of refractive power is the same as that of the first optical element is denoted by θgF_ave, a relative partial dispersion of the first optical element is denoted by θgF, and an Abbe number of the first optical element is denoted by vd, these numerical values satisfy appropriate relationships.

18 Claims, 69 Drawing Sheets

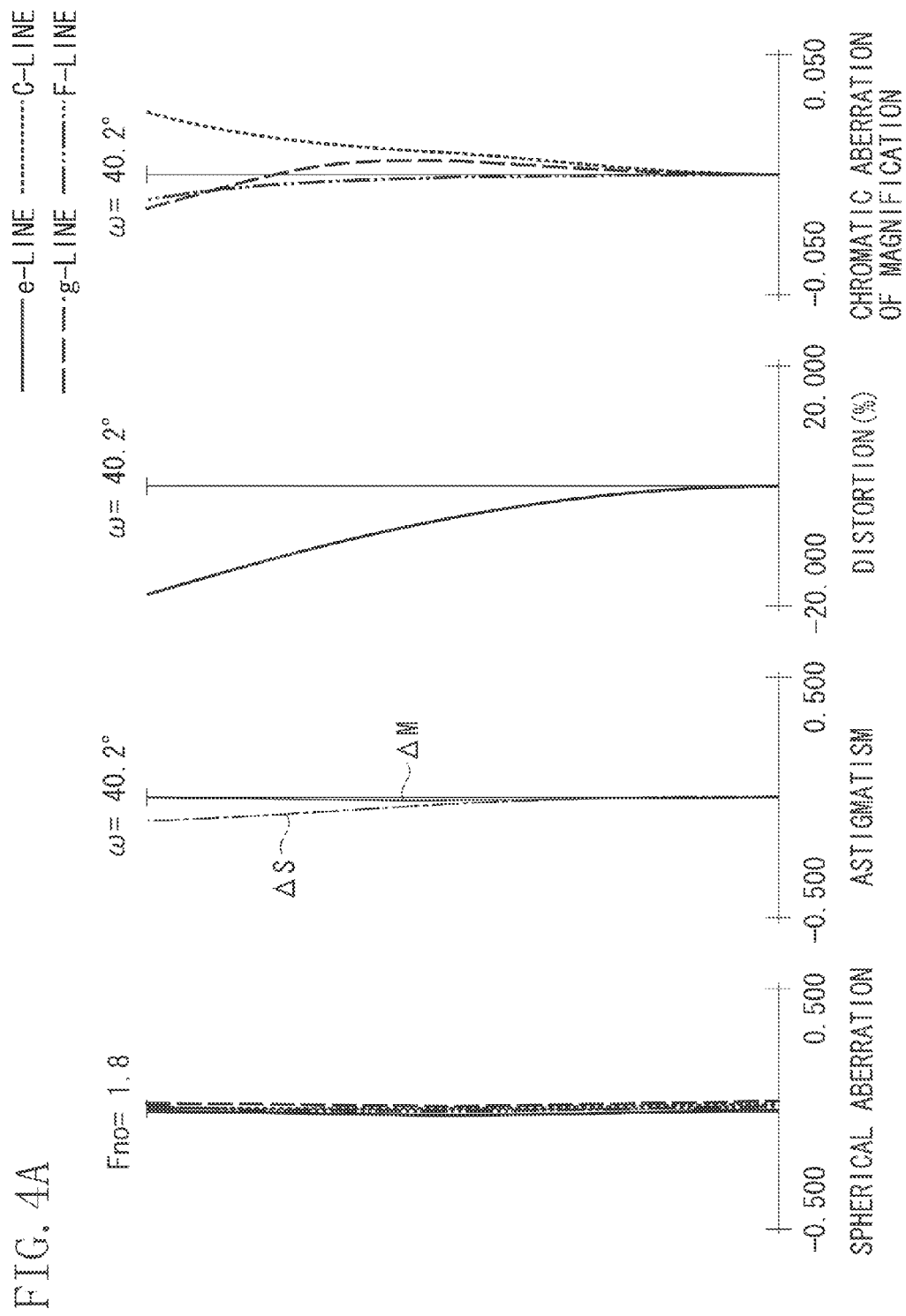

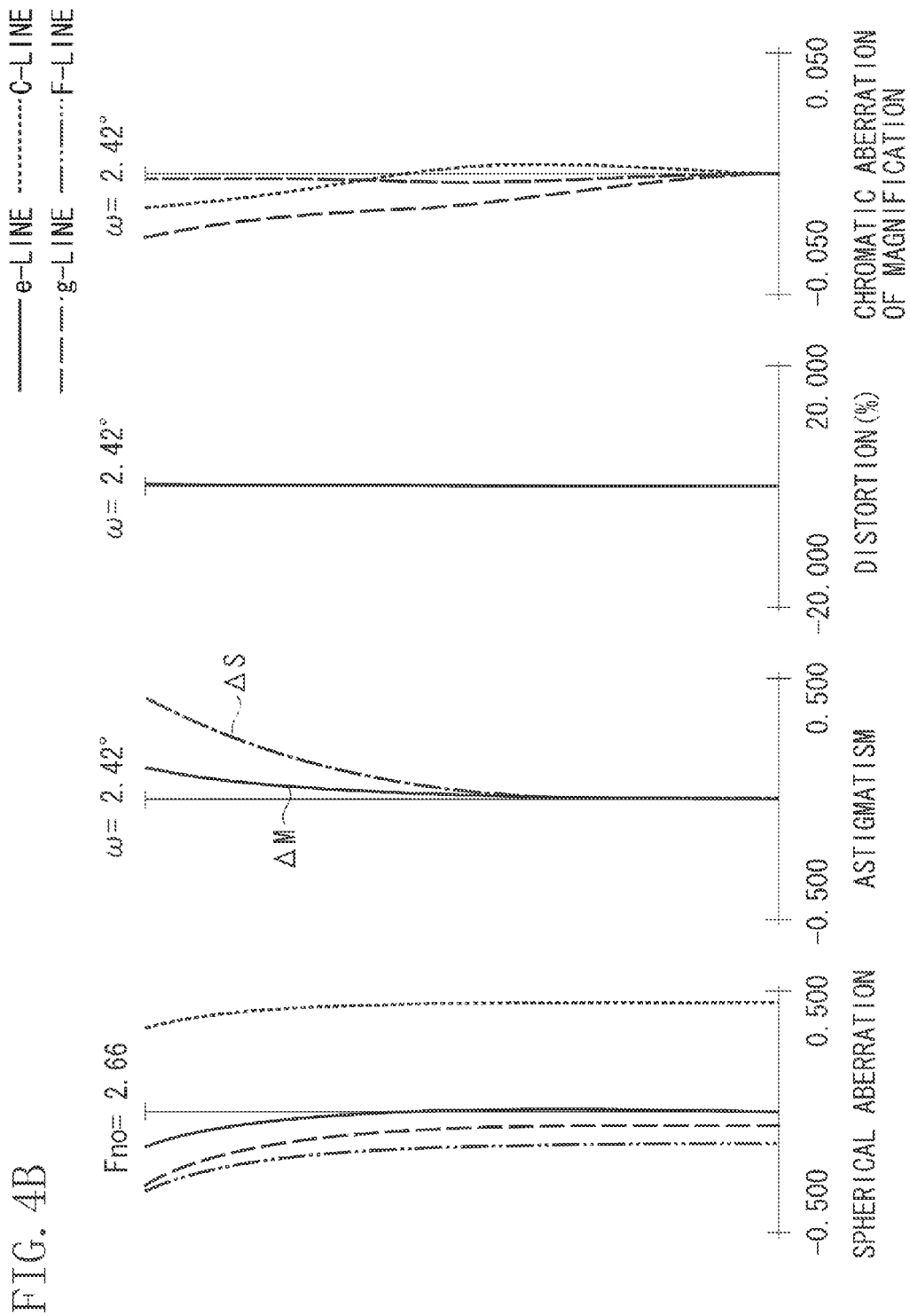

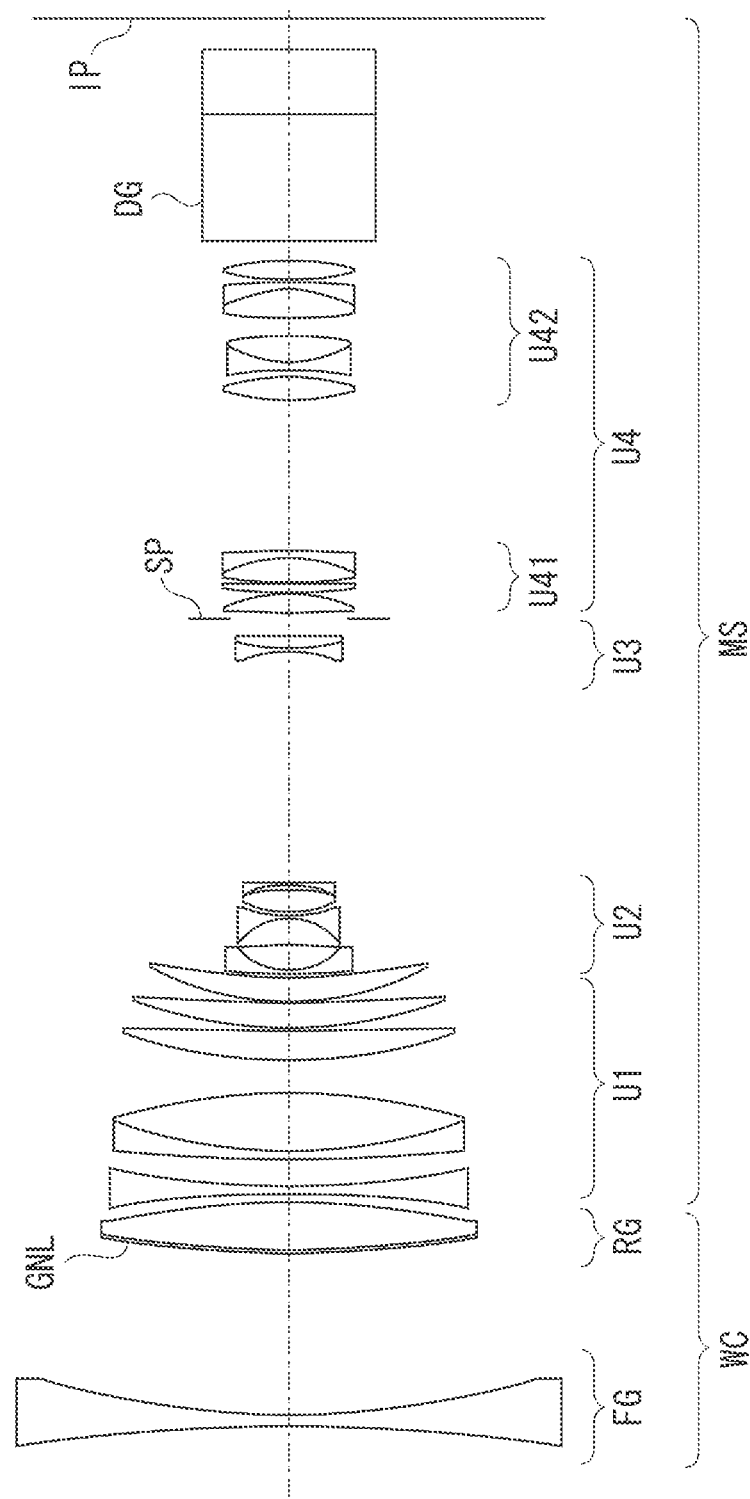

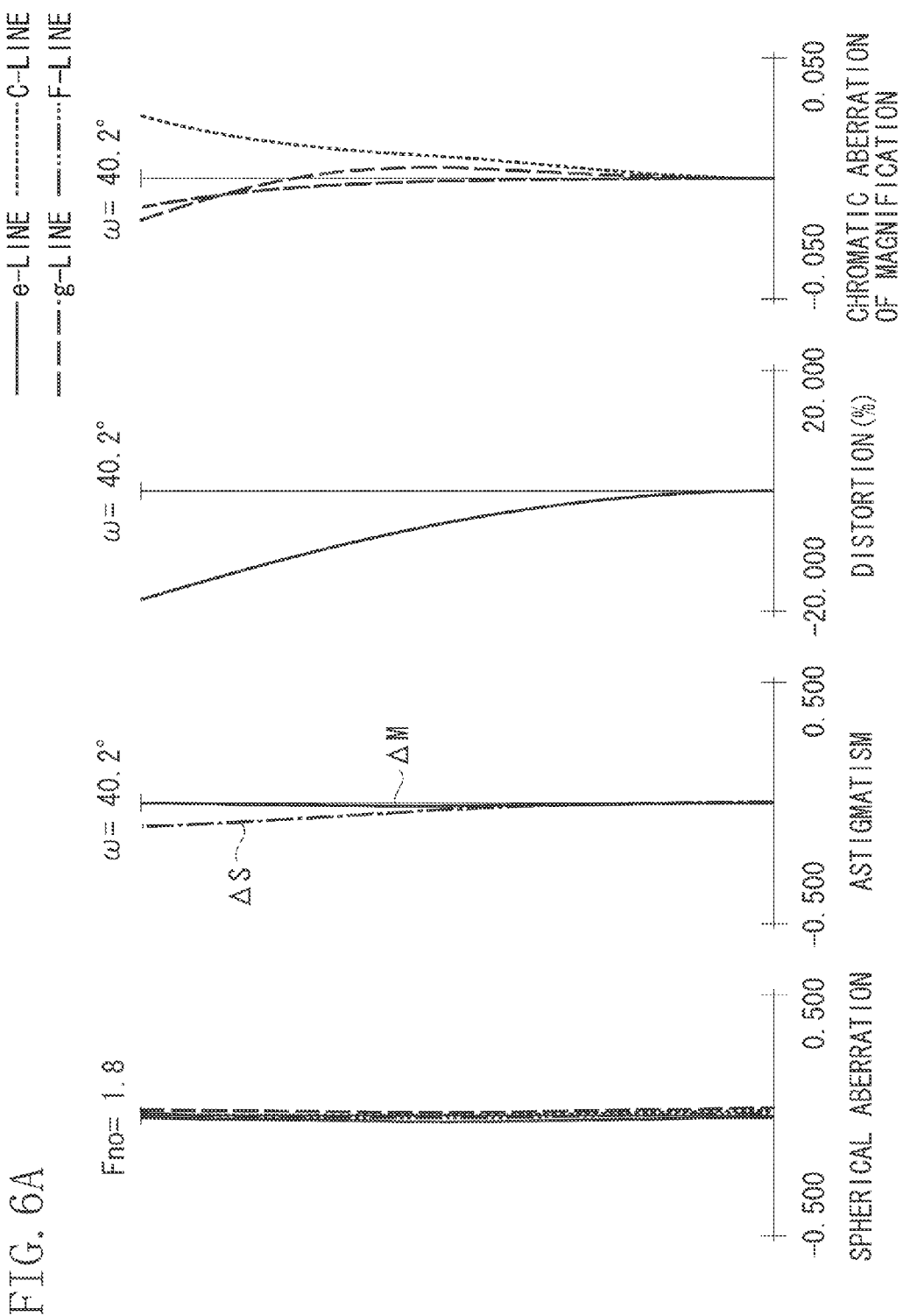

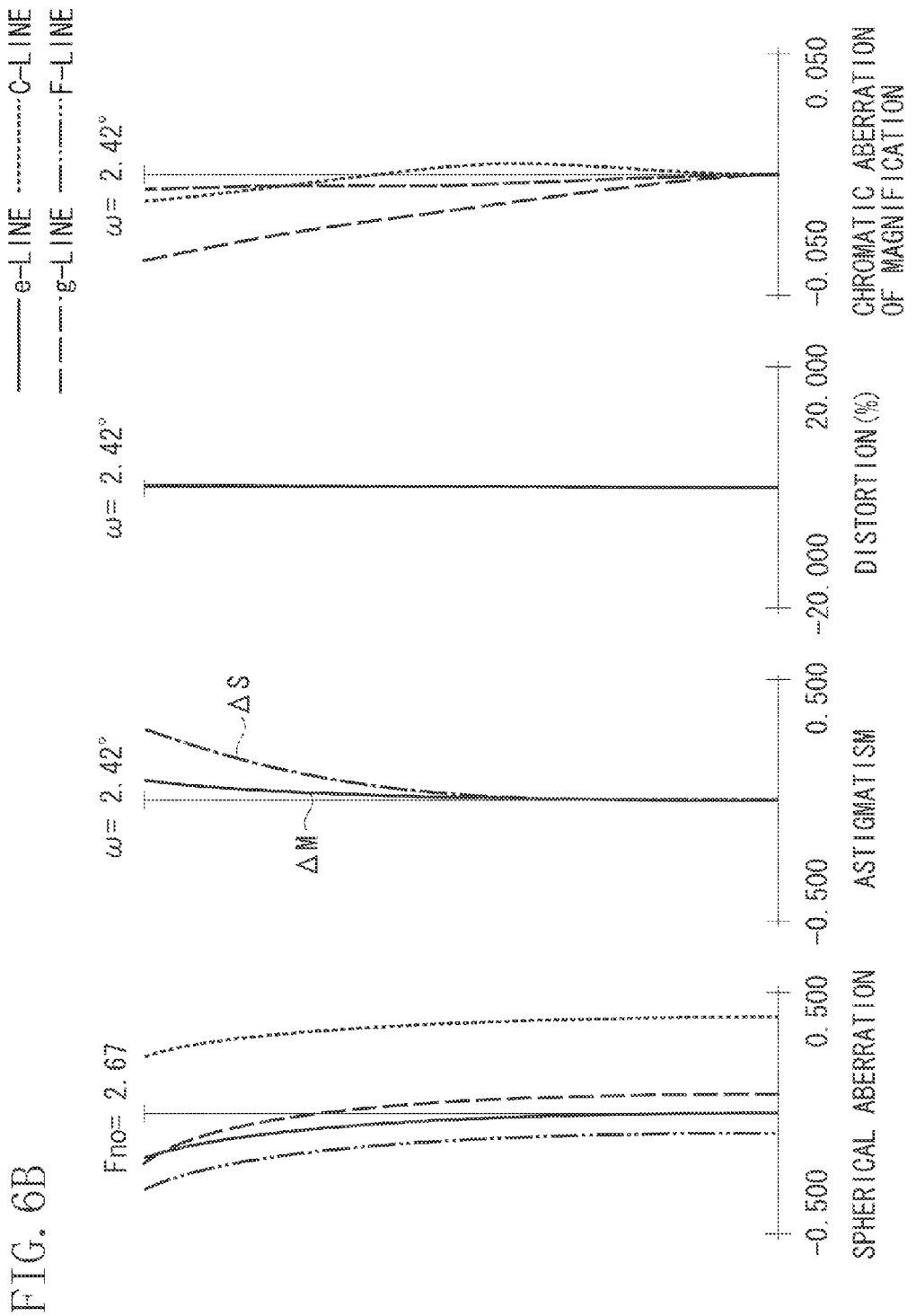

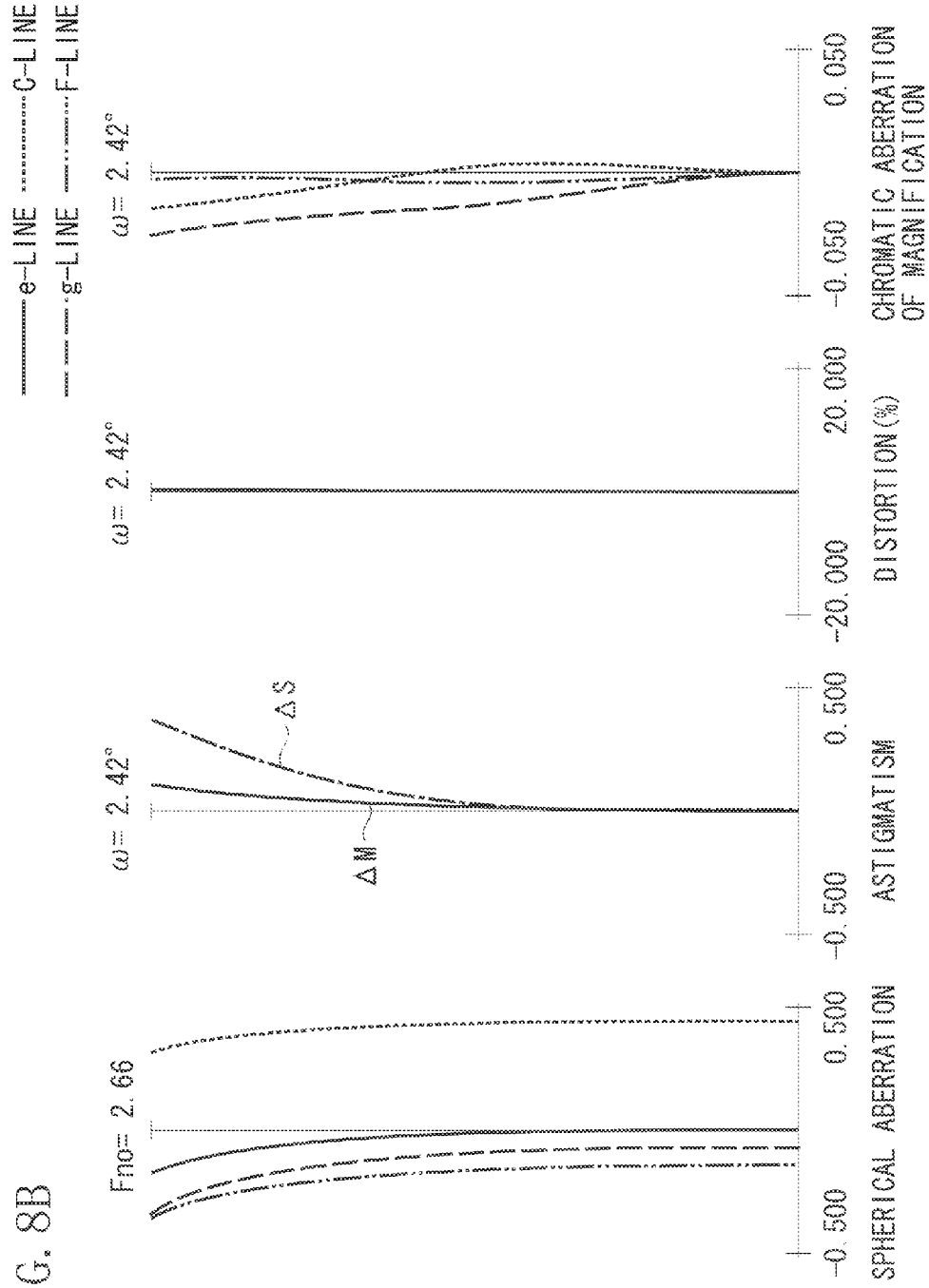

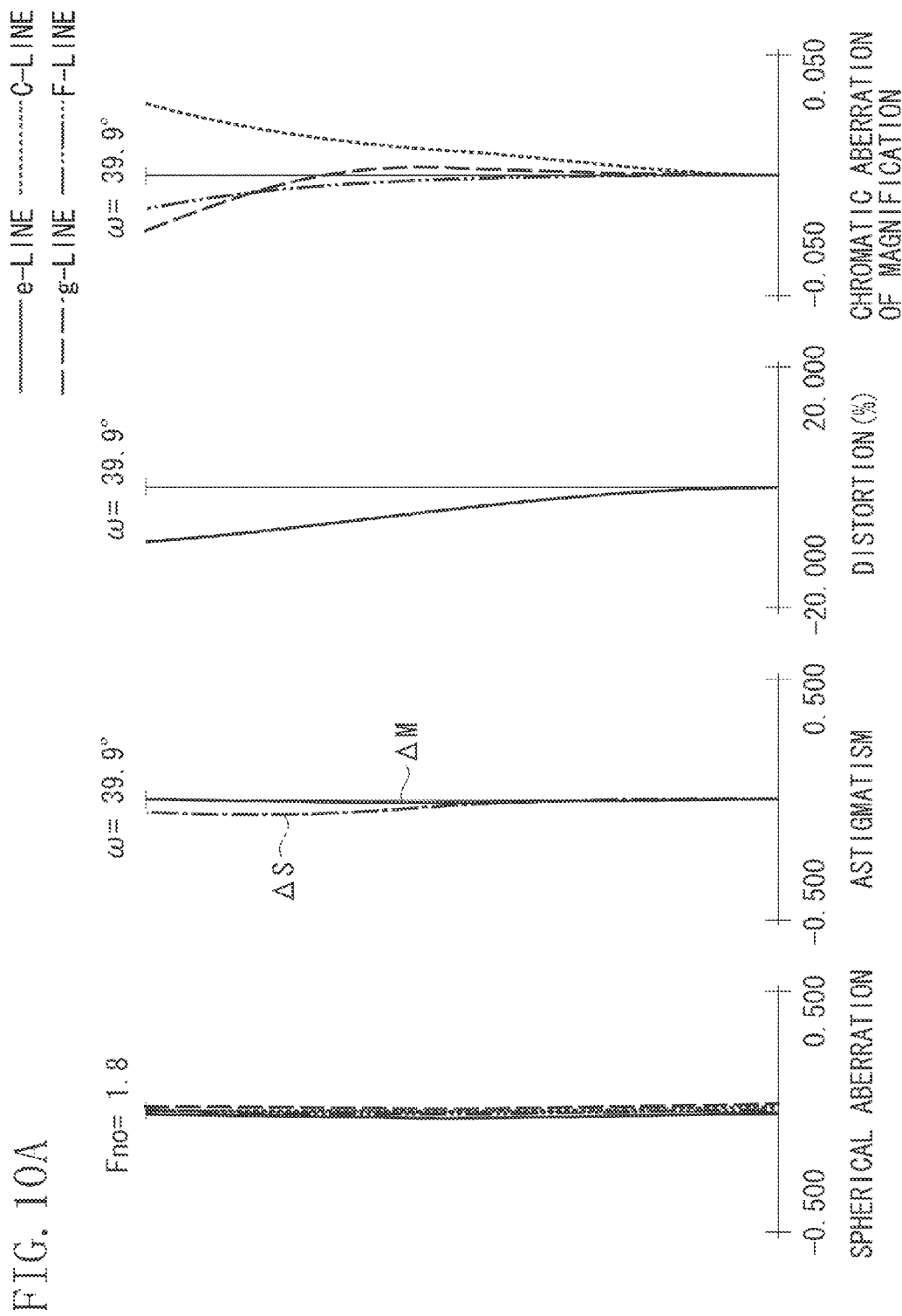

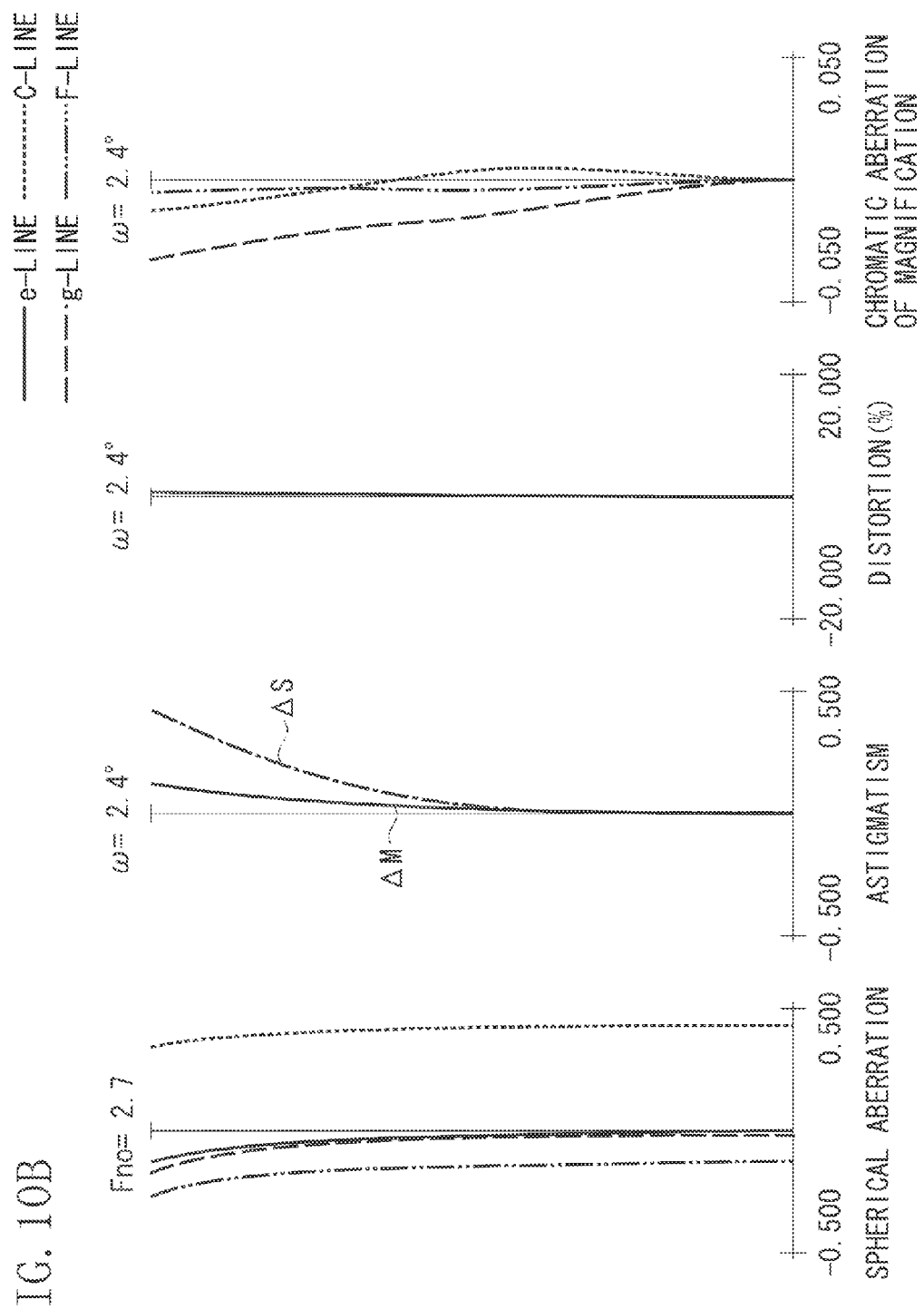

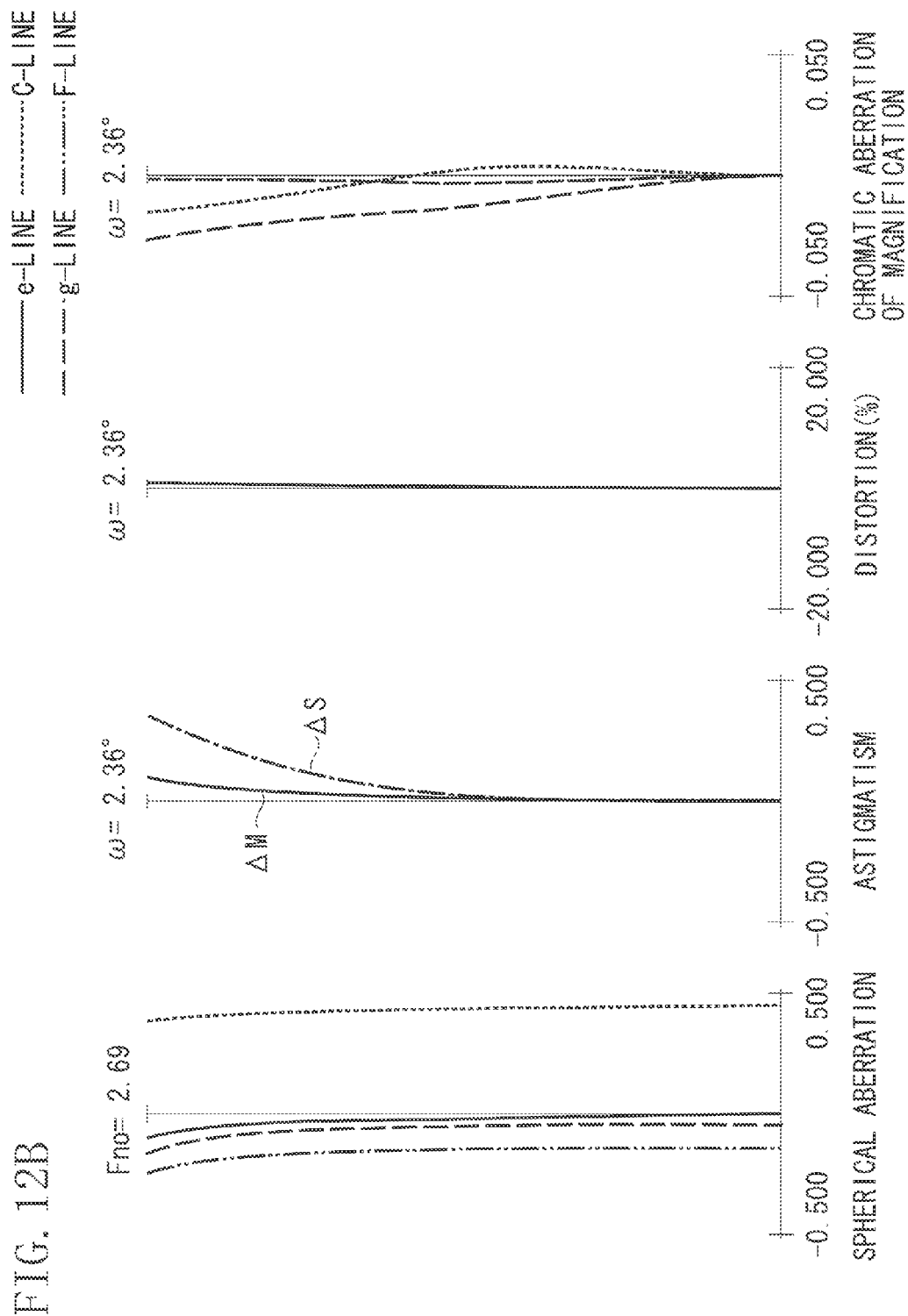

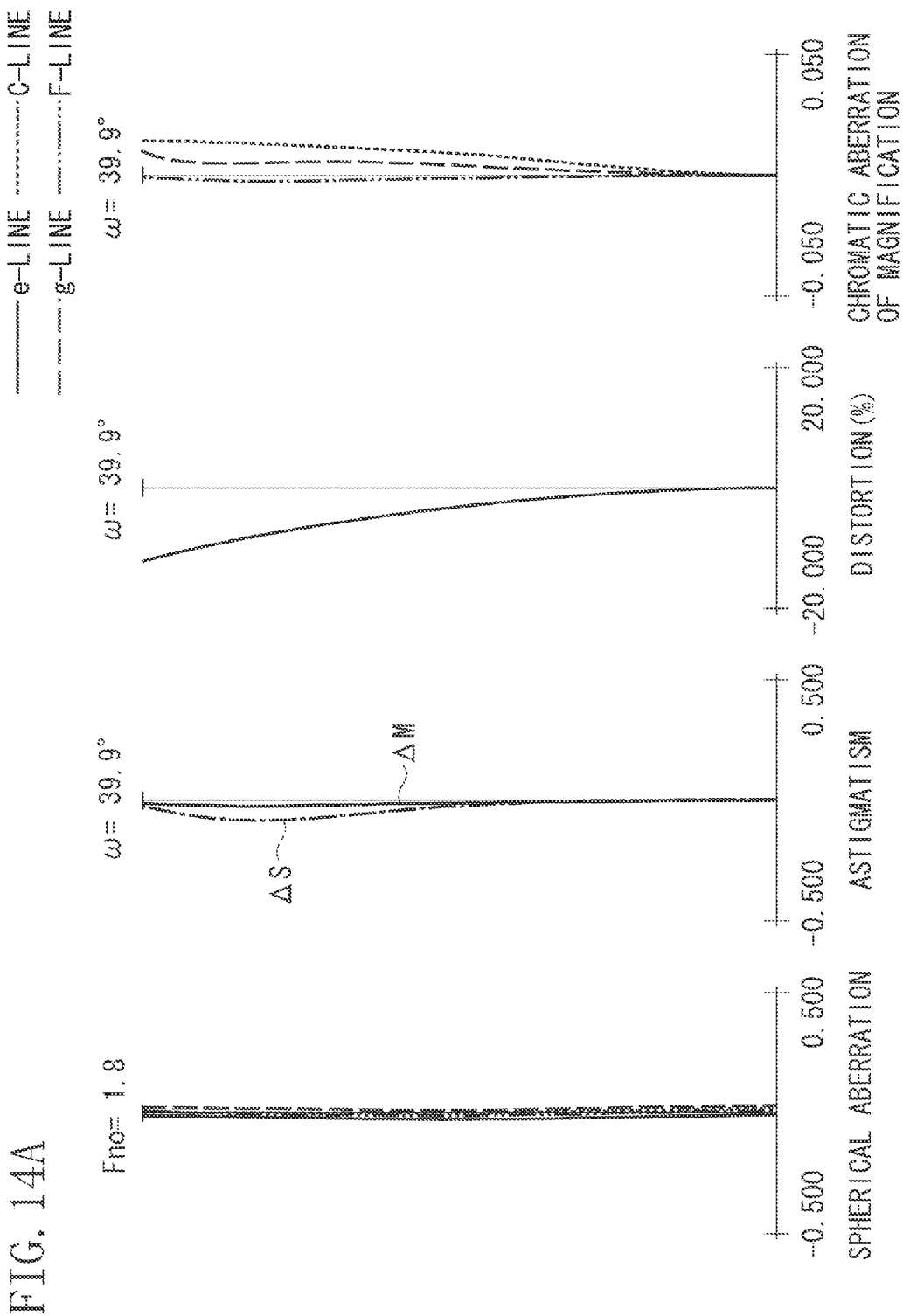

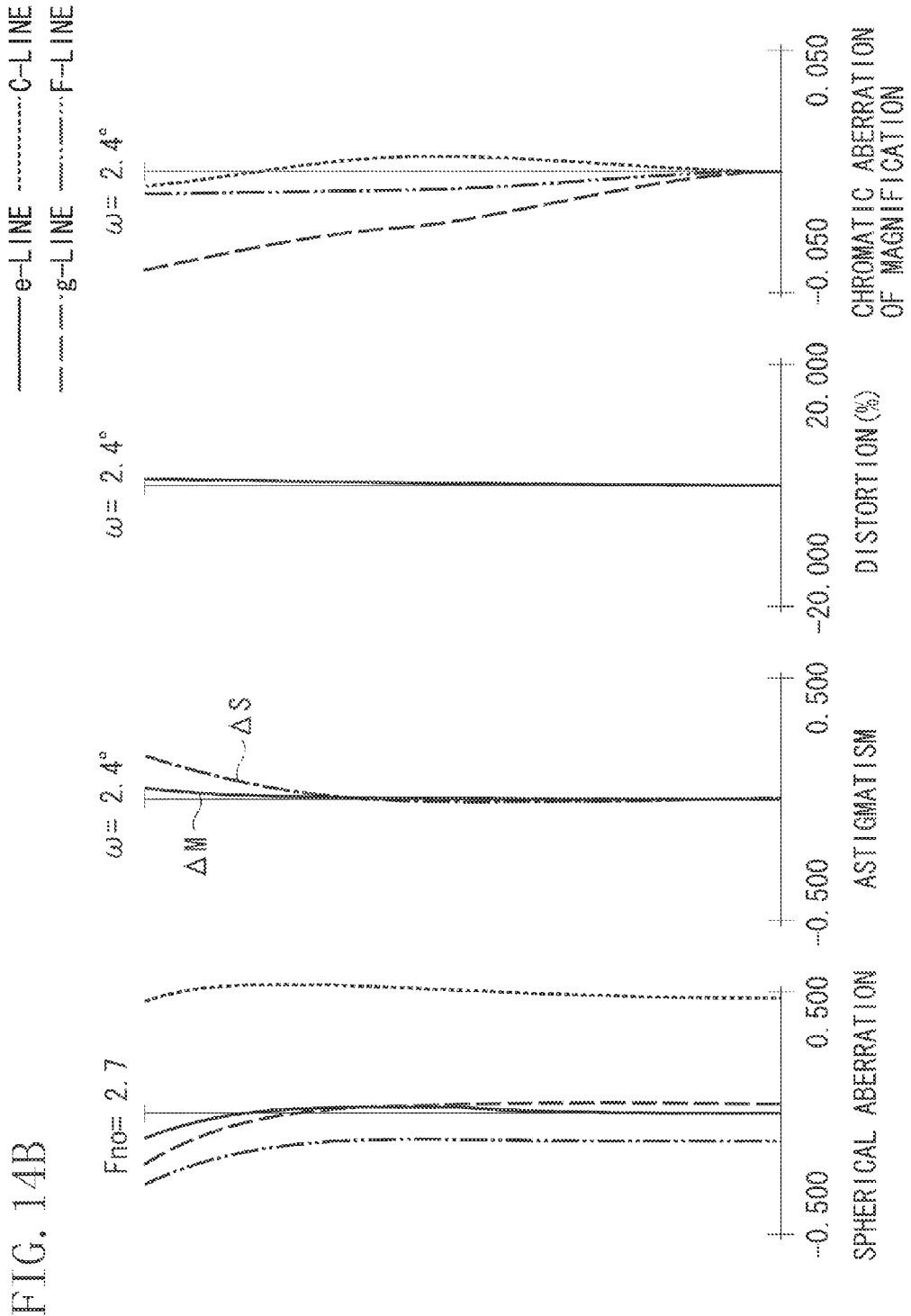

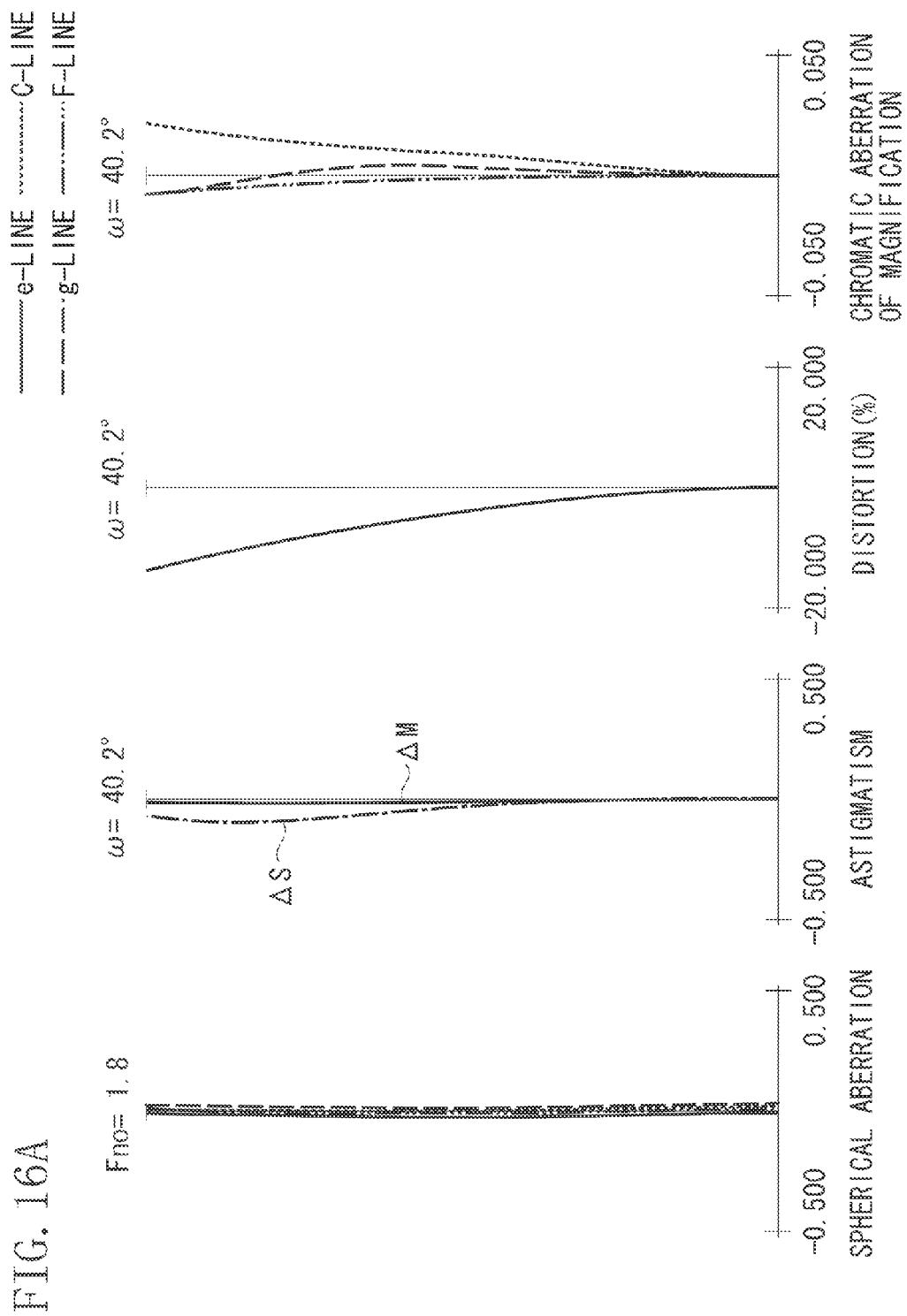

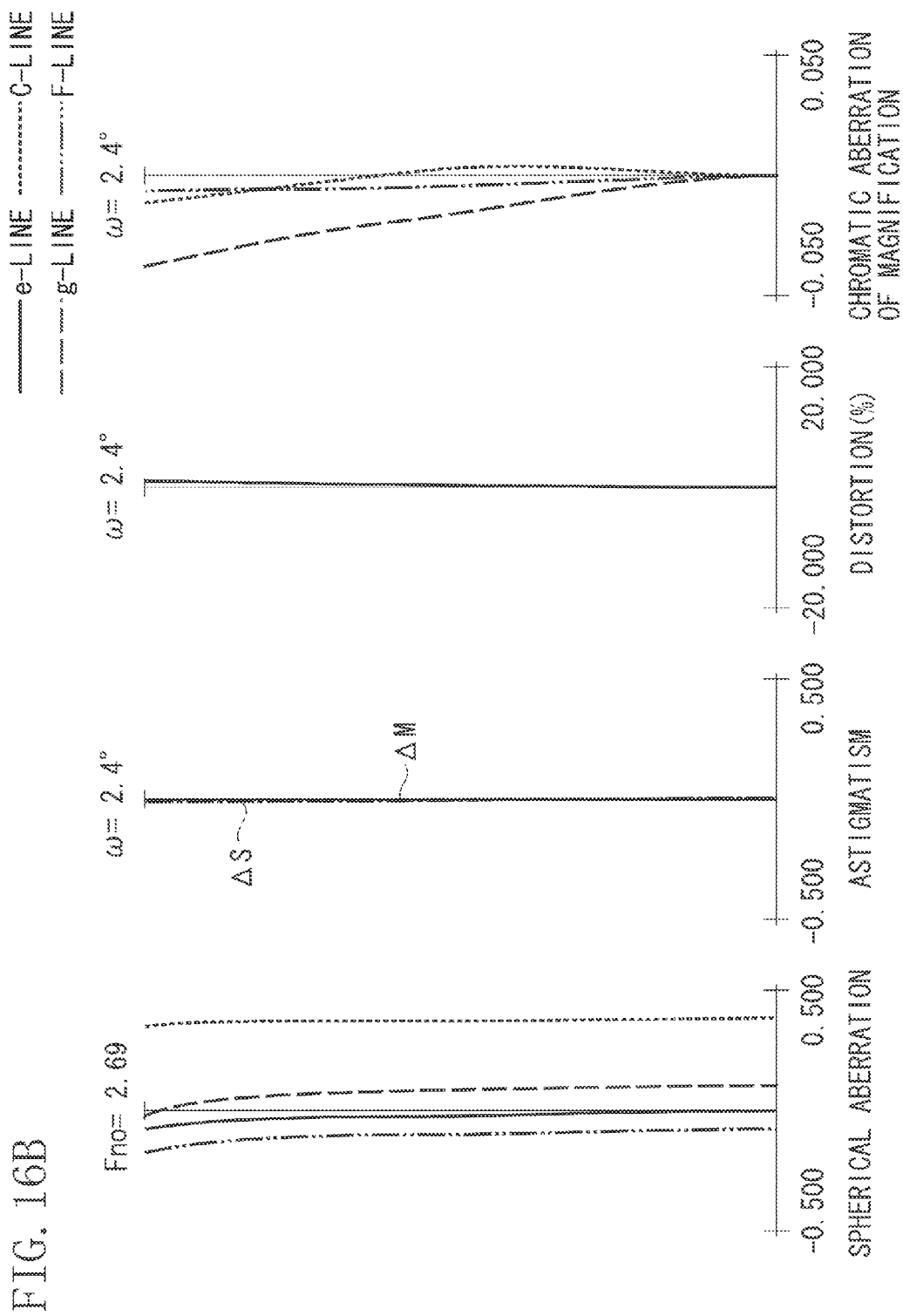

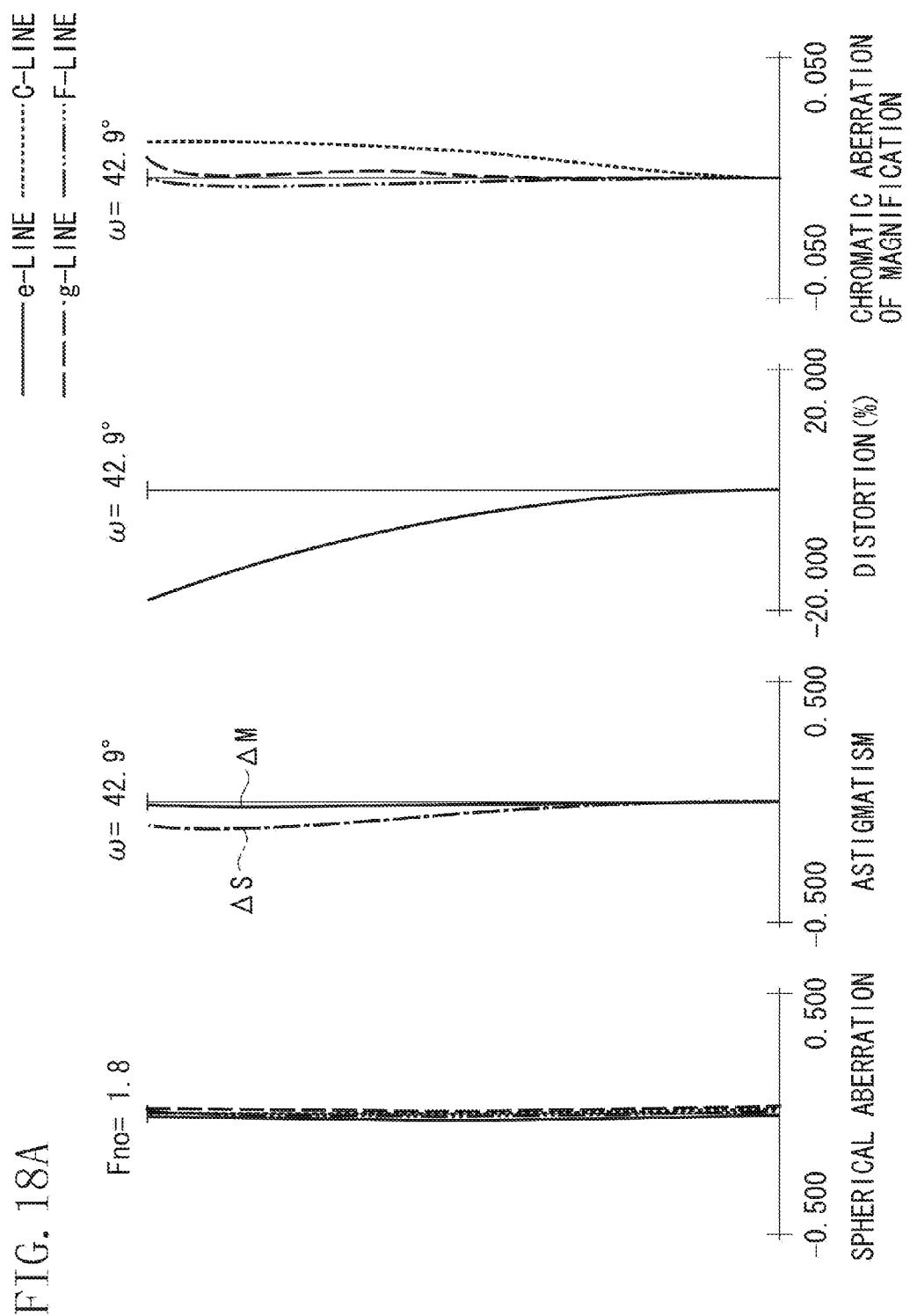

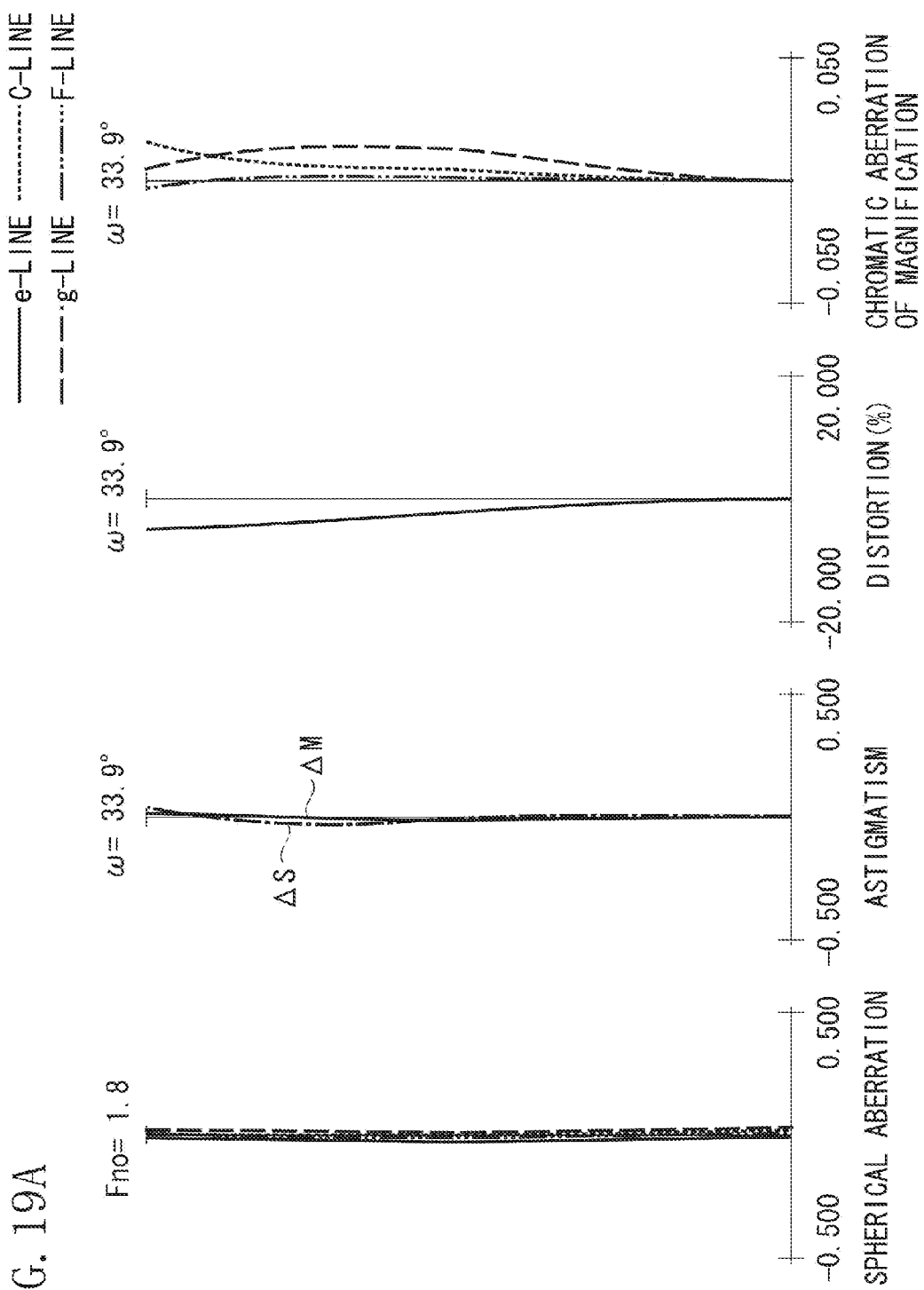

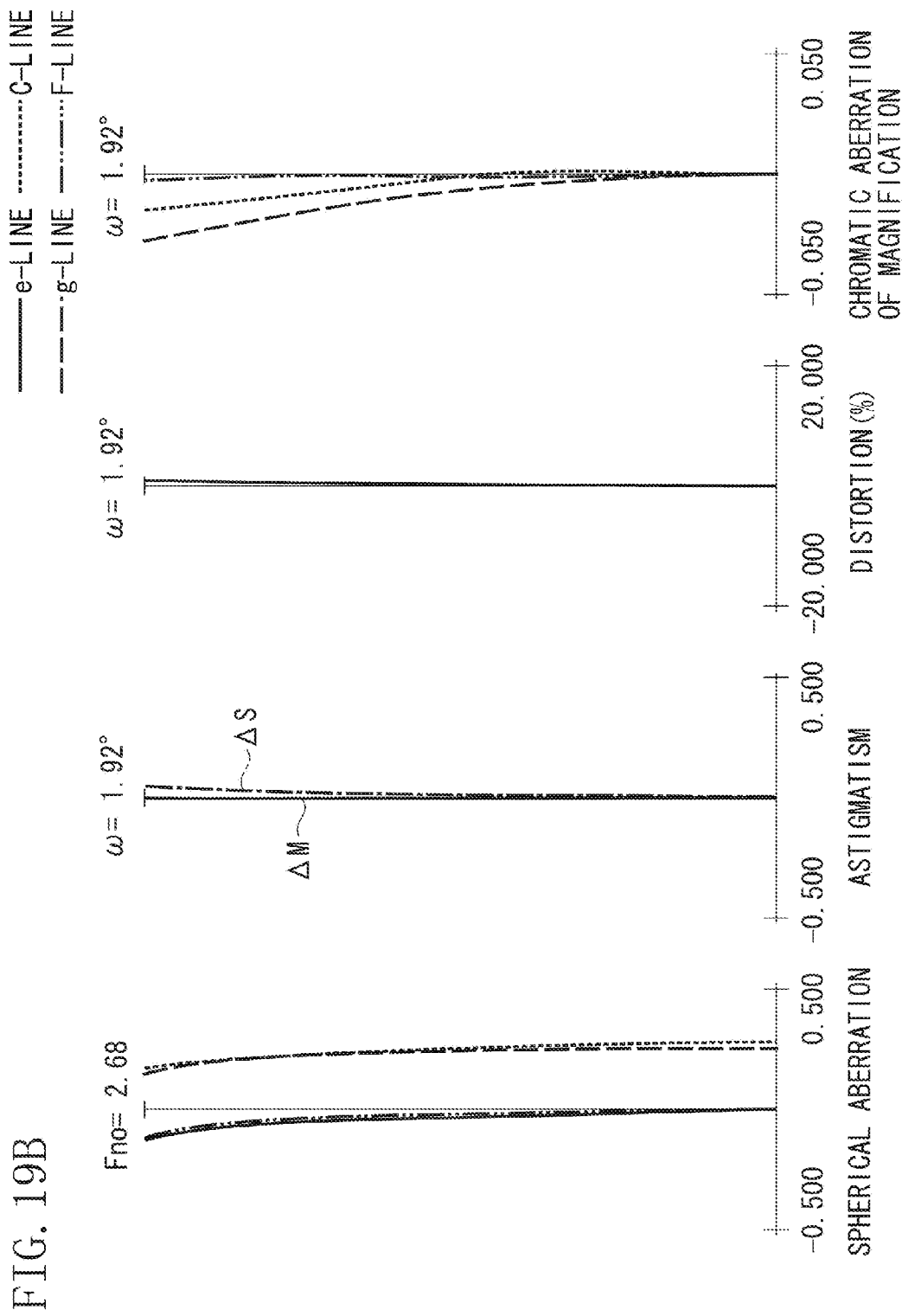

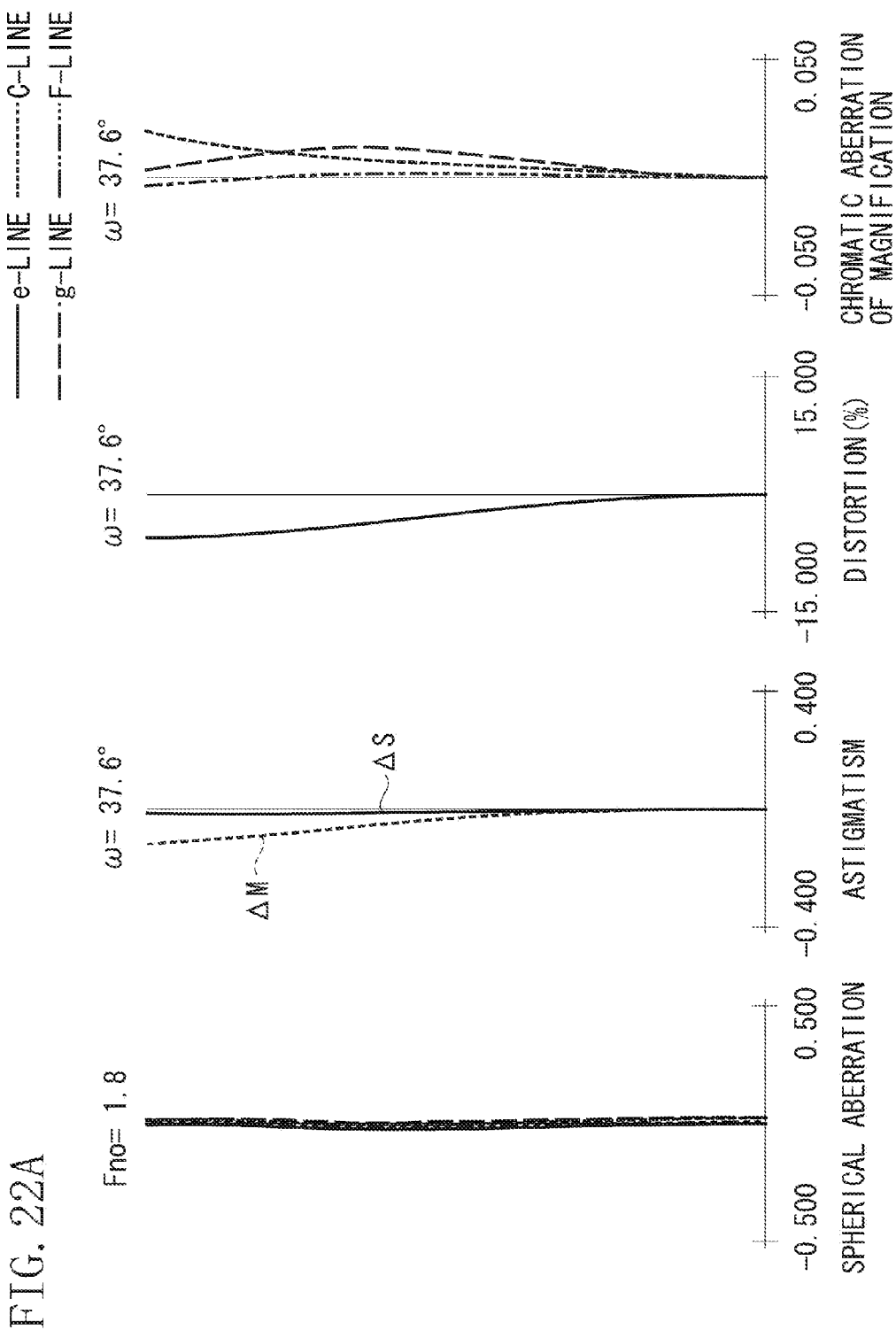

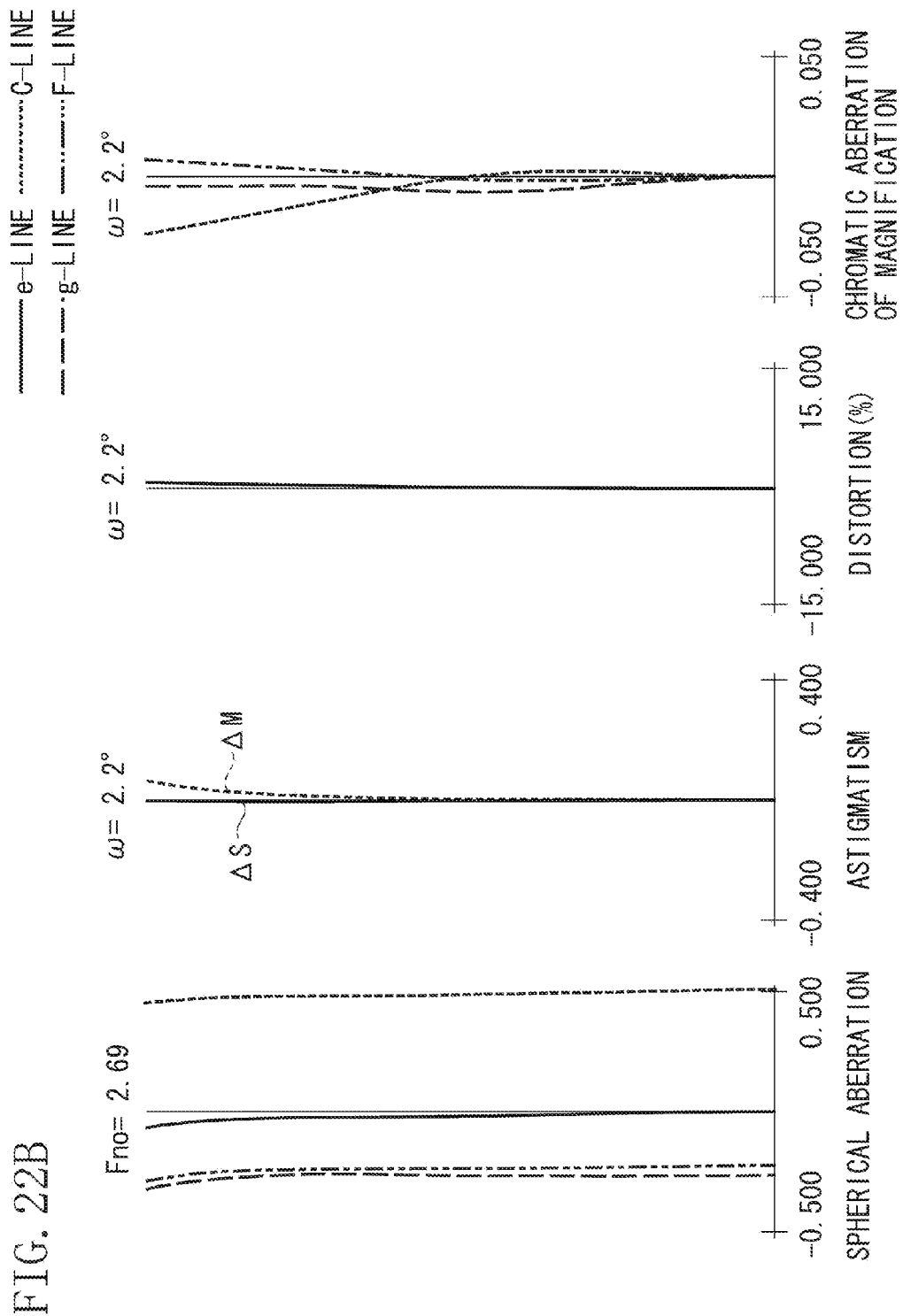

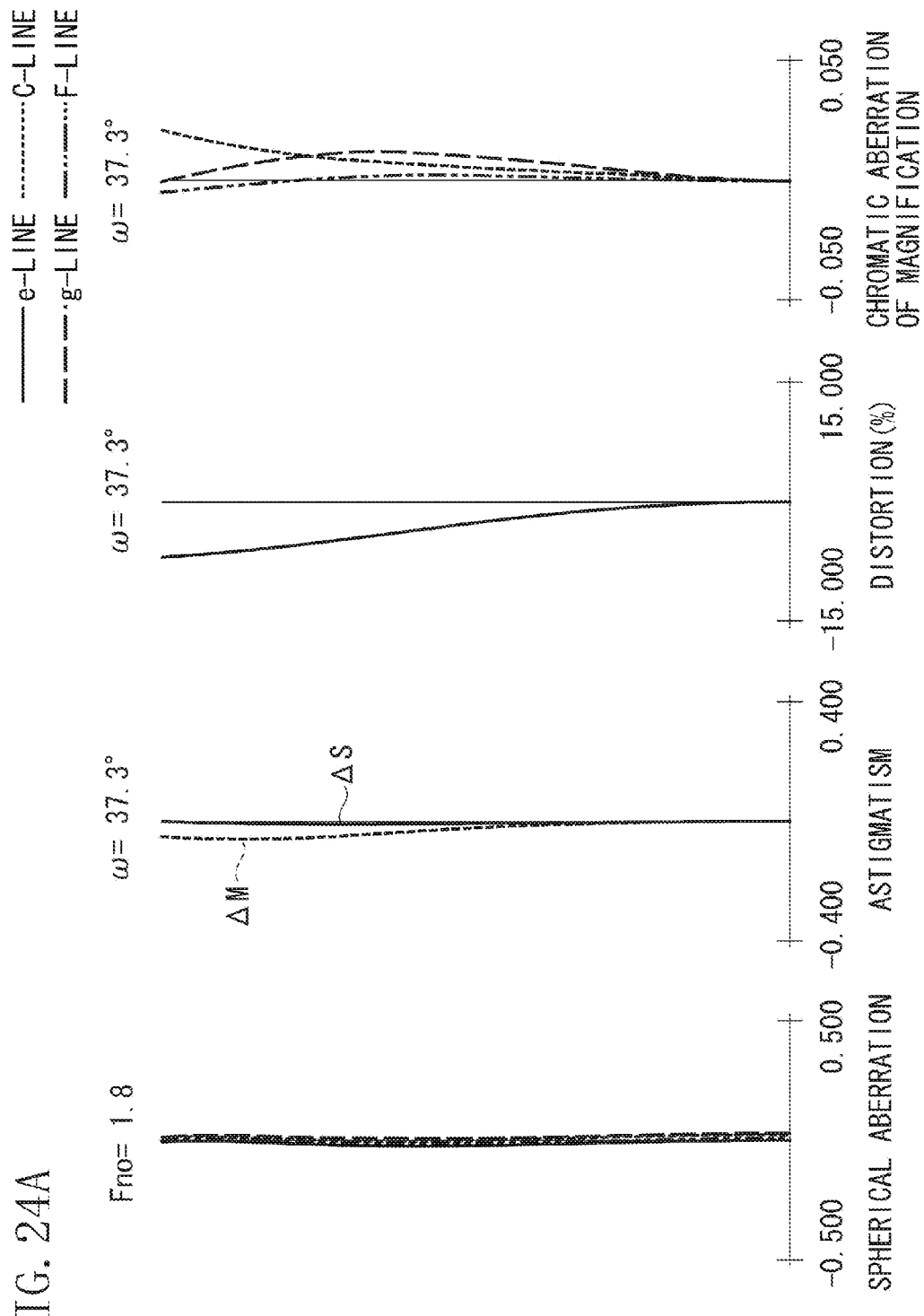

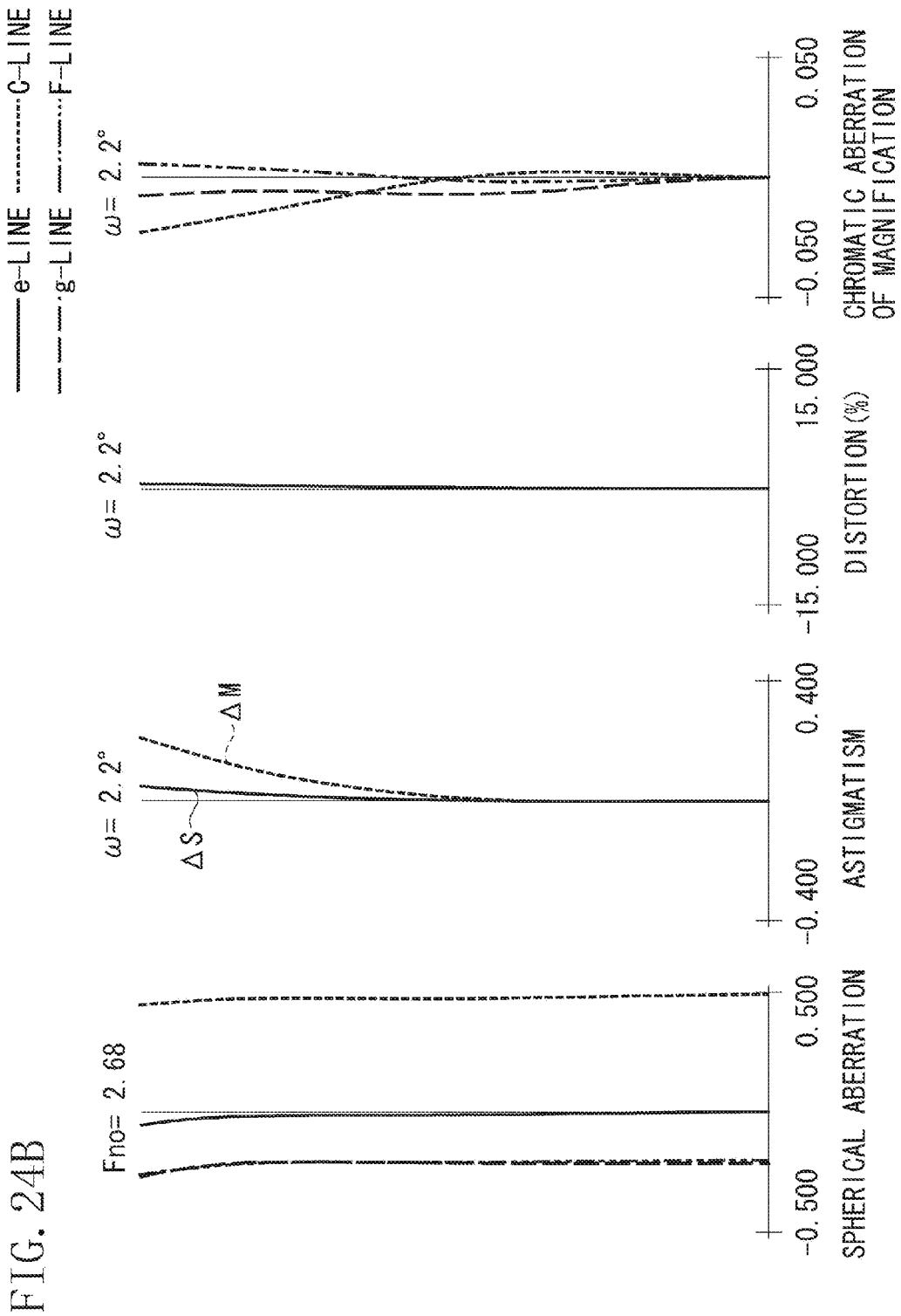

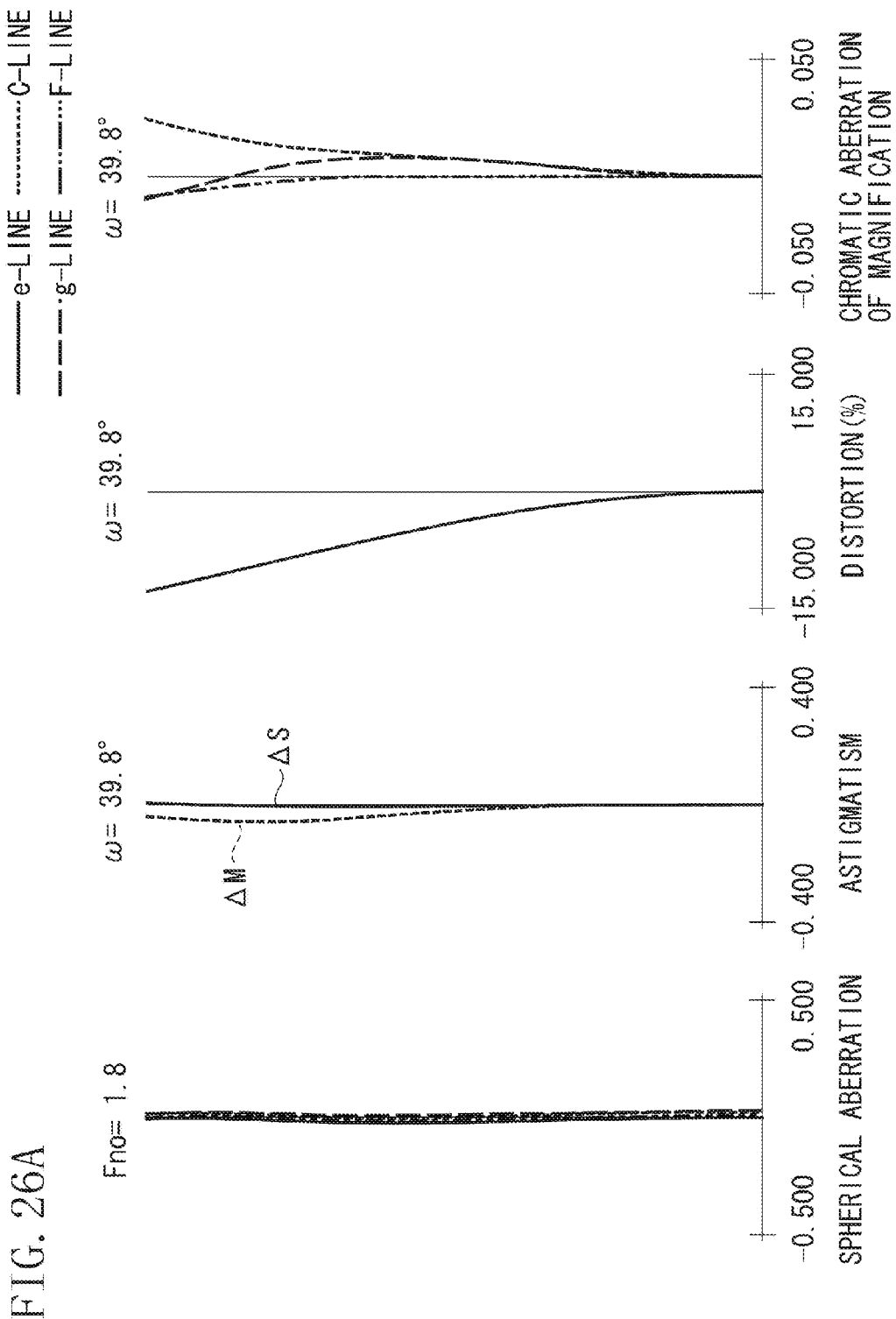

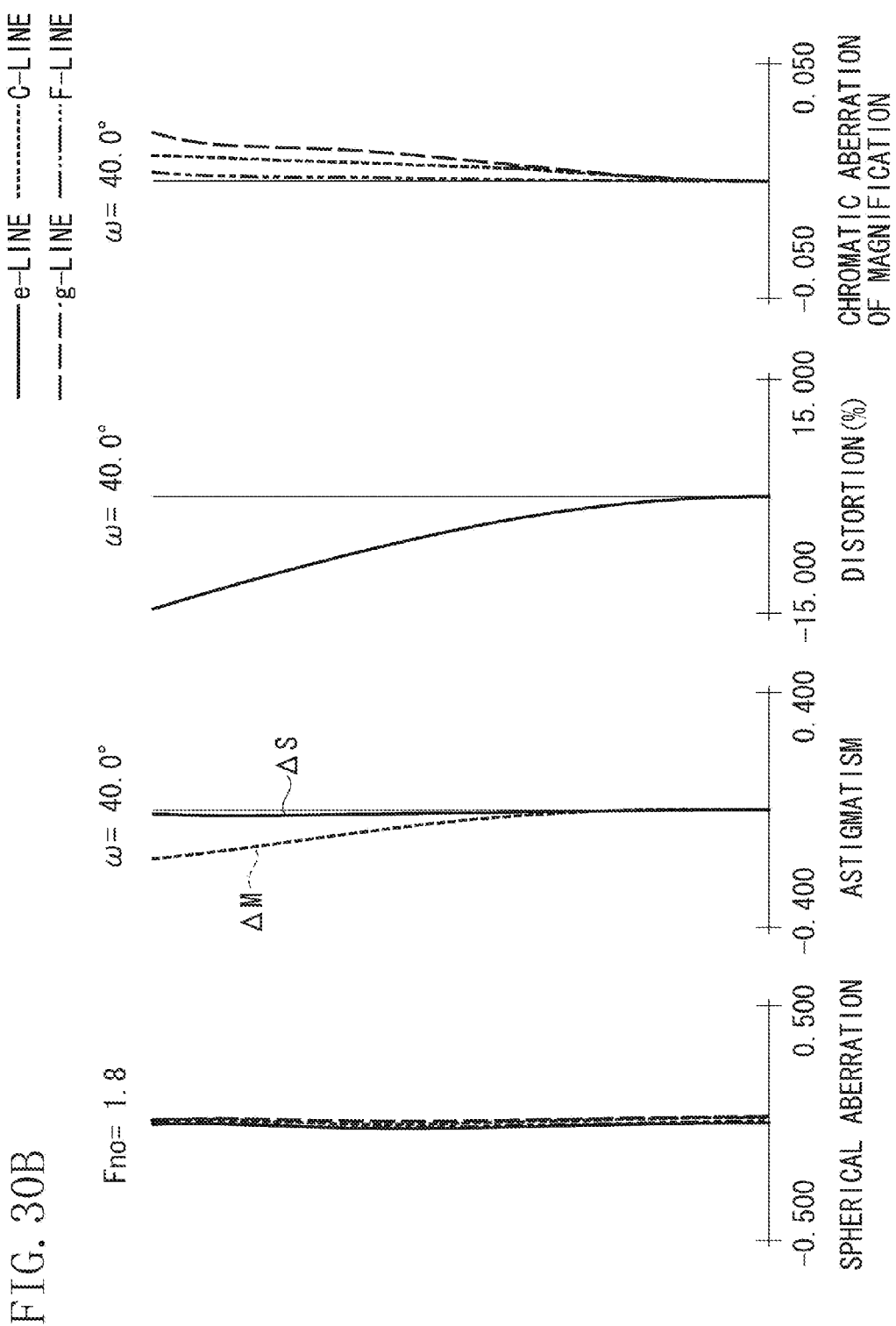

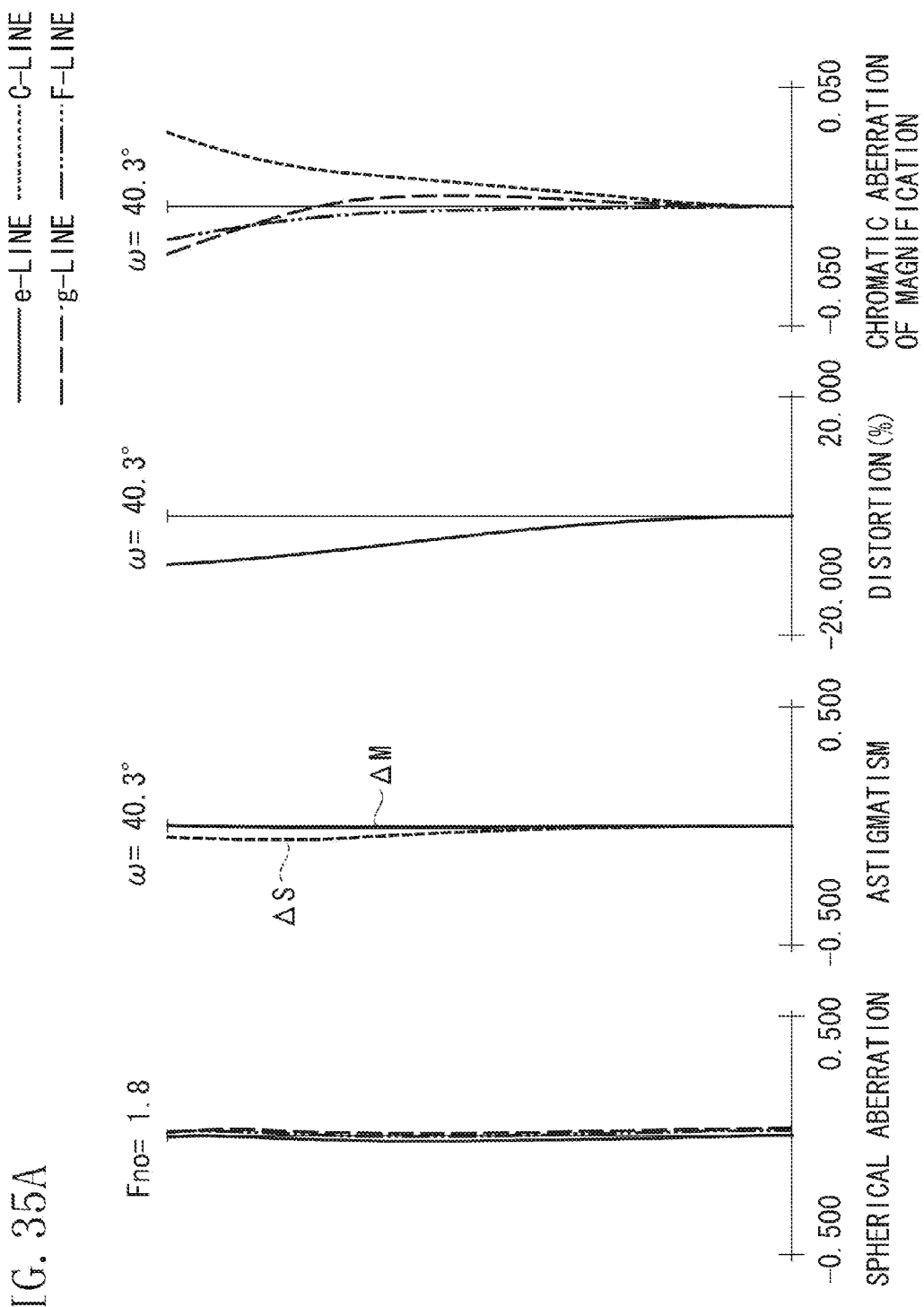

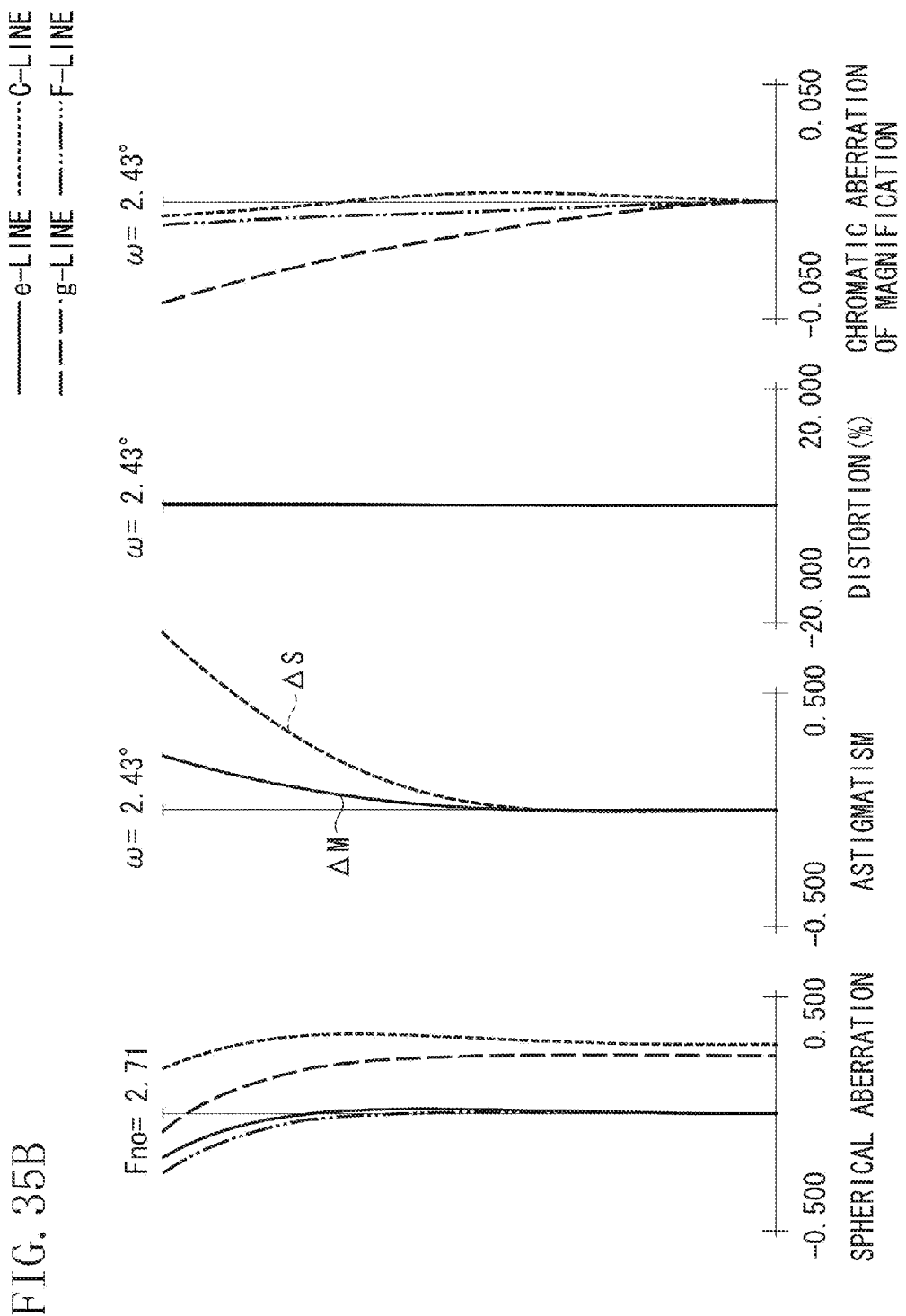

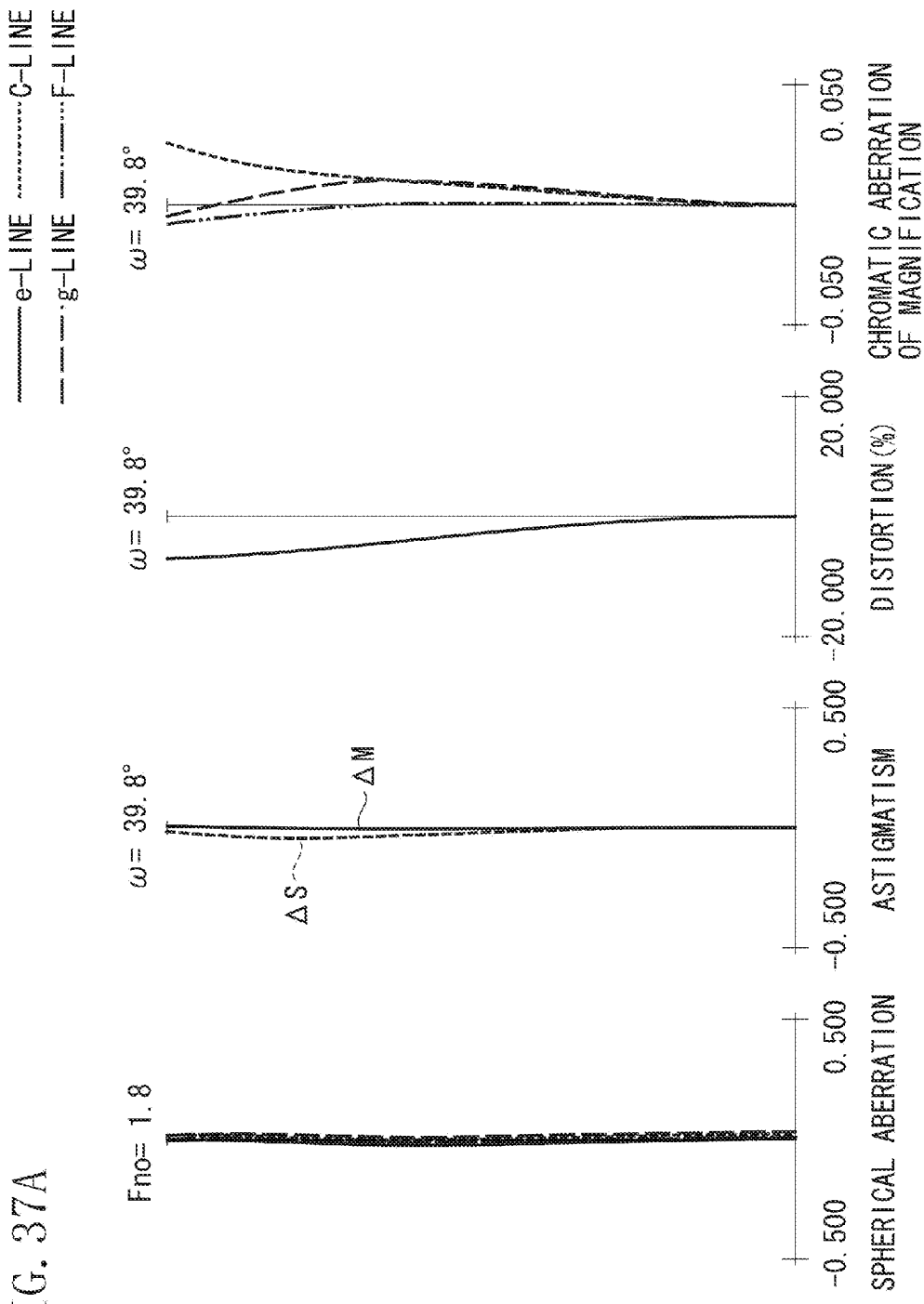

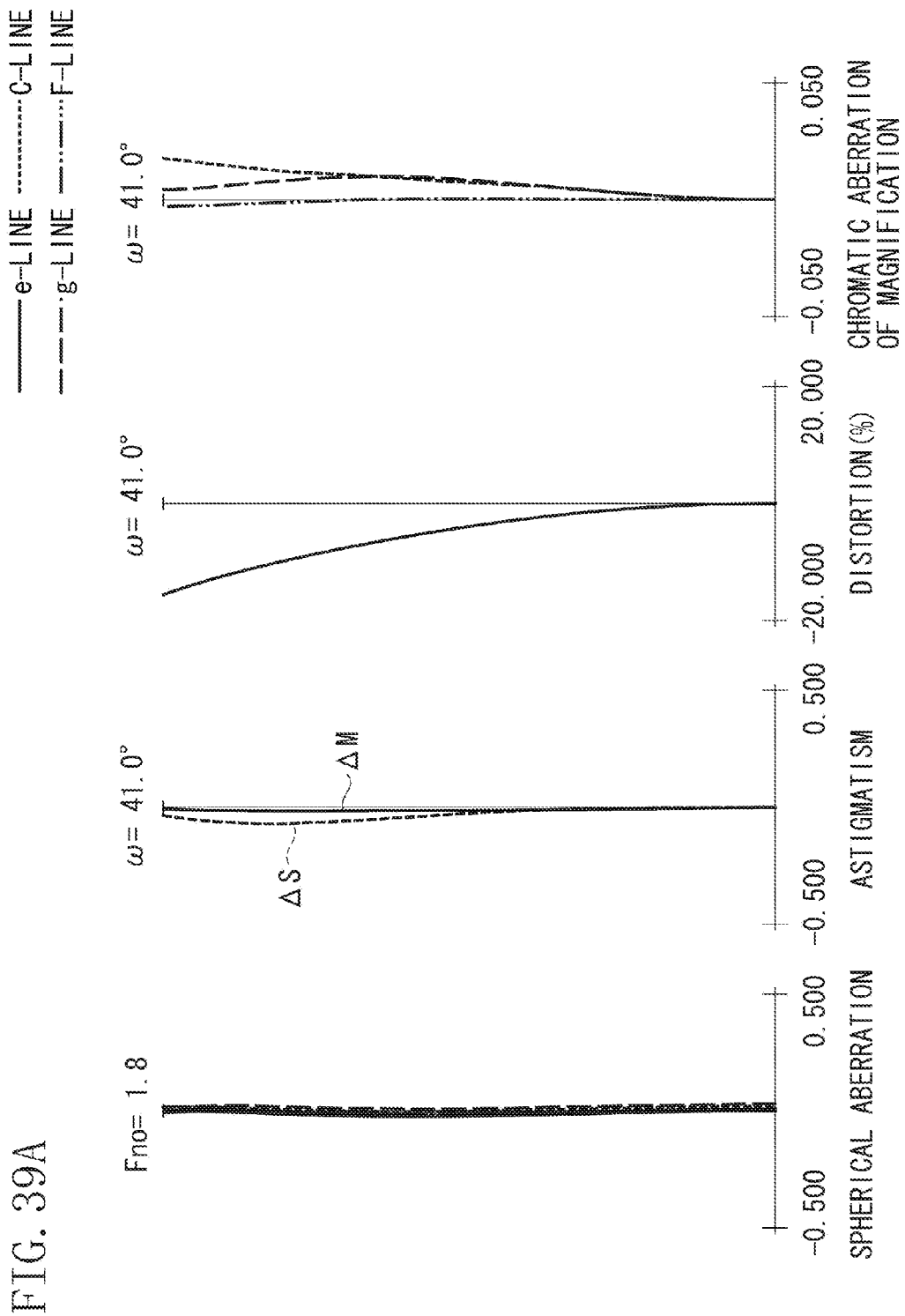

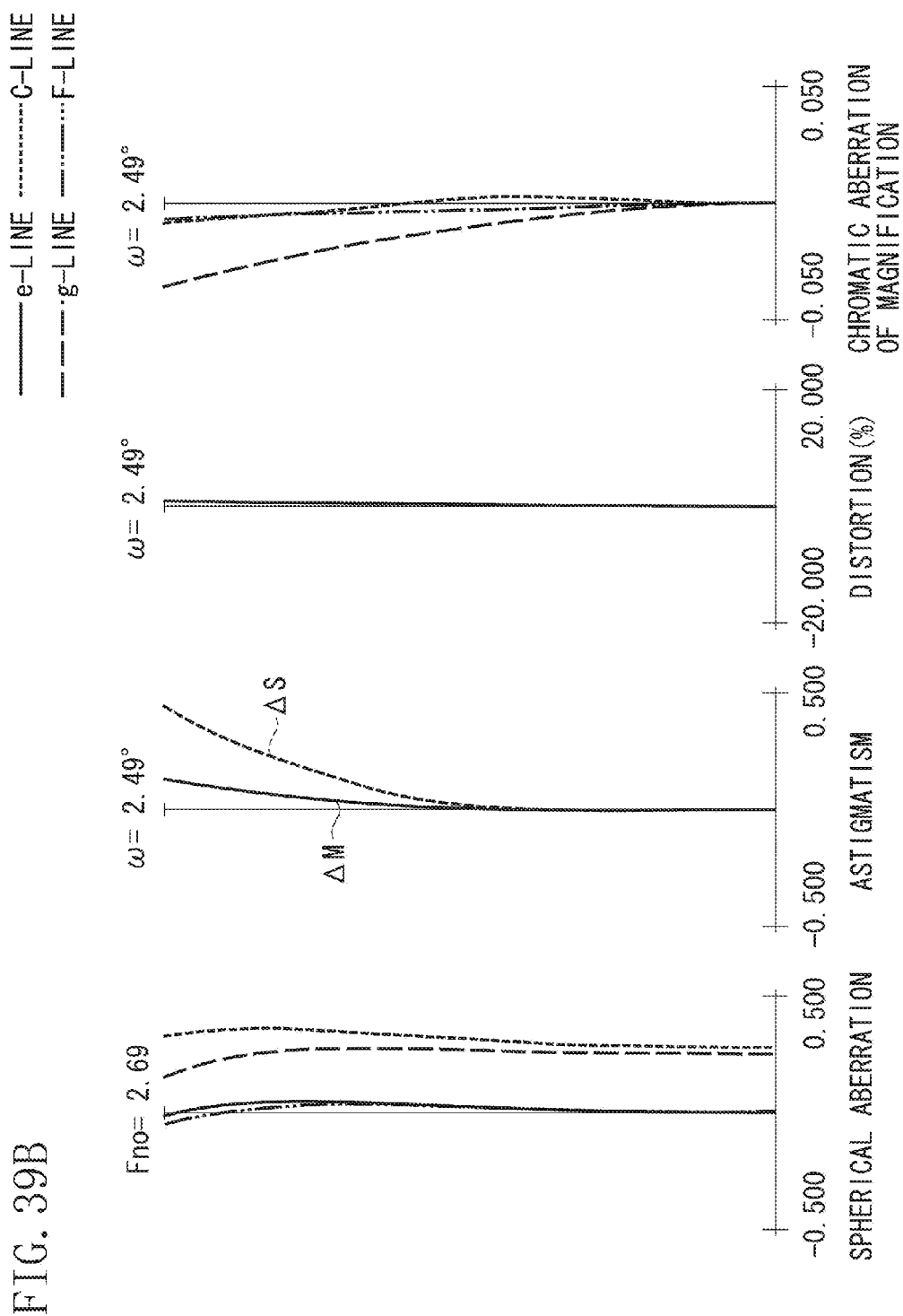

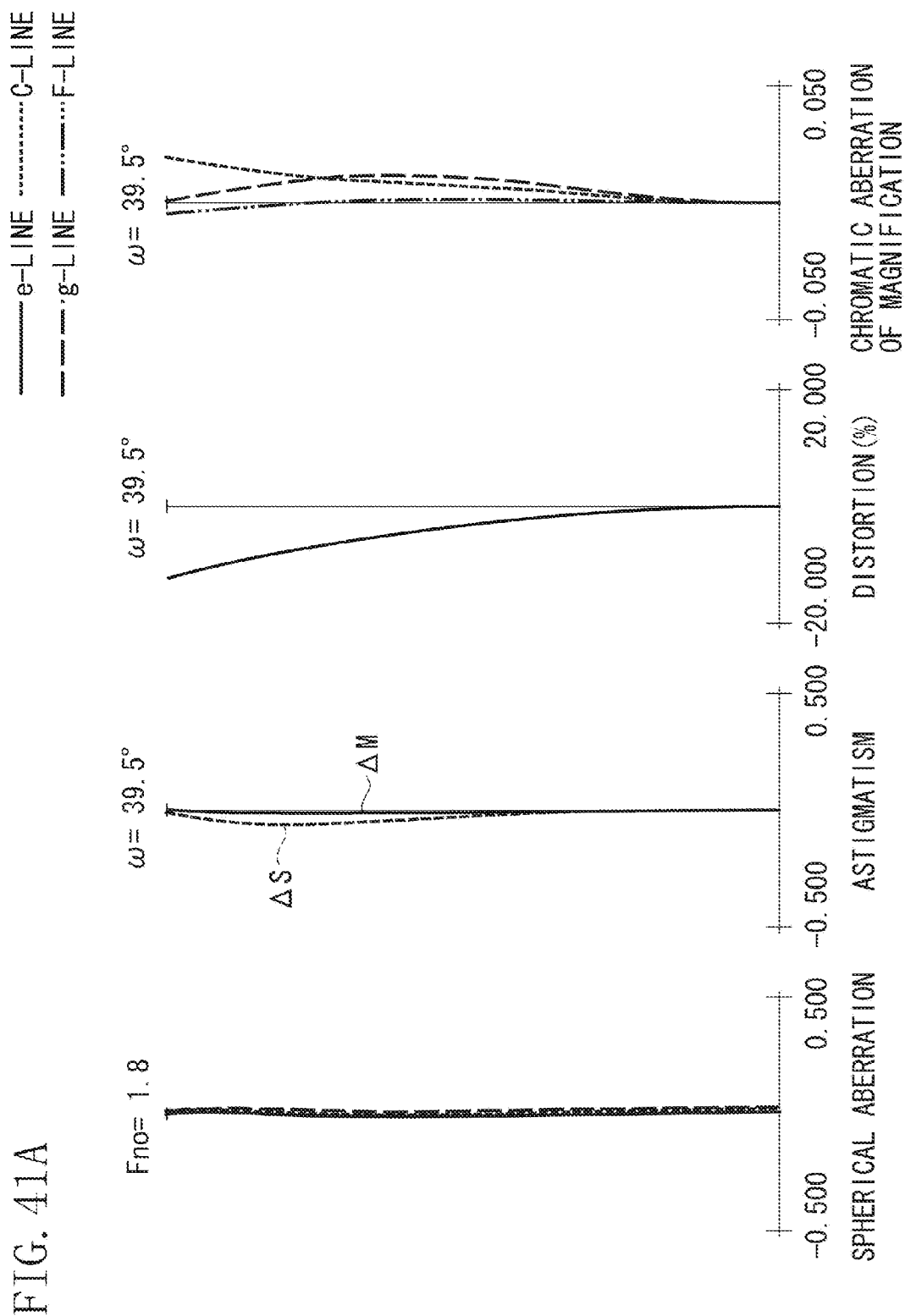

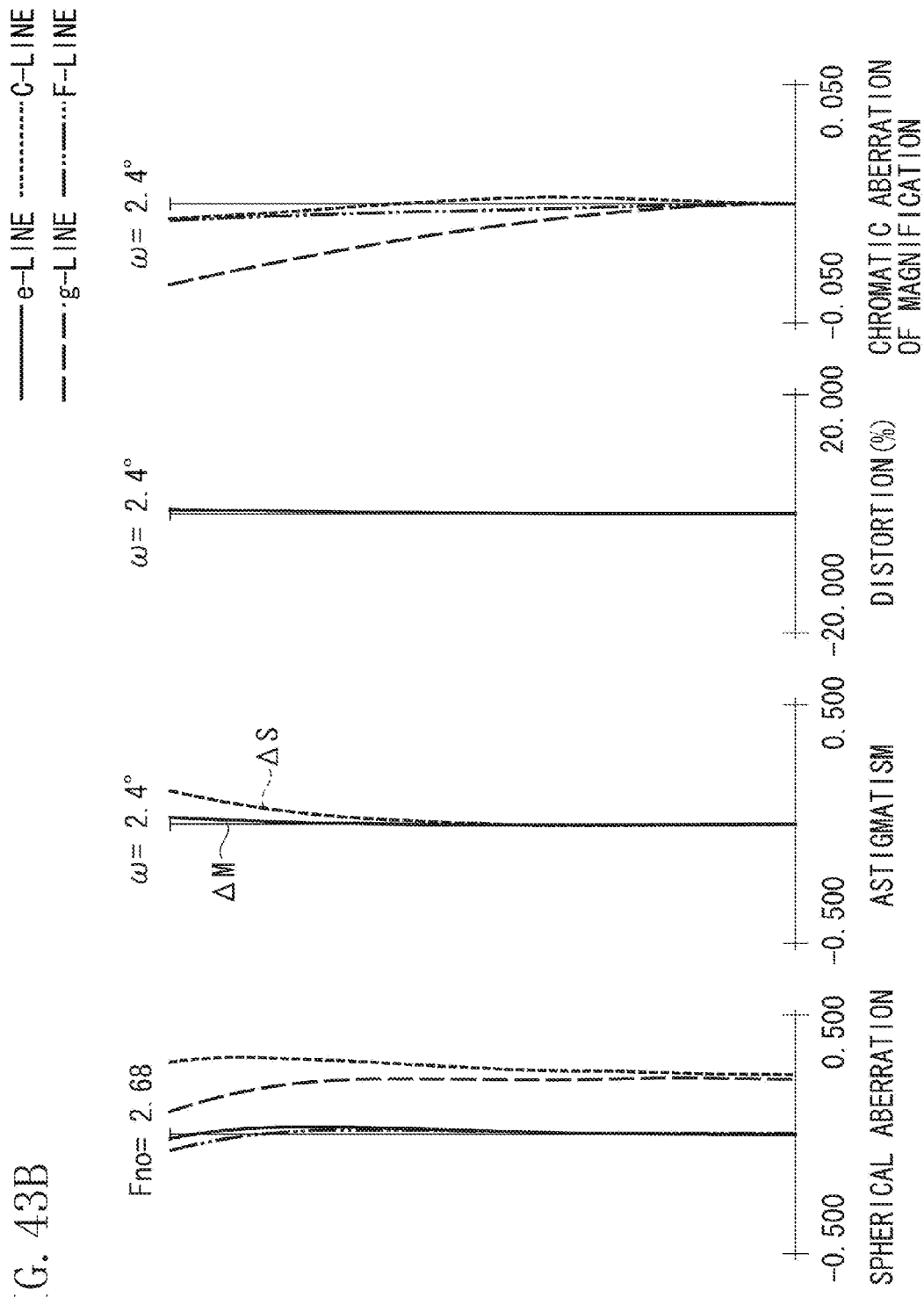

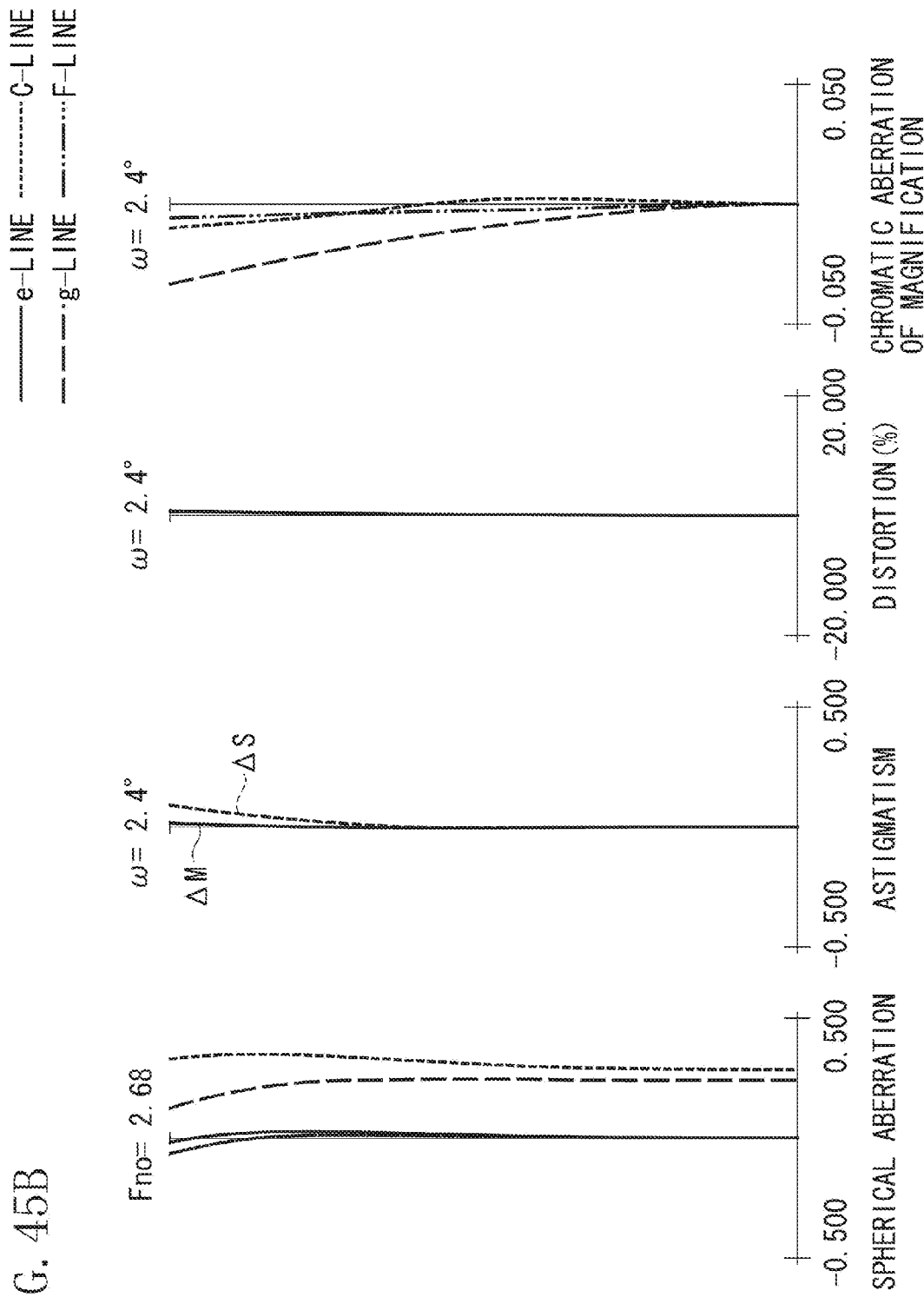

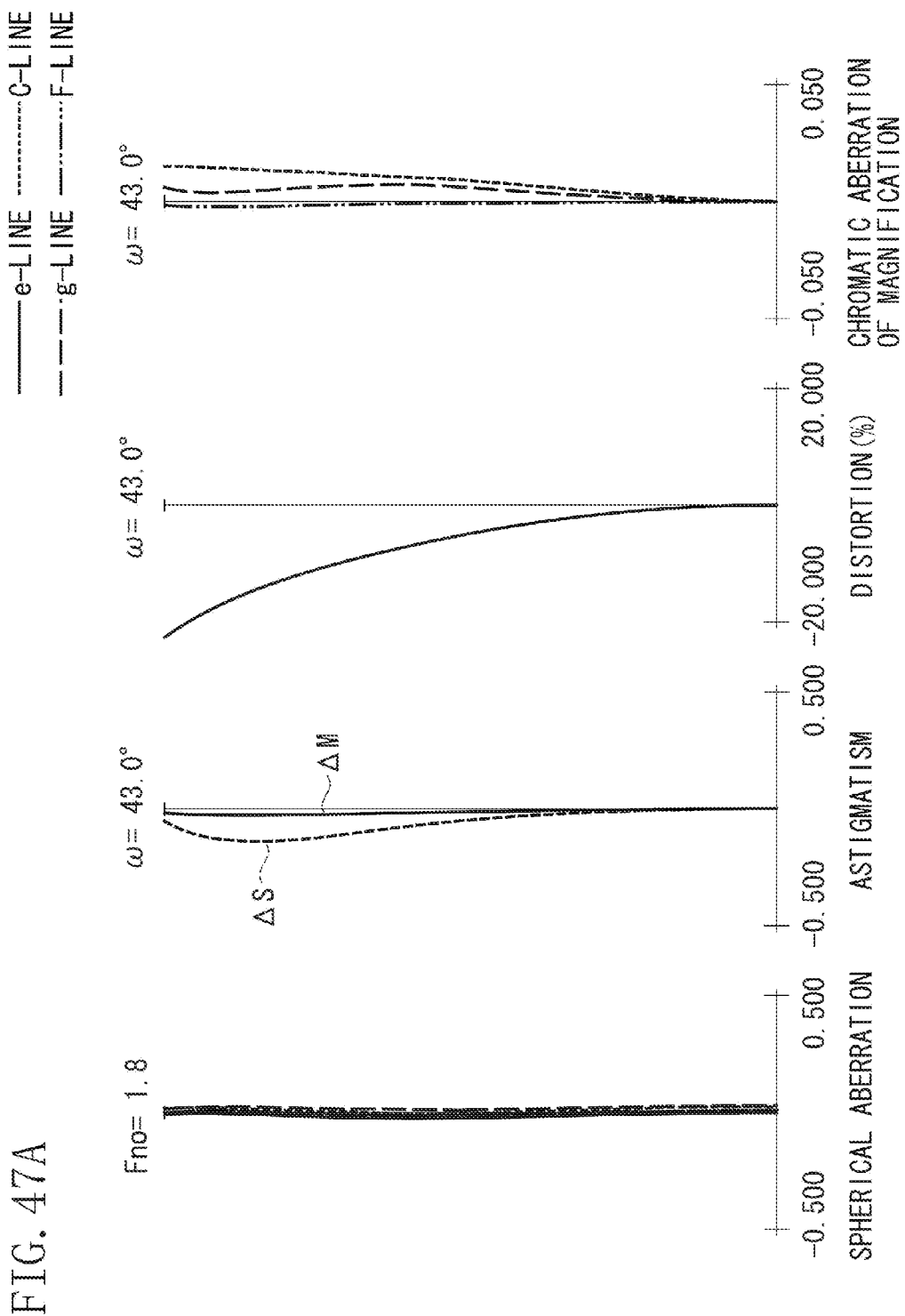

WIDE-ANGLE CONVERTER LENS

BACKGROUND OF THE INVENTION

1. Field of the Invention

The present invention relates to a wide-angle converter lens which can be mounted on an imaging lens used for a digital still camera, a video camera, a broadcasting camera, or the like, particularly, an imaging lens of which a variable magnification ratio is 10 or more, and of which a half angle of view ω at a wide-angle end is 30° or more.

2. Description of the Related Art

There have been conventionally proposed many wide-angle converter lenses, each of which is mounted on an object side of an imaging lens (master lens) and which changes a focal length of an entire photographing system to be short in the state of maintaining a focal plane of the entire system at a constant position.

For example, U.S. Pat. No. 7,463,424 discusses a wide-angle converter lens which includes, in order from an object side, a first lens unit having negative refractive power and a second lens unit having positive refractive power, in which four lens elements constitute an afocal system as a total system, and of which the focal length conversion magnification ratio is about 0.8.

Japanese Patent Application Laid-Open No. 2006-119346 discusses a wide-angle converter lens which includes a first lens unit configured with two lenses having negative refractive power and a second lens unit configured with a lens having negative refractive power and a lens having positive refractive power, and of which the focal length conversion magnification ratio is about 0.65.

However, in U.S. Pat. No. 7,463,424, if the wide-angle converter lens is mounted on an imaging lens (hereinafter also referred to as "master lens"), axial chromatic aberration (longitudinal chromatic aberration) at the telephoto end with respect to a reference wavelength is in the "under" state for g-line, so that the achromatic balance of the imaging lens is changed.

In addition, in Japanese Patent Application Laid-Open No. 2006-119346, if the wide-angle converter lens is mounted on an imaging lens (master lens), similarly to U.S. Pat. No. 7,463,424, axial chromatic aberration at the telephoto end with respect to a reference wavelength is in the "under" state for g-line and in the "over" state for C-line. In other words, the achromatic balance of the imaging lens is changed.

In other words, if such a wide-angle converter lens described above is mounted on the imaging lens, the balance of chromatic aberration from the middle zoom range to the telephoto end, particularly, the balance of axial chromatic aberration is deteriorated.

SUMMARY OF THE INVENTION

The various embodiments of the present invention provide disclosure of a wide-angle converter lens capable of maintaining good balance of chromatic aberration of magnification (lateral chromatic aberration) at a wide-angle end and maintaining good balance of axial chromatic aberration over the entire zoom range of an imaging lens when the wide-angle converter lens is mounted on the imaging lens.

According to an aspect of the present invention, there is provided a wide-angle converter lens capable of being detachably mounted on an enlargement side of an imaging lens, including: at least two optical elements having negative refractive power; and at least one optical element having positive refractive power, wherein, when an average value of relative partial dispersions of the at least two optical elements having negative refractive power is denoted by $\theta gF\_n$; a relative partial dispersion of a first optical element among at least the two optical elements having negative refractive power is denoted by $\theta gF$; and an Abbe number of the first optical element is denoted by $vd$, the following conditions are satisfied:

$$\theta gF\_n > 0.58$$

$$\theta gF - (2.35 \times 10^{-5} \times vd^2 - 4.11 \times 10^{-3} \times vd + 0.7204) > 0$$

$$vd < 30.$$

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4A is a longitudinal aberration diagram for a wide-angle end in the state where the master lens is mounted on the wide-angle converter lens according to Numerical Example 1, and FIG. 4B is a longitudinal aberration diagram for a telephoto end in the state where the master lens is mounted on the wide-angle converter lens according to Numerical Example 1.

FIG. 5 is a lens cross-sectional diagram illustrating a state where a master lens is mounted on a wide-angle converter lens according to Numerical Example 2.

FIG. 6A is a longitudinal aberration diagram for a wide-angle end in the state where the master lens is mounted on the wide-angle converter lens according to Numerical Example 2, and FIG. 6B is a longitudinal aberration diagram for a telephoto end in the state where the master lens is mounted on the wide-angle converter lens according to Numerical Example 2.

FIG. 8B is a longitudinal aberration diagram for a telephoto end in the state where the master lens is mounted on the wide-angle converter lens according to Numerical Example 3.

FIG. 10A is a longitudinal aberration diagram for a wide-angle end in the state where the master lens is mounted on the wide-angle converter lens according to Numerical Example 4, and FIG. 10B is a longitudinal aberration diagram for a telephoto end in the state where the master lens is mounted on the wide-angle converter lens according to Numerical Example 4.

FIG. 12B is a longitudinal aberration diagram for a telephoto end in the state where the master lens is mounted on the wide-angle converter lens according to Numerical Example 5.

FIG. 14A is a longitudinal aberration diagram for a wide-angle end in the state where the master lens is mounted on the wide-angle converter lens according to Numerical Example 6, and FIG. 14B is a longitudinal aberration diagram for a telephoto end in the state where the master lens is mounted on the wide-angle converter lens according to Numerical Example 6.

FIG. 16A is a longitudinal aberration diagram for a wide-angle end in the state where the master lens is mounted on the wide-angle converter lens according to Numerical Example 7, and FIG. 16B is a longitudinal aberration diagram for a telephoto end in the state where the master lens is mounted on the wide-angle converter lens according to Numerical Example 7.

FIG. 18A is a longitudinal aberration diagram for a wide-angle end in the state where the master lens is mounted on the wide-angle converter lens according to Numerical Example 8.

FIG. 19A is a longitudinal aberration diagram for a wide-angle end of a master lens, and FIG. 19B is a longitudinal aberration diagram for a telephoto end of the master lens.

FIG. 22A is a longitudinal aberration diagram for a wide-angle end in the state where the wide-angle converter lens according to Numerical Example 9 is mounted on the master lens, and FIG. 22B is a longitudinal aberration diagram for a telephoto end in the state where the wide-angle converter lens according to Numerical Example 9 is mounted on the master lens.

FIG. 24A is a longitudinal aberration diagram for a wide-angle end in the state where the wide-angle converter lens according to Numerical Example 10 is mounted on a master lens, and FIG. 24B is a longitudinal aberration diagram for a telephoto end in the state where the wide-angle converter lens according to Numerical Example 10 is mounted on the master lens.

FIG. 26A is a longitudinal aberration diagram for a wide-angle end in the state where the wide-angle converter lens according to Numerical Example 11 is mounted on a master lens.

FIG. 30B is a longitudinal aberration diagram for a telephoto end in the state where the wide-angle converter lens according to Numerical Example 13 is mounted on the master lens.

FIG. 35A is a longitudinal aberration diagram for a wide-angle end in the state where the master lens is mounted on the wide-angle converter lens according to Numerical Example 15, and FIG. 35B is a longitudinal aberration diagram for a telephoto end in the state where the master lens is mounted on the wide-angle converter lens according to Numerical Example 15.

FIG. 37A is a longitudinal aberration diagram for a wide-angle end in the state where the master lens is mounted on the wide-angle converter lens according to Numerical Example 16.

FIG. 39A is a longitudinal aberration diagram for a wide-angle end in the state where the master lens is mounted on the wide-angle converter lens according to Numerical Example 17, and FIG. 39B is a longitudinal aberration diagram for a telephoto end in the state where the master lens is mounted on the wide-angle converter lens according to Numerical Example 17.

FIG. 41A is a longitudinal aberration diagram for a wide-angle end in the state where the master lens is mounted on the wide-angle converter lens according to Numerical Example 18.

FIG. 43B is a longitudinal aberration diagram for a telephoto end in the state where the master lens is mounted on the wide-angle converter lens according to Numerical Example 19.

FIG. 45B is a longitudinal aberration diagram for a telephoto end in the state where the master lens is mounted on the wide-angle converter lens according to Numerical Example 20.

FIG. 47A is a longitudinal aberration diagram for a wide-angle end in the state where the master lens is mounted on the wide-angle converter lens according to Numerical Example 21.

DESCRIPTION OF THE EMBODIMENTS

Various exemplary embodiments, features, and aspects of the invention will be described in detail below with reference to the drawings. As used herein, the side of a lens where an object to be imaged is located is referred to as the object side or front side of the lens; and the side of the lens where the image of the object is formed is referred to as the image side or back side of the lens. In terms of the zoom lens, the object side is also referred to as the "enlargement side", whereas the image side is referred to as the "reduction side".

Figure 1:
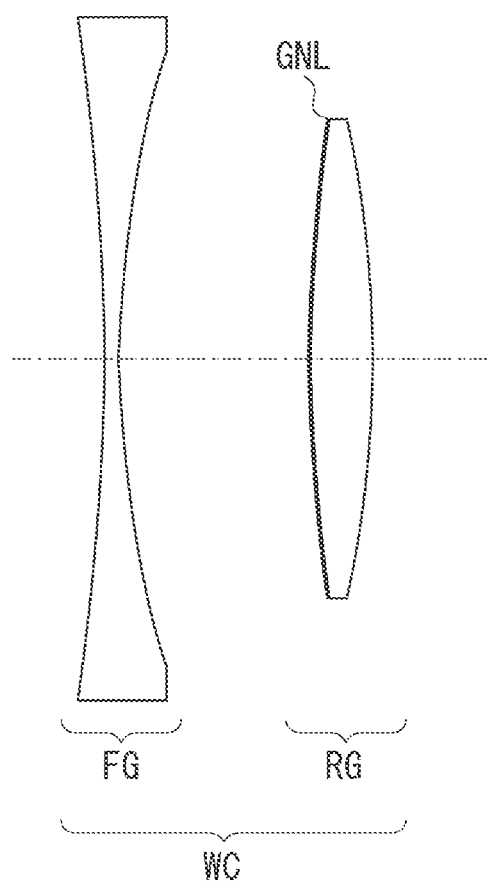
FIG. 1 is a lens cross-sectional diagram illustrating a wide-angle converter lens according to Numerical Example 1.

FIG. 1 is a cross-sectional diagram illustrating a wide-angle converter lens WG according to a first exemplary embodiment of the invention (Numerical Example 1). The wide-angle converter lens WG is a lens capable of being detachably mounted on an enlargement side (subject side, object side, enlargement conjugate side) of an imaging lens. The wide-angle converter lens WG includes, in order from the enlargement side to a reduction side (image plane side, master lens side, reduction conjugate side), a first lens unit FG having negative refractive power and a second lens unit RG having positive refractive power. The first lens unit and the second lens unit are disposed in the wide-angle converter lens so that the largest air distance is interposed therebetween. In addition, herein, the wide-angle converter lens includes at least two lenses (optical elements) having negative refractive power and at least one lens (optical element) having positive refractive power.

Figure 2:
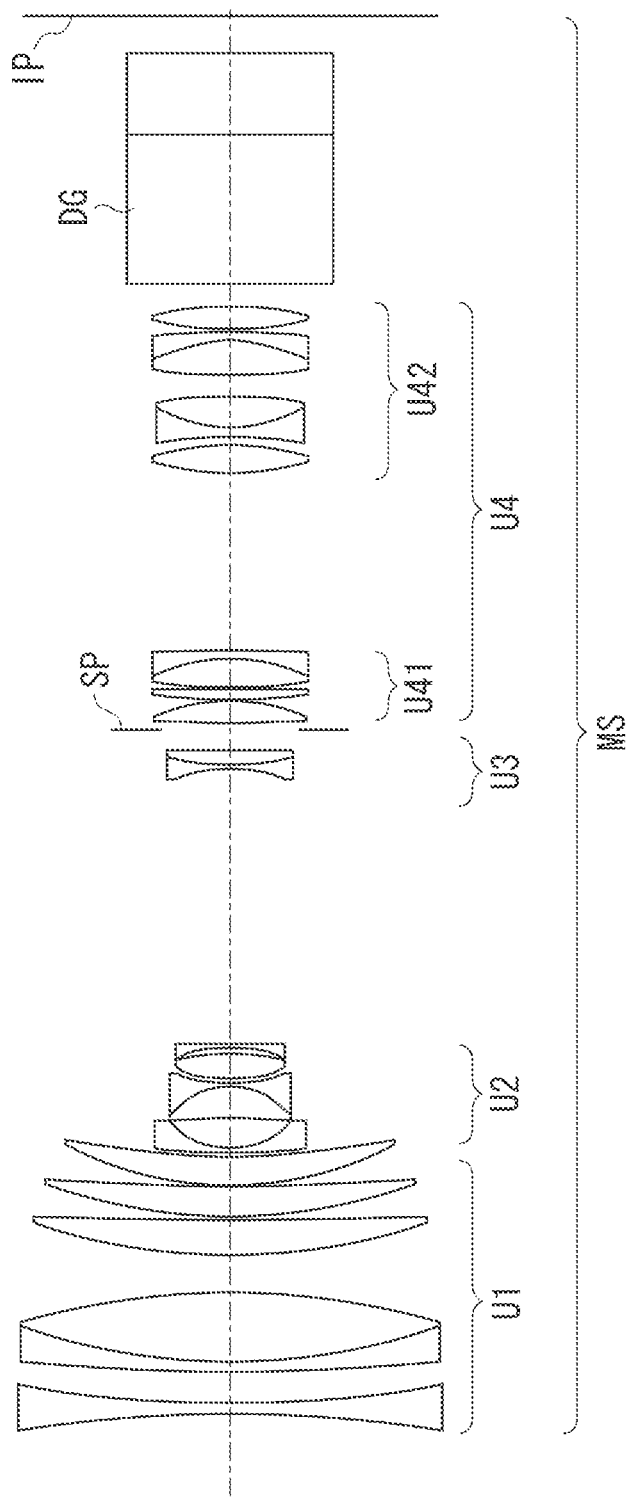
FIG. 2 is a lens cross-sectional diagram illustrating a master lens.

FIG. 2 is a lens cross-sectional diagram illustrating an imaging lens to which the wide-angle converter lens according to the present exemplary embodiment of the invention can be mounted. In this configuration, the above-described wide-angle converter lens can be mounted on the enlargement side (subject side, enlargement conjugate side) of the imaging lens.

Figure 3:
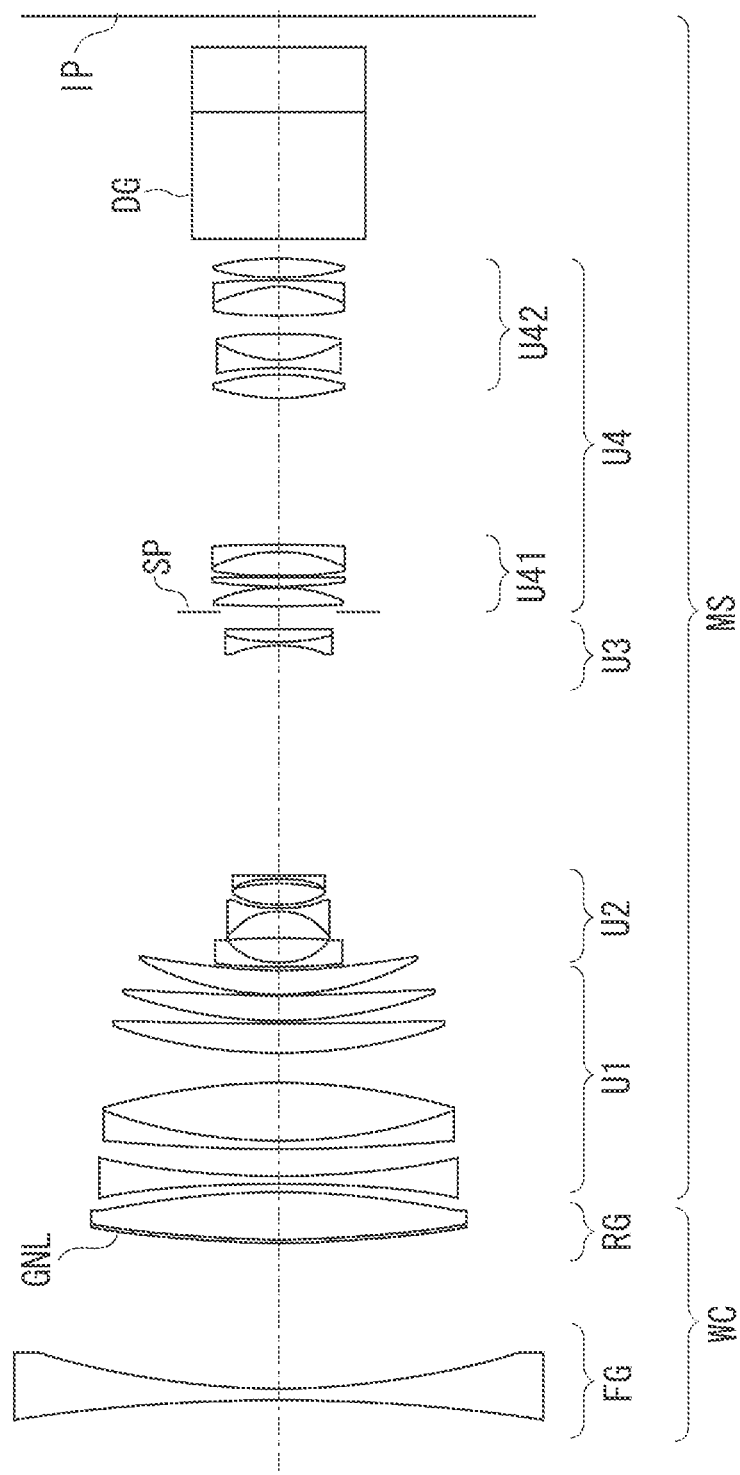
FIG. 3 is a lens cross-sectional diagram illustrating a state where the master lens is mounted on the wide-angle converter lens according to Numerical Example 1.

FIG. 3 is a lens cross-sectional diagram illustrating a case where the wide-angle converter lens according to the first exemplary embodiment is mounted on the object side of the master lens at a distance of 2.00 mm in the optical axis direction. FIGS. 4A and 4B are longitudinal aberration diagrams of the entire system for a wide-angle end and a telephoto end in a case where the wide-angle converter lens according to the first exemplary embodiment is mounted on the master lens. Herein, the entire system denotes a composite optical system of an imaging lens and a wide-angle converter lens in the state where the wide-angle converter lens is mounted on the imaging lens.

Among the lens units constituting the wide-angle converter lens, the first lens unit FG is configured with an element (optical element) having negative refractive power and having a shape of biconcave. In addition, the second lens unit RG is configured with a cemented positive lens where an element (optical element) GNL having negative refractive power and having a shape of meniscus of which the convex surface faces the object side and an element (optical element) having positive refractive power and having a shape of biconvex are cemented in this order. In addition, among the elements constituting the cemented positive lens of the second lens unit RG, the object-side element GNL is formed by using an optical material having anomalous dispersion, and the optical material (1) in Table 1 is used.

With respect to the master lens MS, which is the imaging lens (zoom lens) illustrated in FIG. 2, a variable magnification ratio is 20, and a half angle of view ω in the wide-angle end state is 33.9°. The master lens MS exemplified herein includes, in order from the enlargement side, a first lens unit having positive refractive power, a second lens unit having negative refractive power, a third lens unit having positive refractive power, and a fourth lens unit having positive refractive power. In the exemplary embodiment, during zooming (during the varying of the magnification ratio), the first and fourth lens units are configured to be fixed, and the second and third lens units are configured to be moved.

Herein, the fourth lens unit includes a first lens subunit U41 having positive refractive power and a second lens subunit U42 having positive refractive power, which are separated by the largest air distance in the fourth lens unit. In addition, a stop SP is disposed between the third lens unit and the fourth lens unit, and a glass block DG including a color separation prism, an optical filter, and the like is disposed at the image plane (IP) side (reduction side) rather than the fourth lens unit.

With respect to the imaging lens of which the variable magnification ratio is 10 or more and of which the half angle of view ω in the wide-angle end state is 30° or more, good balance of aberration is achieved over the entire zoom range. Therefore, the wide-angle converter lens mounted on the imaging lens is required to be configured so that good correction of the aberration thereof is achieved.

Next, features of the exemplary embodiment of the invention are described together with conditions.

The wide-angle converter lens according to the present exemplary embodiment has a feature of satisfying the following condition (1):

$$\theta gF\_n > 0.580 \quad (1)$$

The condition (1) defines a reference above which the average value θgF_n of relative partial dispersions of optical elements having negative refractive power in the wide-angle converter lens WC can provide notable advantages, according to each of the exemplary embodiment. As defined in the condition (1), the average value θgF_n of relative partial dispersions of the optical elements having negative refractive power is configured to be higher than a conventional value, so that good achromatic balance is achieved over the entire zoom range.

Herein, the relative partial dispersion θgF and the Abbe number νd are respectively defined by the following expressions (7) and (8):

$$\theta gF = (Ng - NF)/(NF - NC) \quad (7)$$

$$\nu d = (Nd - 1)/(NF - NC) \quad (8)$$

In the expressions (7) and (8), Ng, NF, Nd, and NC are refractive indexes of a material (optical material) with respect to the light of g-line (wavelength 435.8 nm), F-line (wavelength 486.1 nm), d-line (wavelength 587.6 nm), and C-line (wavelength 656.3 nm). In addition, the average value θgF_n of relative partial dispersions expressed in the condition (1) is a value obtained by averaging relative partial dispersions θgF of all the negative optical elements included in the wide-angle converter lens (all the negative optical elements constituting the wide-angle converter lens).

Herein, if the value θgF_n is less than the lower limit of the condition (1), chromatic aberration of magnification at the wide-angle end is insufficiently corrected, and axial chromatic aberration is excessively corrected over the range from the middle zoom range to the telephoto end, so that balance of chromatic aberration is deteriorated. Herein, more desirably, the following condition is satisfied:

$$0.650 > \theta gF\_n > 0.587 \quad (1a)$$

Next, the wide-angle converter lens according to the present exemplary embodiment has a feature where, among the optical elements having negative refractive power constituting the wide-angle converter lens, at least one optical element (first optical element) satisfies the following conditions (2) and (3).

$$\theta gF - (2.35 \times 10^{-3} \times \nu d^2 - 4.11 \times 10^{-3} \times \nu d + 0.7204) > 0 \quad (2)$$

$$\nu d < 30 \quad (3)$$

Herein, the condition (2) defines a relationship between the Abbe number νd and the relative partial dispersion θgF of at least one optical element (material constituting the optical element) described above, and the condition (3) defines the Abbe number νd of at least one optical element (material constituting the optical element) described above. Herein, the Abbe number νd and the relative partial dispersion θgF in the condition (2) are physical quantities defined by the aforementioned expressions (7) and (8). The optical material satisfying the condition (2) is used as a refractive optical element in the optical system, so that good correction of chromatic aberration can be achieved over the wide wavelength range of from g-line to C-line. Herein, more desirably, the following condition may be satisfied:

$$0.200 > \theta gF - (2.35 \times 10^{-3} \times \nu d^2 - 4.11 \times 10^{-3} \times \nu d + 0.7204) > 0.020 \quad (2a)$$

In addition, the condition (3) defines the Abbe number of at least one optical element (optical element having negative refractive power) described above, and thus, it is possible to obtain much better effect of correction of chromatic aberration by satisfying the condition (3). An optical material having strong (high) dispersion is used for the optical element having negative refractive power, so that the dispersion is separated from (has large difference from) the dispersion of the optical element having positive refractive power. Therefore, the effect of correction of the first-order chromatic aberration can be strengthened. In other words, if the upper limit of the condition (3) is exceeded, the correction of the first-order chromatic aberration occurring in the lens having positive refractive power is insufficient, so that there is a disadvantage in terms of achievement of high performance, small-size, and light-weight. Herein, more desirably, the following condition may be satisfied:

$$16.5 < \nu d < 26.0 \quad (3a)$$

In addition, at least one optical element (first optical element, optical element having anomalous dispersion) defined by the conditions (2) and (3) is cemented to the enlargement-side (object side) surface of a positive lens in the second lens unit in the first exemplary embodiment, but the invention is not limited thereto. For example, the optical element may be cemented to the reduction-side surface of the positive lens of the second lens unit, or the optical element may be cemented to the reduction-side surface of a negative lens constituting the first lens unit. In any case, desirably, at least one optical element (optical element having anomalous dispersion) is cemented to the adjacent optical element.

In addition, at least one negative optical element of the wide-angle converter lens according to the present exemplary embodiment includes an optical element (first optical element) having negative refractive power configured with an optical material satisfying the conditions (2) and (3) and an optical element (second optical element) having negative refractive power not satisfying the conditions. The aforementioned condition (1) is an average value of relative partial dispersions of the optical materials constituting the first optical element and relative partial dispersions of the optical materials constituting the second optical element.

In this manner, the wide-angle converter lens according to the present exemplary embodiment has a feature that it includes a refractive optical element (first optical element) configured with an optical material having strong (large) anomalous dispersion and a relationship of achromatism of the wide-angle converter lens WC itself is defined. Accordingly, when the wide-angle converter lens WC is mounted on the master lens MS, it is possible to suppress a change in chromatic aberration before and after the mounting. In addition, herein, the refractive optical element denotes, for example, a refractive lens of which the power is generated due to a refraction function, and thus, the refractive optical element does not include a diffractive optical element of which the power is generated due to a diffraction function.

In addition, although the optical material constituting the aforementioned optical element is in the solid state when an optical system is used, the state of the optical material may be any state before the optical system is used, for example, when it is manufactured. For example, when it is manufactured, the optical material may be a liquid-state material or a solid-state material obtained by curing the liquid-state material. More specifically, the optical material may be a material such as a resin material which is cured with illumination of UV rays or the like. Particularly, it is desirable that at least one optical element (first optical element, an optical element having anomalous dispersion) defined by the conditions (2) and (3) is configured with such a resin material.

Next, more desirably, the wide-angle converter lens according to the present exemplary embodiment may satisfy the following condition (4):

$$10 < ABS[(r1+r2)/(r1-r2)] \qquad (4)$$

where ABS represents the absolute value of the expression within the brackets [ ].

The condition (4) defines a shape factor of at least one optical element (optical element having negative refractive power satisfying the conditions (2) and (3)) described above. If the lower limit of the condition (4) is exceeded, a shape of meniscus of which the radius of curvature is extremely small is formed, so that the incidence or exit angle of an off-axis ray with respect to the lens surface is increased so that high-order aberration occurs. Therefore, it is difficult to correct a reference wavelength or chromatic aberration. Herein, more desirably, the following condition may be satisfied:

$$20 < ABS[(r1+r2)/(r1-r2)] < 80 \qquad (4a)$$

More desirably, the wide-angle converter lens according to the present exemplary embodiment may satisfy the following condition (5):

$$0.7 < \beta < 0.9 \qquad (5)$$

The condition (5) defines a focal length conversion magnification ratio $\beta$ of the wide-angle converter lens WC. The focal length conversion magnification ratio $\beta$ described herein is a value obtained by dividing a focal length (focal length at the wide-angle end) of an imaging lens single body by a composite focal length in the state where the wide-angle converter lens is mounted on the imaging lens (in the wide-angle end state). If the focal length conversion magnification ratio is less than the lower limit of the condition (5), the reduction rate is too large, so that it is difficult to achieve good correction of aberration. In addition, if the focal length conversion magnification ratio is more than the upper limit, it is not possible to obtain a sufficient effect of widening as a wide-angle converter lens. Herein, more desirably, the following condition may be satisfied:

$$0.77 < \beta < 0.85 \qquad (5a)$$

More desirably, the wide-angle converter lens according to the present exemplary embodiment may satisfy the following condition (6):

$$15 < ABS[(\phi p/\phi n\_max] < 150 \qquad (6)$$

The condition (6) defines a relationship between the average value $\phi p$ of refractive powers of the elements having positive refractive power in the wide-angle converter lens WC and the refractive power $\phi n\_max$ of the element having the highest relative partial dispersion $\theta gF$ among the elements having negative refractive power.

If the lower limit of the condition (6) is exceeded, the refractive power of the element of correcting chromatic aberration is stronger than that of a desired condition, so that axial chromatic aberration with respect to g-line at the telephoto end is insufficiently corrected. In the words, it is in the "over"
state, which is not desirable. On the contrary, if the upper limit of the condition (6) is exceeded, the refractive power of the element is weaker than that of the desired condition, so that axial chromatic aberration with respect to g-line at the telephoto end is excessively corrected. In other words, it is in the "under" state, which is not desirable as well. Herein, more desirably, the following condition may be satisfied:

$$17.5 < ABS[\phi p/\phi n\_max] < 45.0 \qquad (6a)$$

As described above, although the wide-angle converter lens according to the present exemplary embodiment has the feature of satisfying the aforementioned conditions (1) to (3), if the conditions (4) to (6) are satisfied, a more desirable wide-angle converter lens can be obtained. Relationships between the conditions (1) and (6) and the first to eighth exemplary embodiments are listed in Table 2.

The wide-angle converter lens according to the present exemplary embodiment is a compact wide-angle converter lens having a small number of constituent lenses and has features of achieving small size and light weight in addition to good correction of chromatic aberration.

Moreover, the exemplary embodiment has a feature where the optical element (first optical element) GNL having negative refractive power configured with an optical material having anomalous dispersion is disposed at a position which is advantageous to correction of chromatic aberration of magnification. The effective disposition of the optical material can be determined by analyzing the paraxial arrangement of the lens. The principal standard of the analysis is a ratio of heights of optical paths of an axial light flux and an off-axis light flux from the optical axis in the lens. In the wide-angle converter lens according to the present exemplary embodiment, the optical element GNL is disposed at the position where a product of the height of the optical path of the axial light flux and the height of the optical path of the off-axis light flux in the paraxial tracking at the wide-angle end is appropriate in a case where the wide-angle converter lens is mounted on the master lens, so that good chromatic balance is achieved. In addition, since the optical material (1) used for the optical element GNL in the exemplary embodiment has very high relative partial dispersion $\theta gF$ of 0.689, chromatic aberration of magnification at the wide-angle end and axial chromatic aberration from the middle zoom range to the telephoto end is effectively corrected.

FIG. 5 is a lens cross-sectional diagram illustrating a state where a wide-angle converter lens according to a second exemplary embodiment of the invention is mounted on an object side of a master lens. FIGS. 6A and 6B are longitudinal aberration diagrams at the zoom position of a wide-angle end and the zoom position of a telephoto end in the state where the wide-angle converter lens according to the second exemplary embodiment is mounted on the master lens at a distance of 2.00 mm on the optical axis.

In the second exemplary embodiment, with respect to a lens configuration similar to that of the first exemplary embodiment, an optical material (2) in Table 1 is used as the optical material having anomalous dispersion. Since the optical material (2) has a very low Abbe number of 17.4 and high dispersion, the sufficient effect of first-order achromatism can be obtained even with a weak refractive power. Therefore, in comparison with a conventional optical material, there are advantages in terms of improvement of axial chromatic aberration and achievement of small size and light weight.

In addition, in Numerical Example 2, good chromatic aberration of magnification is achieved at the wide-angle end, and good axial chromatic aberration is achieved over the entire zoom range.

Figure 7:
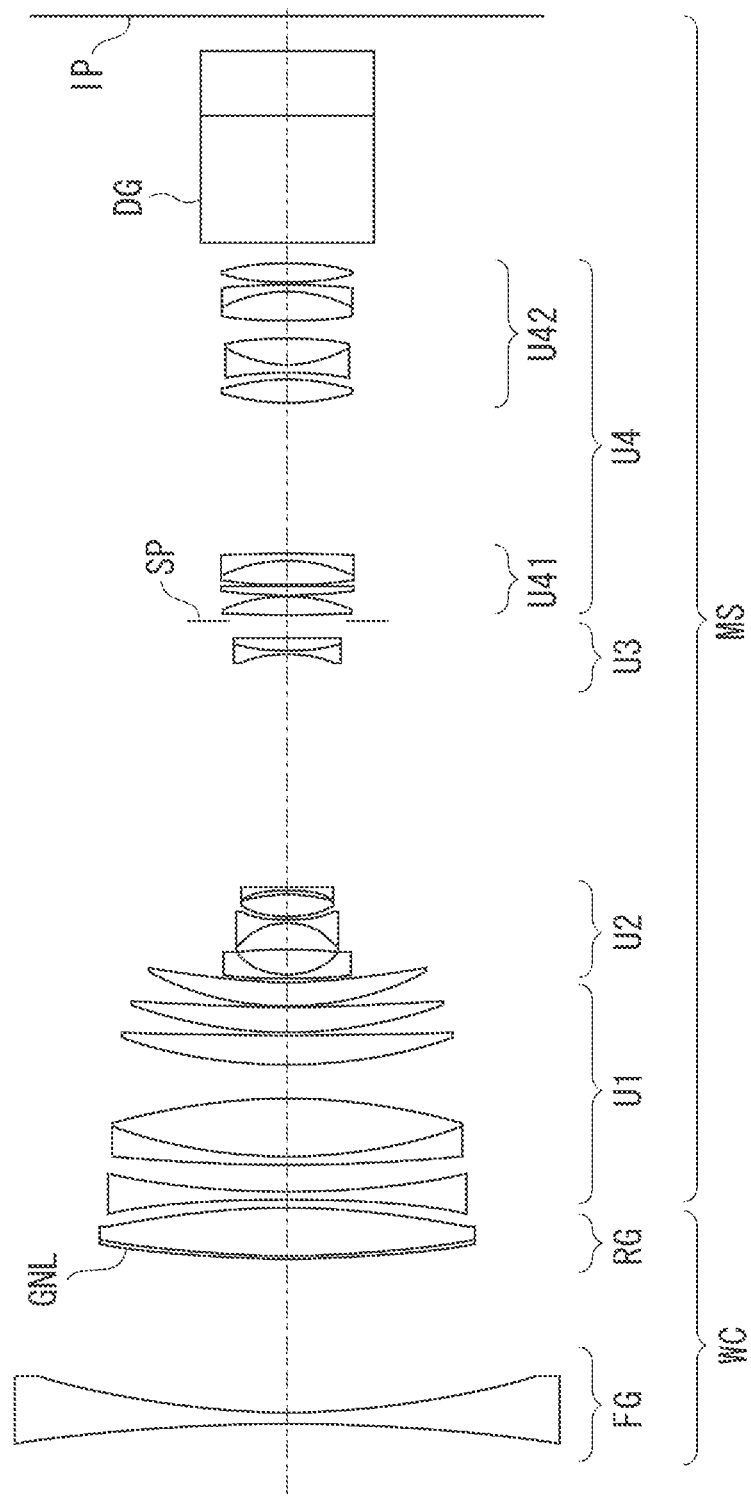
FIG. 7 is a lens cross-sectional diagram illustrating a state where a master lens is mounted on a wide-angle converter lens according to Numerical Example 3.
Figure 8A:
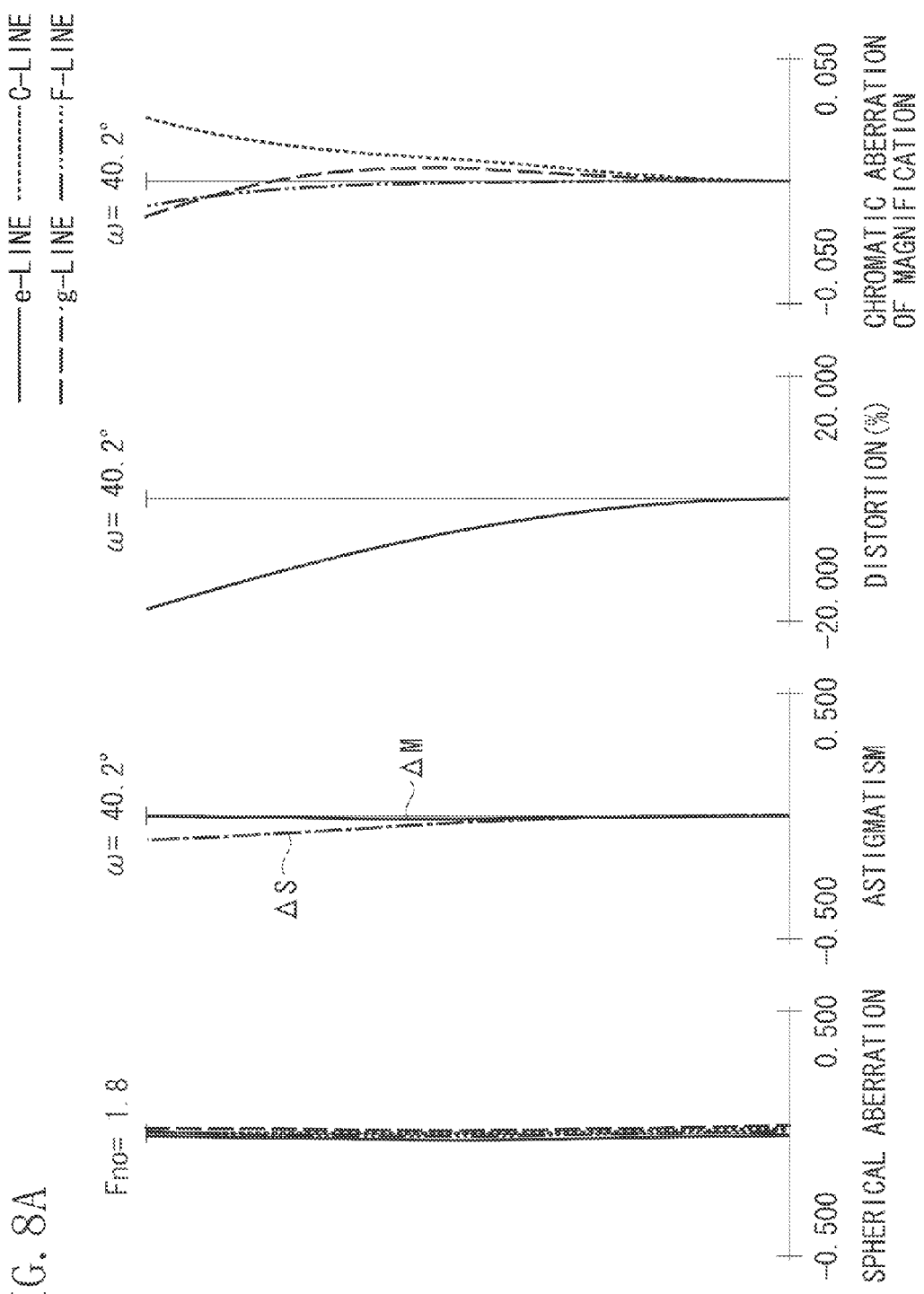
FIG. 8A is a longitudinal aberration diagram for a wide-angle end in the state where the master lens is mounted on the wide-angle converter lens according to Numerical Example 3.

FIG. 7 is a lens cross-sectional diagram illustrating a state where a wide-angle converter lens according to a third exemplary embodiment of the invention is mounted on the object side of a master lens at a distance of 2.00 mm on the optical axis. FIGS. 8A and 8B are longitudinal aberration diagrams at the zoom position of a wide-angle end and the zoom position of a telephoto end in the state where the wide-angle converter lens according to the third exemplary embodiment is mounted on the master lens.

In the third exemplary embodiment, with respect to a lens configuration similar to those of the first and second exemplary embodiments, an optical material (3) in Table 1 is used as the optical material having anomalous dispersion. The optical material (3) has Abbe number of 25.0 and lower dispersion than that of the optical material (2). However, sufficient ability of correction with respect to the amount of chromatic aberration of magnification for g-line at the wide-angle end is secured in comparison with the other embodiments. In addition, since the occurrence of high-order wave components of chromatic aberration of magnification is relatively suppressed, the embodiment is effective to the case where high-order aberration components are desired to be suppressed.

In addition, in Numerical Example 3, good chromatic aberration of magnification is achieved at the wide-angle end, and good axial chromatic aberration is achieved over the entire zoom range.

Figure 9:
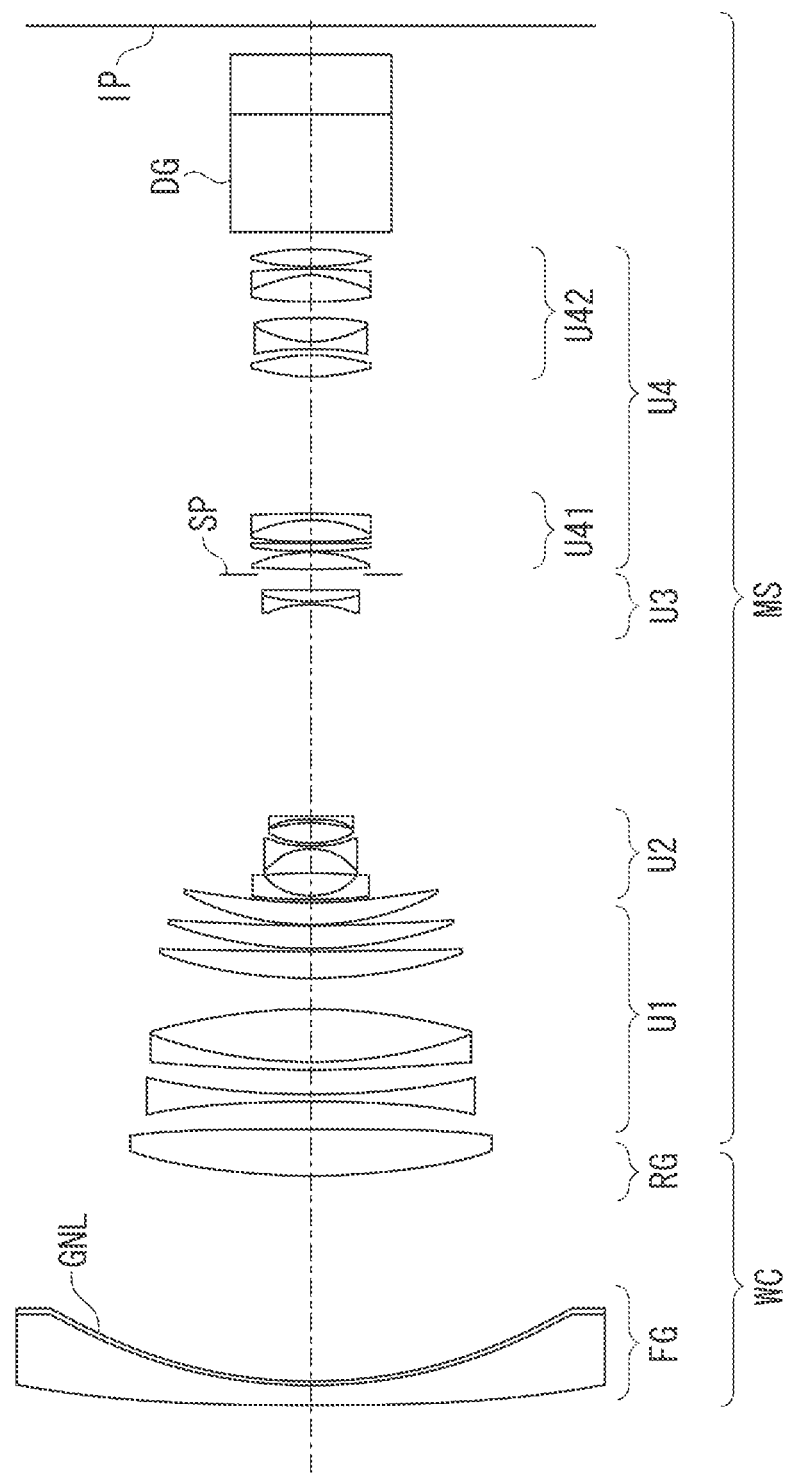
FIG. 9 is a lens cross-sectional diagram illustrating a state where a master lens is mounted on a wide-angle converter lens according to Numerical Example 4.

FIG. 9 is a lens cross-sectional diagram illustrating a state where a wide-angle converter lens according to a fourth exemplary embodiment of the invention is mounted on the object side of a master lens at a distance of 8.00 mm on the optical axis. FIGS. 10A and 10B are longitudinal aberration diagrams at the zoom position of a wide-angle end and the zoom position of a telephoto end in the state where the wide-angle converter lens according to the fourth exemplary embodiment is mounted on the master lens.

In the fourth exemplary embodiment, with respect to a lens configuration similar to those of the first to third exemplary embodiments, the first lens unit FG includes two optical elements having negative refractive power and having a shape of meniscus of which the convex surface faces the object side, and the two adjacent optical elements are cemented to each other. Among the two adjacent optical elements, the optical element (first optical element) at the image plane side is configured with an optical material having strong anomalous dispersion. Therefore, refraction of the light flux on the object-side surface of the element having negative refractive power of the first lens unit FG is suppressed. The occurrence of aberration on the surface of which the height of the optical path of the off-axis light flux from the optical axis is high is suppressed, and refraction is performed on the surface of which the height of the optical path is low, so that off-axis aberration, particularly, aberration such as distortion or curvature of field is effectively suppressed. In addition, an optical element GNL in the embodiment is formed by using an optical material having anomalous dispersion, and the optical material (1) in Table 1 is used.

In addition, in Numerical Example 4, good chromatic aberration of magnification is achieved at the wide-angle end, and good axial chromatic aberration is achieved over the entire zoom range.

Figure 11:
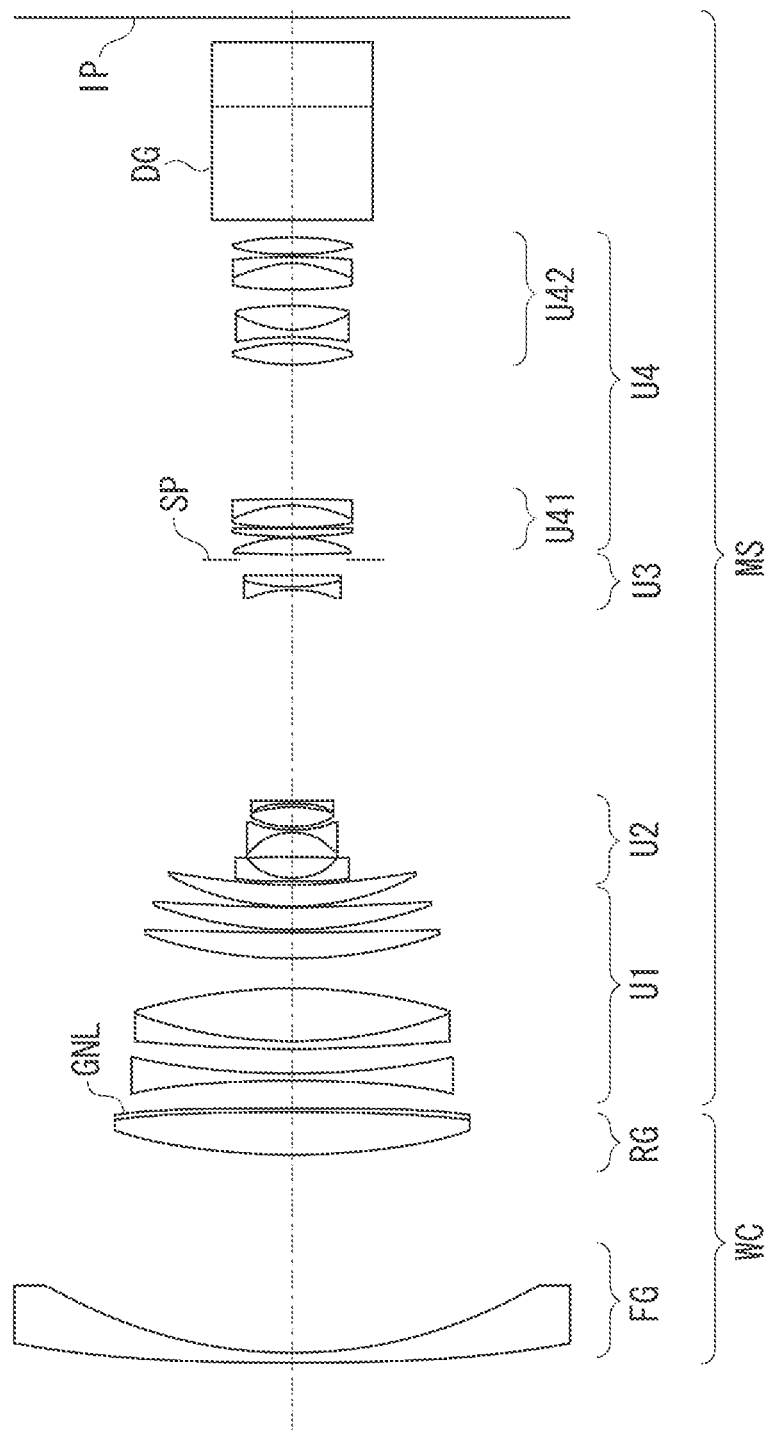
FIG. 11 is a lens cross-sectional diagram illustrating a state where a master lens is mounted on a wide-angle converter lens according to Numerical Example 5.
Figure 12A:
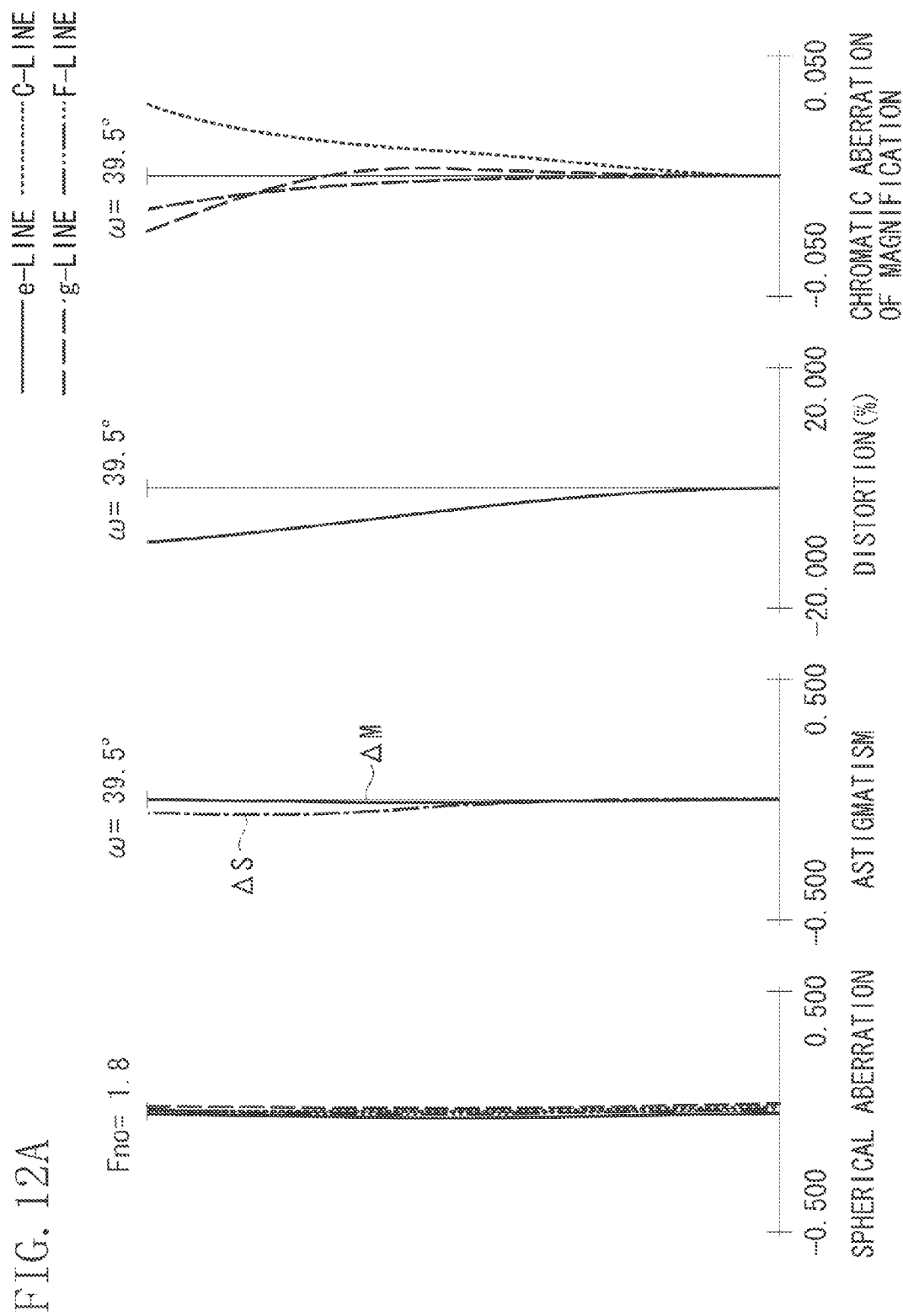
FIG. 12A is a longitudinal aberration diagram for a wide-angle end in the state where the master lens is mounted on the wide-angle converter lens according to Numerical Example 5.

FIG. 11 is a lens cross-sectional diagram illustrating a state where a wide-angle converter lens according to a fifth exemplary embodiment of the invention is mounted on the object side of a master lens at a distance of 7.95 mm on the optical axis. FIGS. 12A and 12B are longitudinal aberration diagrams at the zoom position of a wide-angle end and the zoom position of a telephoto end in the state where the wide-angle converter lens according to the fifth exemplary embodiment is mounted on the master lens.

The fifth exemplary embodiment has a feature where, with respect to a lens configuration similar to those of the first to fourth exemplary embodiments, in the second lens unit, an optical element (first optical element) GNL having negative refractive power configured with an optical material having strong anomalous dispersion is disposed at the closest-image-plane side (reduction side). The optical element GNL having negative refractive power is disposed to have a shape of meniscus of which the convex surface faces the image side. In addition, the wide-angle converter lens according to the present exemplary embodiment is a compact wide-angle converter lens having a small number of constituent lenses, which is configured as a cemented positive lens formed by cementing one element having negative refractive power, a very thin element having negative refractive power, and an element having positive refractive power, and light weight thereof is achieved. In addition, an optical element GNL in the embodiment is formed by using an optical material having anomalous dispersion, and the optical material (1) in Table 1 is used.

In addition, in Numerical Example 5, good chromatic aberration of magnification is achieved at the wide-angle end, and good axial chromatic aberration is achieved over the entire zoom range.

Figure 13:
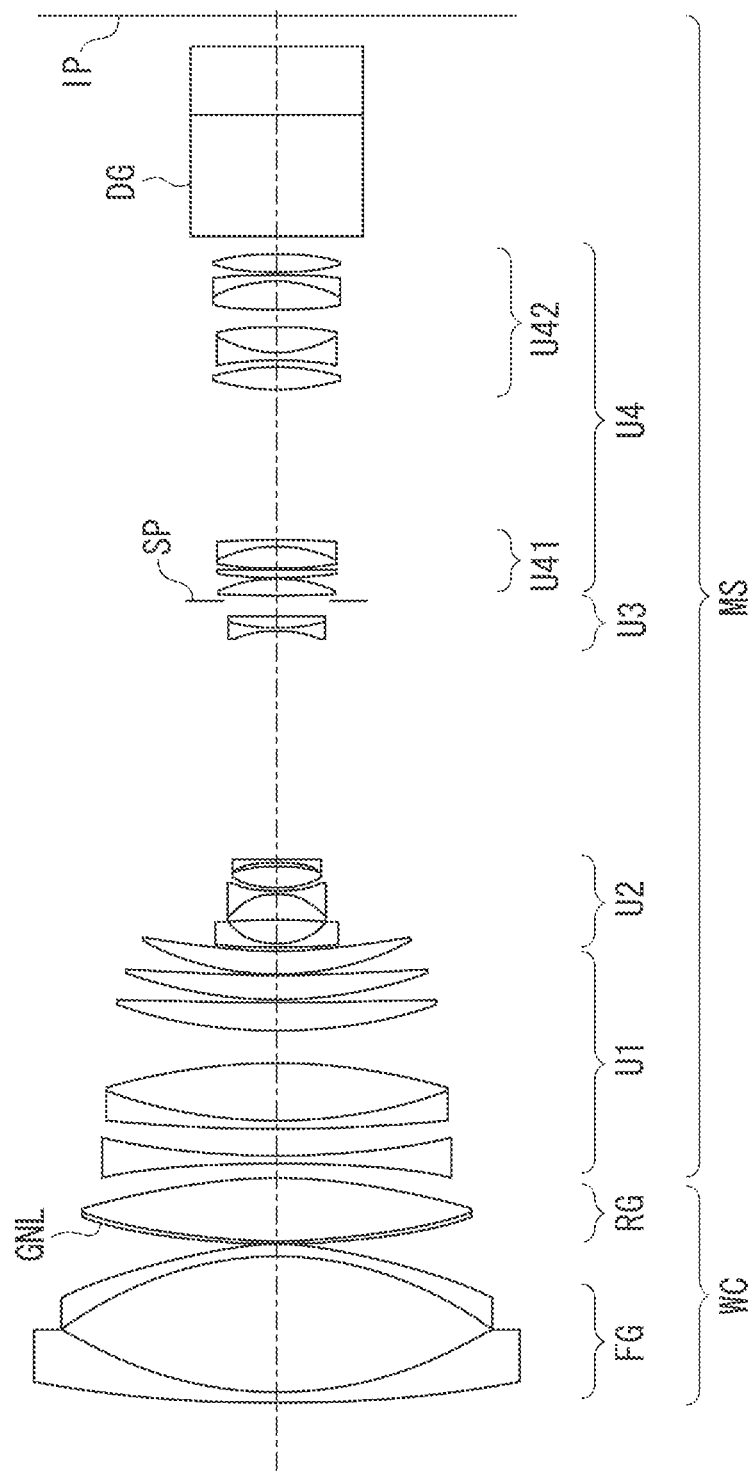
FIG. 13 is a lens cross-sectional diagram illustrating a state where a master lens is mounted on a wide-angle converter lens according to Numerical Example 6.

FIG. 13 is a lens cross-sectional diagram illustrating a state where a wide-angle converter lens according to a sixth exemplary embodiment of the invention is mounted on the object side of a master lens at a distance of 3.48 mm on the optical axis. FIGS. 14A and 14B are longitudinal aberration diagrams at the zoom position of a wide-angle end and the zoom position of a telephoto end in the state where the wide-angle converter lens according to the sixth exemplary embodiment is mounted on the master lens.

In FIG. 13, in the wide-angle converter lens WC constituting a substantially afocal optical system, FG indicates a first negative lens unit having negative refractive power, and RG indicates a second positive lens unit having positive refractive power. The first negative lens unit FG includes, in order from the object side, a negative lens having a shape of meniscus which is convex toward the object side and a negative lens having a shape of meniscus which is convex toward the image plane, and any of the lenses is a single-element lens (non-cemented lens).

In addition, the second positive lens unit RG includes, in order from the object side, an optical element GNL having negative refractive power and having a shape of meniscus of which the convex surface faces the object side and an element having positive refractive power and having a shape of biconvex, and is configured as a cemented positive lens formed by cementing the two lenses. In addition, an optical element GNL in the embodiment is formed by using an optical material having anomalous dispersion, and the optical material (1) in Table 1 is used.

In the present exemplary embodiment, the first negative lens unit includes the two elements having negative refractive power, so that it is possible to divide the refractive power of the element having negative refractive power disposed at the closest-to-object side. Therefore, the curvature of the element having negative refractive power disposed at the closest-to-object side can be loosened, so that it is possible to advantageously correct off-axis aberration such as distortion, curvature of field, or chromatic aberration of magnification.

In addition, in Numerical Example 6, good chromatic aberration of magnification is achieved at the wide-angle end, and good axial chromatic aberration is achieved over the entire zoom range.

Figure 15:
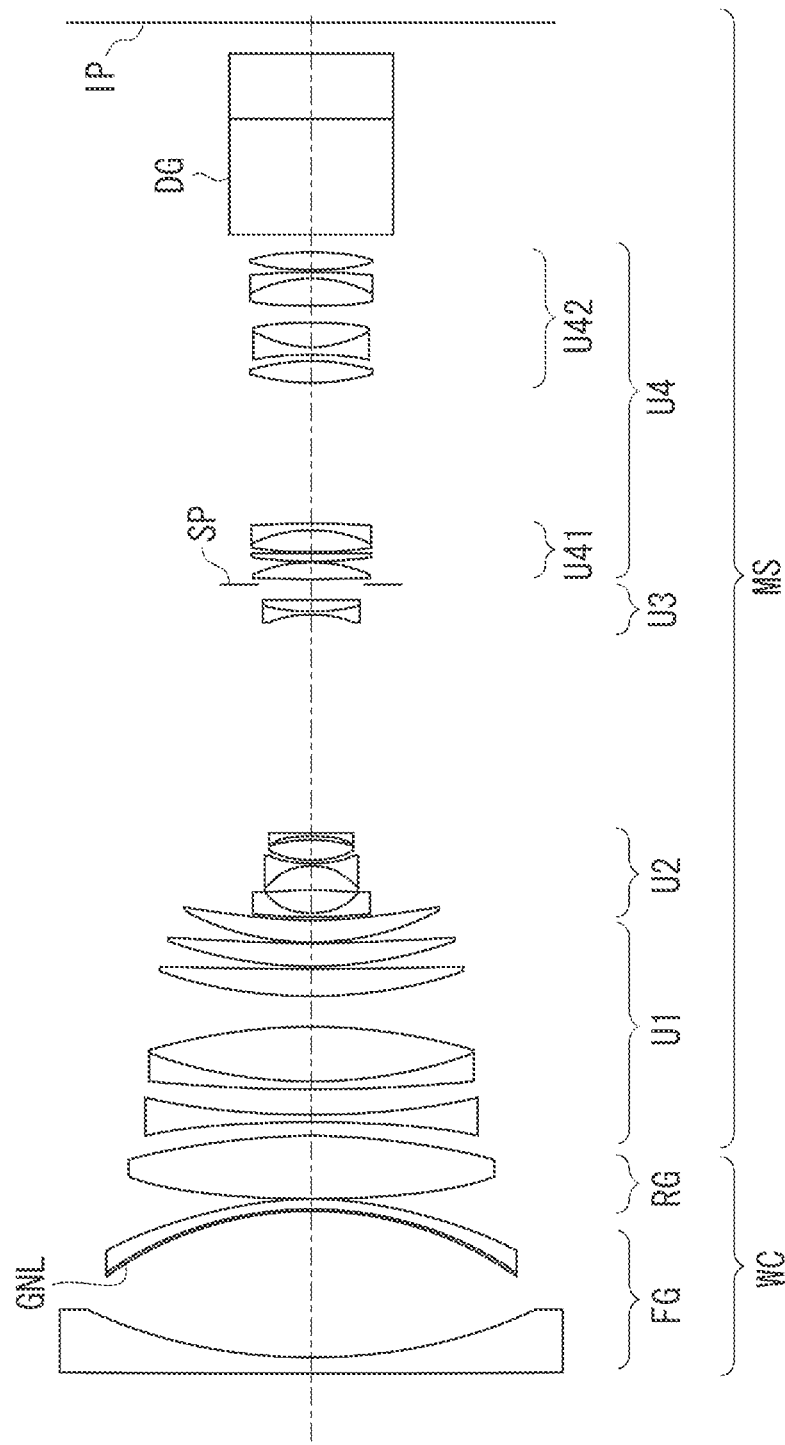
FIG. 15 is a lens cross-sectional diagram illustrating a state where a master lens is mounted on a wide-angle converter lens according to Numerical Example 7.

FIG. 15 is a lens cross-sectional diagram illustrating a state where a wide-angle converter lens according to a seventh exemplary embodiment of the invention is mounted on the object side of a master lens at a distance of 3.48 mm on the optical axis. FIGS. 16A and 16B are longitudinal aberration diagrams at the zoom position of a wide-angle end and the zoom position of a telephoto end in the state where the wide-angle converter lens according to the seventh exemplary embodiment is mounted on the master lens.

The seventh exemplary embodiment has a feature where, with respect to a lens configuration similar to that of the sixth exemplary embodiment, a cemented negative lens formed by cementing two elements having negative refractive power and having a shape of meniscus of which the convex surface faces the image side is disposed in the first lens unit FG. Among the two elements (optical elements) having negative refractive power, the optical element GNL disposed at the object side (enlargement side) is formed by using an optical material (1) having anomalous dispersion (having strong anomalous dispersion) and is disposed at the position close to the object, so that chromatic aberration of magnification can be effectively corrected. Herein, the optical element GNL configured by using an optical material having anomalous dispersion may be cemented to any one lens in the first lens unit FG configured with the two negative lenses from the closest-to-object side. In other words, the optical element GNL may be cemented to the image plane side of the negative lens disposed at the closest-to-object side.

In addition, in Numerical Example 7, good chromatic aberration of magnification is achieved at the wide-angle end, and good axial chromatic aberration is achieved over the entire zoom range.

Figure 17:
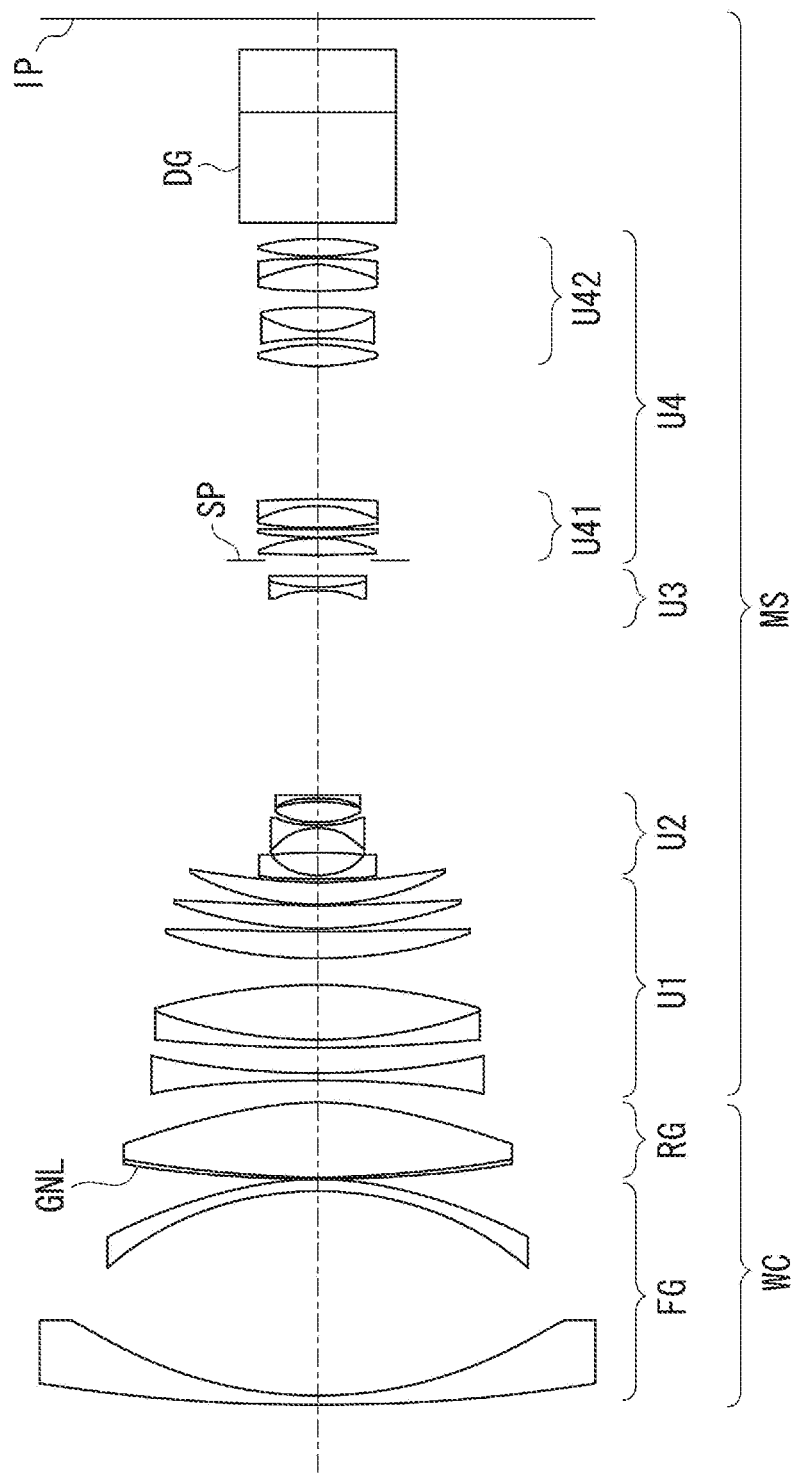
FIG. 17 is a lens cross-sectional diagram illustrating a state where a master lens is mounted on a wide-angle converter lens according to Numerical Example 8.
Figure 18B:
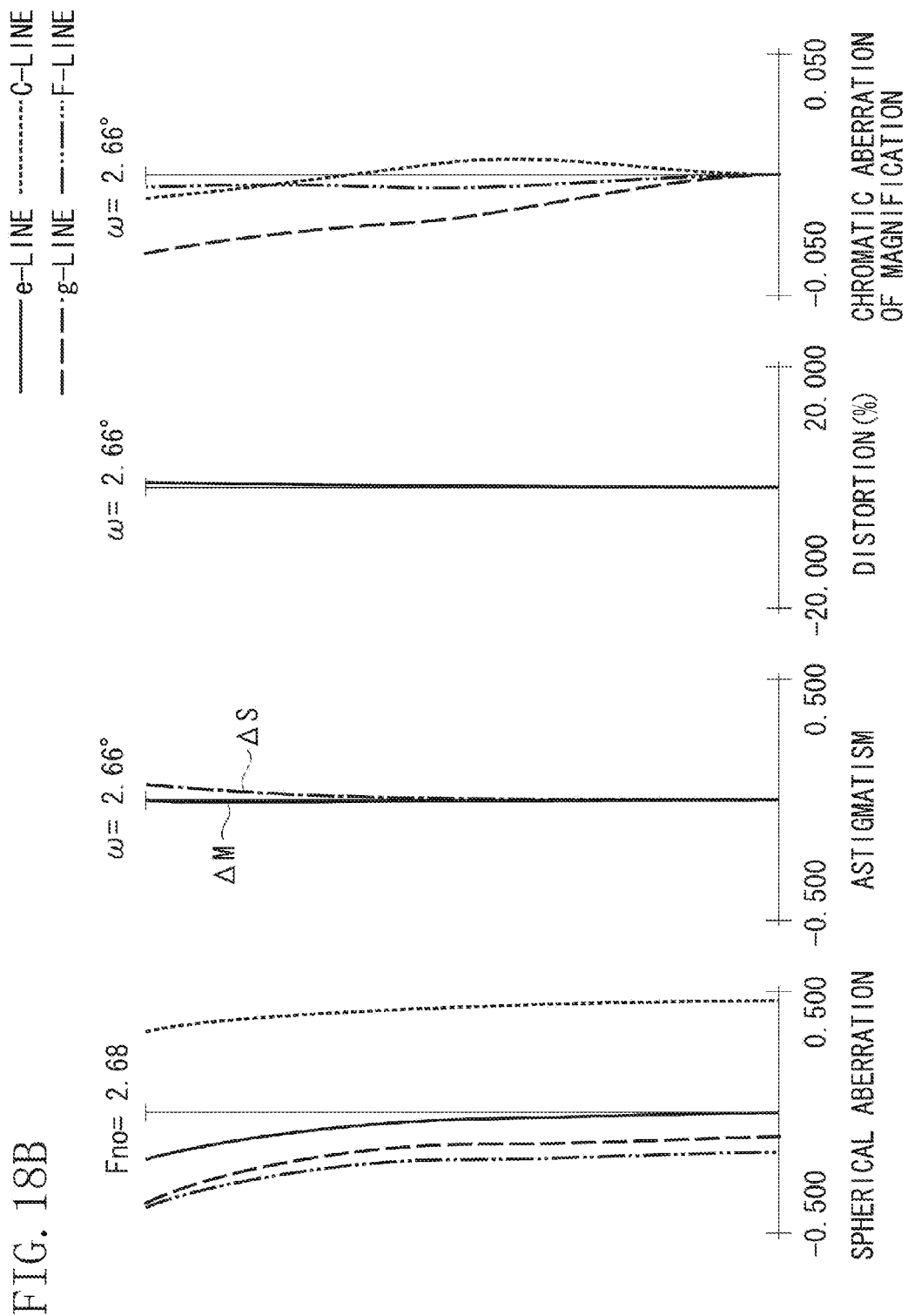
FIG. 18B is a longitudinal aberration diagram for a telephoto end in the state where the master lens is mounted on the wide-angle converter lens according to Numerical Example 8.

FIG. 17 is a lens cross-sectional diagram illustrating a state where a wide-angle converter lens according to an eighth exemplary embodiment of the invention is mounted on the object side of a master lens at a distance of 6.70 mm on the optical axis. FIGS. 18A and 18B are longitudinal aberration diagrams at the zoom position of a wide-angle end and the zoom position of a telephoto end in the state where the wide-angle converter lens according to the eighth exemplary embodiment is mounted on the master lens.

The eighth exemplary embodiment has a feature where, with respect to a lens configuration similar to those of the sixth and seventh exemplary embodiments, the focal length conversion magnification ratio is 0.717 and the angle of view of the master lens can be greatly enlarged.

In the present exemplary embodiment, the first negative lens unit FG includes, in order from the object side, a negative lens having a shape of meniscus which is convex toward the object side and a negative lens having a shape of meniscus which is convex toward the image side (two negative lenses), so that it is possible to divide the refractive power of the element having negative refractive power disposed at the closest-to-object side. Therefore, the curvature of the element having negative refractive power disposed at the closest-to-object side can be loosened, so that it is possible to advantageously correct off-axis aberration such as distortion. In addition, herein, although any one of the two negative lenses constituting the first negative lens unit FG is a single-element lens (non-cemented lens), other lenses may be cemented thereto.

In addition, an optical element GNL having anomalous dispersion in the present exemplary embodiment is formed by using the optical material (1) in Table 1, is disposed at the closest-to-object side of the second lens unit RG, and is cemented to the object-side surface of the positive lens in the second lens unit.

In addition, in Numerical Example 8, good chromatic aberration of magnification is achieved at the wide-angle end, and good axial chromatic aberration is achieved over the entire zoom range.

In the exemplary embodiment of the invention, by increasing the number of constituent lenses, much better correction of aberration can be achieved, and the focal length conversion magnification ratio can be reduced.

Numerical data of the wide-angle converter lens WC and the master lens MS of each of the exemplary embodiments are listed hereinafter. In the data, r denotes a radius of curvature of each lens surface; d denotes an intersurface distance between lens surfaces; nd denotes a refractive index of each lens with respect to d-line; and vd denotes Abbe number of each lens.

In each aspheric surface, a conic constant is denoted by k (where k is a number that describes a conic surface, being zero for a sphere, −1 for a paraboloid, and with other values to describe any conic of revolution); aspherical polynomial order coefficients are denoted by A2, A3, A4, A5, A6, A7, A8, A9, A10, A11 and A12, which are respectively the 2th, 3rd, 4th, 6th, 8th, 10th, 11th and 12th order coefficient respectively. In addition, when a coordinate in the optical axis direction, a coordinate in the direction perpendicular to the optical axis, a reference radius of curvature, the conic constant, and n-th order aspheric coefficient are denoted as x, y, R, k, and An, respectively, the aspherical shape is expressed by the following equation (25). Herein, "e−x" denotes "×10$^{-x}$". In addition, with respect to a lens surface having an aspherical surface, mark * is appended to the left side of the surface number in each table.

$$x=(y^2/r)/\{1+(1-k\cdot y^2/r^2)^{0.5}\}+A2\cdot y^2+A3\cdot y^3+A4\cdot y^4+A5\cdot y^5+A6\cdot y^6+A7\cdot y^7+A8\cdot y^8+A9\cdot y^9+A10\cdot y^{10}+A11\cdot y^{11}+A12\cdot y^{12} \quad (25)$$

| Data of Surface | | | | |
|---|---|---|---|---|
| Surface Number | r | d | nd | vd |
| (Numerical Example 1) | | | | |
| 1 | −423.641 | 2.80 | 1.75500 | 52.3 |
| 2 | 195.315 | 35.10 | | |
| 3 | 300.156 | 0.50 | 1.63555 | 22.7 |
| 4 | 280.120 | 11.53 | 1.51742 | 52.4 |
| 5 | −209.003 | | | |
| (Numerical Example 2) | | | | |
| 1 | −423.492 | 2.80 | 1.75500 | 52.3 |
| 2 | 206.980 | 38.08 | | |
| 3 | 300.002 | 0.50 | 1.94087 | 17.4 |
| 4 | 280.120 | 11.53 | 1.51742 | 52.4 |
| 5 | −210.994 | | | |
| (Numerical Example 3) | | | | |
| 1 | −423.592 | 2.80 | 1.75500 | 52.3 |
| 2 | 199.795 | 36.15 | | |
| 3 | 300.112 | 0.50 | 1.78000 | 25.0 |
| 4 | 280.002 | 11.53 | 1.51742 | 52.4 |
| 5 | −209.941 | | | |
| (Numerical Example 4) | | | | |
| 1 | 563.779 | 5.65 | 1.74320 | 49.3 |
| 2 | 130.407 | 0.50 | 1.63555 | 22.7 |
| 3 | 125.123 | 53.94 | | |

-continued

Data of Surface

| Surface Number | r | d | nd | vd |
|---|---|---|---|---|
| 4 | 174.496 | 12.00 | 1.51742 | 52.4 |
| 5 | −722.670 | | | |

(Numerical Example 5)

| | | | | |
|---|---|---|---|---|
| 1 | 587.214 | 2.70 | 1.75500 | 52.3 |
| 2 | 134.533 | 52.26 | | |
| 3 | 181.548 | 11.52 | 1.51742 | 52.4 |
| 4 | −620.001 | 0.50 | 1.63555 | 22.7 |
| 5 | −726.557 | | | |

(Numerical Example 6)

| | | | | |
|---|---|---|---|---|
| 1 | 350.249 | 2.70 | 1.78800 | 47.4 |
| 2 | 98.686 | 33.00 | | |
| 3 | −82.372 | 2.40 | 1.51633 | 64.1 |
| 4 | −111.794 | 0.15 | | |
| 5 | 190.125 | 0.50 | 1.63555 | 22.7 |
| 6 | 185.086 | 16.04 | 1.50137 | 56.4 |
| 7 | −138.605 | | | |

(Numerical Example 7)

| | | | | |
|---|---|---|---|---|
| 1 | 1493.110 | 3.70 | 1.77250 | 49.6 |
| 2 | 134.933 | 36.83 | | |
| 3 | −97.046 | 0.20 | 1.63555 | 22.7 |
| 4 | −98.971 | 3.40 | 1.51633 | 64.1 |
| 5 | −123.407 | 0.15 | | |
| 6 | 266.802 | 15.86 | 1.57250 | 57.7 |
| 7 | −178.083 | | | |

(Numerical Example 8)

| | | | | |
|---|---|---|---|---|
| 1 | 472.330 | 2.70 | 1.81600 | 46.6 |
| 2 | 113.980 | 54.05 | | |
| 3 | −86.511 | 2.40 | 1.51633 | 64.1 |
| 4 | −117.685 | 0.44 | | |
| 5 | 334.547 | 0.30 | 1.63555 | 22.7 |
| 6 | 326.151 | 20.00 | 1.50137 | 56.4 |
| 7 | −128.255 | | | |

(Master Lens) Data of Surface

| Surface Number | r | d | nd | vd |
|---|---|---|---|---|
| 1 | −246.922 | 1.80 | 1.74950 | 35.3 |
| 2 | 232.273 | 6.64 | | |
| 3 | 465.881 | 1.80 | 1.80518 | 25.4 |
| 4 | 122.384 | 13.88 | 1.60300 | 65.4 |
| 5 | −157.716 | 7.49 | | |
| 6 | 121.536 | 7.47 | 1.49700 | 81.5 |
| 7 | 4916.806 | 0.15 | | |
| 8 | 105.098 | 6.38 | 1.60300 | 65.4 |
| 9 | 482.600 | 0.15 | | |
| 10 | 69.519 | 5.86 | 1.72916 | 54.7 |
| 11 | 158.452 | (Variable) | | |
| 12* | 228.519 | 0.70 | 1.88300 | 40.8 |
| 13 | 16.094 | 5.93 | | |
| 14 | −123.222 | 6.59 | 1.80518 | 25.4 |
| 15 | −15.129 | 0.70 | 1.75500 | 52.3 |
| 16 | 30.692 | 0.68 | | |
| 17 | 23.413 | 5.61 | 1.60342 | 38.0 |
| 18 | −39.635 | 0.88 | | |
| 19 | −24.853 | 0.70 | 1.83481 | 42.7 |
| 20 | −134.691 | (Variable) | | |
| 21 | −28.312 | 0.70 | 1.74320 | 49.3 |
| 22 | 46.740 | 2.80 | 1.84666 | 23.8 |
| 23 | −2634.956 | (Variable) | | |
| 24(Stop) | ∞ | 1.30 | | |
| 25 | 360.024 | 4.38 | 1.65844 | 50.9 |
| 26 | −34.891 | 0.15 | | |
| 27 | 93.089 | 2.20 | 1.51633 | 64.1 |

(Master Lens) Data of Surface

| Surface Number | r | d | nd | vd |
|---|---|---|---|---|
| 28 | −3728.151 | 0.15 | | |
| 29 | 89.504 | 6.00 | 1.51633 | 64.1 |
| 30 | −32.080 | 1.80 | 1.83400 | 37.2 |
| 31 | −210.910 | 35.20 | | |
| 32 | 50.755 | 5.88 | 1.51633 | 64.1 |
| 33 | −53.480 | 1.67 | | |
| 34 | −77.656 | 1.80 | 1.83481 | 42.7 |
| 35 | 28.900 | 6.25 | 1.51742 | 52.4 |
| 36 | −88.443 | 4.17 | | |
| 37 | 86.742 | 6.93 | 1.48749 | 70.2 |
| 38 | −30.504 | 1.80 | 1.83400 | 37.2 |
| 39 | −143.178 | 0.18 | | |
| 40 | 52.448 | 4.90 | 1.51823 | 58.9 |
| 41 | −70.716 | 4.50 | | |
| 42 | ∞ | 30.00 | 1.60342 | 38.0 |
| 43 | ∞ | 16.20 | 1.51633 | 64.2 |
| 44 | ∞ | (Variable) | | |
| Image Plane | ∞ | | | |

Data of Aspherical Surface 12th Surface

K = 8.58860e+000   A4 = 7.05382e−006   A6 = −1.80303e−008
A8 = 7.49637e−011   A10 = −8.01854e−013   A12 = 5.80206e−015
A3 = −4.50041e−007   A5 = 1.66019e−008   A7 = −8.87373e−010
A9 = 1.99340e−011   A11 = −1.17115e−013

| | | | |
|---|---|---|---|
| Focal Length | 8.2 | 33.29 | 164 |
| F Number | 1.8 | 1.8 | 2.68 |
| d12 | 0.66 | 36.64 | 53.04 |
| d23 | 55.23 | 13.88 | 5.98 |
| d26 | 4.4 | 9.77 | 1.28 |
| d47 | 7.5 | 7.5 | 7.5 |
| Image Size IS | 11 | 11 | 11 |

TABLE 1

| | Optical Material | | | | | |
|---|---|---|---|---|---|---|
| | (1) | (2) | (3) | (4) | (5) | (6) |
| d-Line Refractive Index | 1.6356 | 1.94090 | 1.7800 | 2.1435 | 1.6959 | 1.80809 |
| g-Line Refractive Index | 1.6753 | 2.01680 | 1.8221 | 2.2323 | 1.7516 | 1.85590 |
| C-Line Refractive Index | 1.6281 | 1.92590 | 1.7712 | 2.1256 | 1.6853 | 1.79801 |
| F-Line Refractive Index | 1.6560 | 1.98010 | 1.8024 | 2.1900 | 1.7247 | 1.83351 |
| vd | 22.7 | 17.4 | 25.0 | 17.8 | 17.7 | 22.8 |
| θgd | 1.422 | 1.402 | 1.350 | 1.380 | 1.415 | |
| θgF | 0.689 | 0.678 | 0.633 | 0.659 | 0.686 | 0.631 |

TABLE 2

| Condition | Numerical Example | | | | | | | |
|---|---|---|---|---|---|---|---|---|
| | 1 | 2 | 3 | 4 | 5 | 6 | 7 | 8 |
| (1) | 0.618 | 0.613 | 0.590 | 0.621 | 0.618 | 0.593 | 0.592 | 0.594 |
| (2) | 0.04979 | 0.02200 | 0.00066 | 0.04979 | 0.04979 | 0.04979 | 0.04979 | 0.04979 |
| (3) | 22.7 | 17.37 | 25 | 22.7 | 22.7 | 22.7 | 22.7 | 22.7 |
| (4) | 29.0 | 29.0 | 28.8 | 48.4 | 12.6 | 74.5 | 101.8 | 78.7 |
| (5) | 0.79 | 0.79 | 0.8 | 0.8 | 0.81 | 0.8 | 0.8 | 0.717 |
| (6) | 28.4 | 19.2 | 23.1 | 18.4 | 24.3 | 71.2 | 43.0 | 110.6 |

Figure 20:
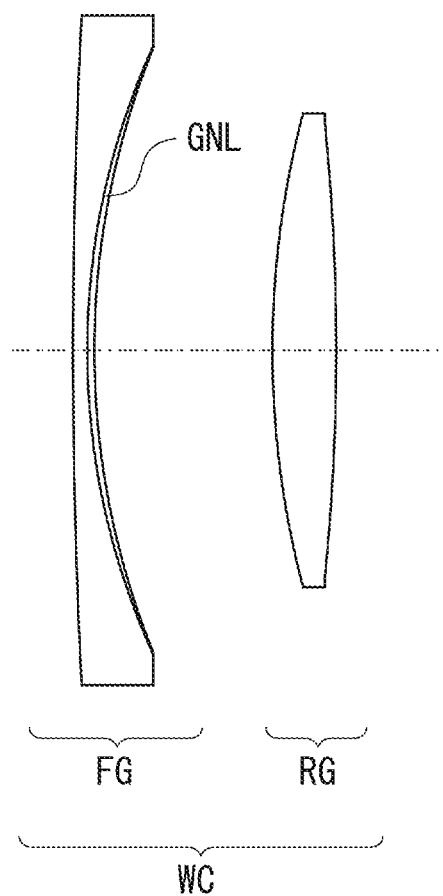
FIG. 20 is a lens cross-sectional diagram illustrating a wide-angle converter lens according to Numerical Example 9.

FIG. 20 is a cross-sectional diagram illustrating a wide-angle converter lens according to a ninth exemplary embodiment (Numerical Example 9) of the invention. The wide-angle converter lens is a lens capable of being detachably mounted on an enlargement side (object side, enlargement conjugate side) of an imaging lens. Herein, the wide-angle converter lens WG constitutes a substantially afocal optical system and includes, in order from the enlargement side to a reduction side (image plane side, master lens side, reduction conjugate side), a first lens unit FG having negative refractive power and a second lens unit RG having positive refractive power. The first lens unit (first optical unit) and the second lens unit (second optical unit) are disposed in the wide-angle converter lens so that the largest air distance is interposed therebetween. However, the configuration where the first lens unit and the second lens unit are disposed so that the largest air distance is interposed therebetween is an example of the invention, but the invention is not limited thereto.

Figure 21:
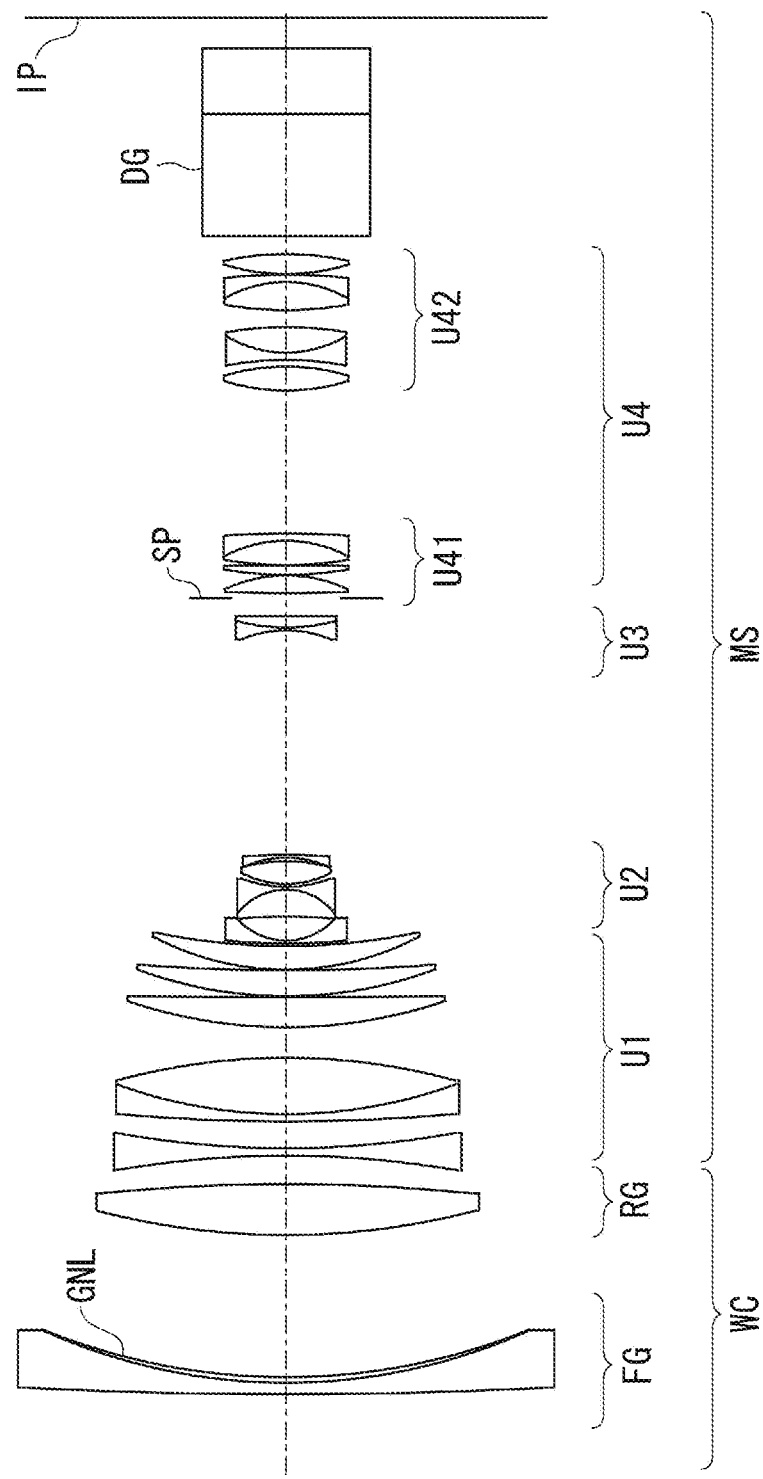
FIG. 21 is a lens cross-sectional diagram illustrating a state where the wide-angle converter lens according to Numerical Example 9 is mounted on a master lens.

FIG. 21 is a lens cross-sectional diagram illustrating a state where the wide-angle converter lens according to the ninth exemplary embodiment is mounted on the object side of a master lens at a distance of 7.00 mm on the optical axis. FIGS. 22A and 22B are longitudinal aberration diagrams at the zoom position of a wide-angle end and the zoom position of a telephoto end in the state where the wide-angle converter lens according to the ninth exemplary embodiment is mounted on the master lens.

The first lens unit FG in the wide-angle converter lens is configured as a cemented lens formed by cementing an optical element having negative refractive power and an optical element having positive refractive power. Herein, the optical element having negative refractive power has a shape of meniscus of which the convex surface faces the object side (enlargement side) (meniscus lens), and the optical element GNL having positive refractive power has a shape of meniscus of which the convex surface faces the object side (meniscus lens). In addition, the second lens unit RG is configured with an element (optical element) having positive refractive power and having a shape of biconvex. In other words, the second lens unit is configured with a single-element lens having positive refractive power. In addition, among the elements (optical elements) constituting a cemented negative lens in the first lens unit FG, an image-plane-side element (optical element) GNL is formed by using an optical material having anomalous dispersion, and the optical material (1) in Table 1 is used.

Next, the features of the exemplary embodiment together with the conditions will be described.

The wide-angle converter lens according to the present exemplary embodiment has a feature of satisfying the following condition (9):

$$\theta gF\_p > 0.580 \quad (9)$$

The condition (9) defines a range of the average value $\theta gF\_p$ of relative partial dispersions of the elements having positive refractive power in the wide-angle converter lens WC of each exemplary embodiment. As defined by the condition (9), the average value $\theta gF\_p$ of relative partial dispersions of the elements having positive refractive power is set to be higher than the conventional value, so that good achromatic balance is achieved over the entire zoom range.

Herein, the relative partial dispersion $\theta gF$ and the Abbe number $vd$ described below are defined by expressions (7) and (8) described above.

In addition, the average value $\theta gF\_p$ of the relative partial dispersion expressed in the condition (9) is a value obtained by averaging the relative partial dispersion $\theta gF$ of all the positive optical elements included in the wide-angle converter (constituting the wide-angle converter). It should be noted that the average value $\theta gF\_p$ of relative partial dispersions of the elements having positive refractive power, as defined by condition (9), is similar in value to the average value $\theta gF\_n$ of relative partial dispersions of the optical elements having negative refractive power. Accordingly, it can summarized that an average value of relative partial dispersions of the first optical element and all optical elements of which the sign of refractive power is the same as that of the first optical element is denoted by $\theta gF\_ave$, a relative partial dispersion of the first optical element is denoted by $\theta gF1$, and an Abbe number of the first optical element is denoted by $vd1$, regardless of whether the optical power of the first optical element is positive or negative.

Herein in condition (9) similar to condition (1), if the value $\theta gF\_p$ is lower than the lower limit of the condition (9), chromatic aberration of magnification at the telephoto end is insufficiently corrected, so that the variation of chromatic aberration of magnification caused by zooming may not be sufficiently suppressed. Herein, more desirably, the following condition may be satisfied:

$$0.650 > \theta gF\_p > 0.587 \quad (9a)$$

Next, when the relative partial dispersion and Abbe number of at least one optical element (first optical element) among the optical elements having positive refractive power constituting the wide-angle converter lens according to the present exemplary embodiment are denoted by $\theta gF$ and $vd$, respectively, the following conditions are satisfied:

$$\theta gF - (2.35 \times 10^{-5} \times vd^2 - 4.11 \times 10^{-3} \times vd + 0.7204) > 0 \quad (10)$$

$$vd < 30 \quad (11)$$

An optical material (optical material of the first optical element) satisfying the condition (10) described above is used in the wide-angle converter lens, so that good correction of chromatic aberration can be achieved over a wide wavelength range of g-line to C-line. Herein, more desirably, the following condition may be satisfied:

$$0.200 > \theta gF - (2.35 \times 10^{-5} \times vd^2 - 4.11 \times 10^{-3} \times vd + 0.7204) > 0.020 \quad (10a)$$

In addition, the optical material (optical material of the first optical element) satisfies the condition (11), so that the effect of better correction of chromatic aberration can be achieved. Herein, if the upper limit of the condition (11) is exceeded, chromatic aberration occurring in the lens having negative refractive power is insufficiently corrected, so that good optical performance may not be obtained. Herein, more desirably, the following condition may be satisfied:

$$16.5 < vd < 26.0 \quad (11a)$$

In addition, at least one optical element (first optical element, optical element having anomalous dispersion) defined by the conditions (10) and (11) described above is cemented to the reduction-side (image-plane-side) surface of a negative lens in the first lens unit in the ninth exemplary embodiment, but the invention is not limited thereto. For example, the optical element may be cemented to the reduction-side surface or the enlargement-side surface of a positive lens in the second lens unit, or the optical element may be cemented to the enlargement-side surface of a negative lens constituting the first lens unit. In any case, it is desirable that at least one optical element (optical element having anomalous dispersion, first optical element) is cemented to the adjacent optical element. However, the optical element may be a single-element lens (non-cemented lens). In addition, herein, the adjacent optical element is an optical element which is disposed in the vicinity thereof on the optical axis of the optical system.

In addition, the optical element having positive refractive power of the wide-angle converter lens according to the present exemplary embodiment includes an optical element (first optical element) having positive refractive power configured with an optical material satisfying the conditions (10) and (11) and an optical element (second optical element) having positive refractive power not satisfying the conditions. The aforementioned condition (9) is an average value of relative partial dispersion of the optical material constituting the first optical element and relative partial dispersion of the optical material constituting the second optical element.

In addition, herein, the optical element having anomalous dispersion (first optical element) is a refractive optical element, and thus, the optical element does not include a diffractive optical element of which the power is generated due to a diffraction function. In addition, although the optical material constituting the optical element having anomalous dispersion is in the solid state when an optical system is used, the state before the optical system is used, for example, when it is manufactured, may be any state. For example, when it is manufactured, the optical material may be a liquid-state material or a solid-state material obtained by curing the liquid-state material. More specifically, the optical material may be a material such as a resin material which is cured with illumination of UV rays or the like. Particularly, it is desirable that at least one optical element (first optical element, optical element having anomalous dispersion) defined by the conditions (10) and (11) be configured with such a resin material.

In addition, hereinafter, the desirable conditions which are to be satisfied by the wide-angle converter lens according to the present exemplary embodiment will be described.

When the refractive power of the element having the highest refractive power (absolute value of the refractive power) among the elements (optical elements) having negative refractive power in the wide-angle converter lens WC is denoted by $\phi n$, and the refractive power of the element having the highest relative partial dispersion $\theta gF$ among the elements (optical elements) having positive refractive power is denoted by $\phi p\_max$, it is desirable that the following condition be satisfied:

$$7 < ABS[\phi n/\phi p\_max] < 16 \quad (12)$$

Herein, ABS[ ] denotes the absolute value of a numerical value within [ ], and a refractive power denotes the reciprocal of a focal length (mm).

If the lower limit of the condition (12) is exceeded, the power of the element of correcting chromatic aberration is strengthened, so that the variation of chromatic aberration of magnification caused by zooming is excessively corrected. On the contrary, if the upper limit of the condition (12) is exceeded, the variation of chromatic aberration of magnification caused by zooming is insufficiently corrected. Herein, more desirably, the following condition may be satisfied:

$$8.5 < ABS[\phi n/\phi p\_max] < 13.0 \quad (12a)$$

In addition, more desirably, when an afocal magnification ratio (focal length conversion magnification ratio) of the wide-angle converter lens WC is defined by $\beta$, the following condition is satisfied:

$$0.70 < \beta < 0.92 \quad (13)$$

Herein, the afocal magnification ratio (focal length conversion magnification ratio) represents a change rate of a focal length according to the mounting of the wide-angle converter lens according to the present exemplary embodiment. More specifically, the afocal magnification ratio is a value obtained by dividing a focal length of a composite optical system where the wide-angle converter lens according to the present exemplary embodiment is mounted on the imaging lens in the state where the zoom position is at the wide-angle end by a focal length at the wide-angle end of the imaging lens.

If the afocal magnification ratio is less than the lower limit of the condition (13), the reduction rate is too increased, so that it is difficult to achieve good correction of aberration. In addition, if the afocal magnification ratio is more than the upper limit, it is not possible to obtain a sufficient effect of widening as a wide-angle converter lens. Herein, more desirably, the following condition may be satisfied:

$$0.77 < \beta < 0.90 \quad (13a)$$

The results of calculation of the aforementioned conditions (9) to (13) with respect to the ninth exemplary embodiment (Numerical Example 9) are listed in Table 3. Table 3 also lists the results of calculation of the conditions with respect to other tenth to fourteenth exemplary embodiments.

Herein, the wide-angle converter lens according to the ninth exemplary embodiment includes a cemented negative lens formed by cementing one optical element having negative refractive power and a very thin optical element having positive refractive power and an optical element having positive refractive power, and light weight thereof is achieved. Moreover, the ninth exemplary embodiment also has a feature where an element having positive refractive power which is formed by using an optical material having anomalous dispersion is disposed at a position which is advantageous to the correction of chromatic aberration of magnification. The effective disposition of the optical material can be determined by analyzing the paraxial arrangement of the lens. The principal standard of the analysis is a ratio of heights of optical paths of an axial light flux and an off-axis light flux from the optical axis in the lens. In the wide-angle converter lens according to the present exemplary embodiment, the optical element is disposed at the position where a product of the height of the optical path of the axial light flux and the height of the optical path of the off-axis light flux in the paraxial tracking at the wide-angle end is large in a case where the wide-angle converter lens is mounted on the master lens, so that good achromatic balance is achieved. In addition, since the optical material (1) used for the optical element GNL in the exemplary embodiment has very high relative partial dispersion θgF of 0.689, the variation of chromatic aberration of magnification caused by zooming is effectively corrected. In Numerical Example 9, particularly, the suppression of the variation of chromatic aberration of magnification caused by zooming is achieved.

Figure 23:
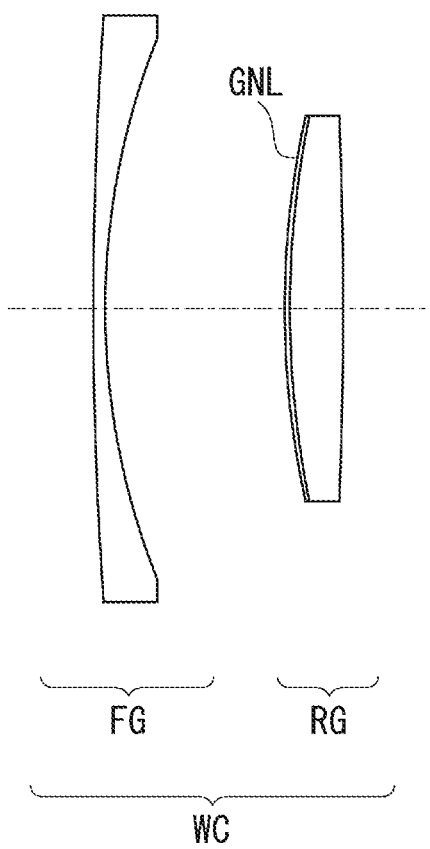
FIG. 23 is a lens cross-sectional diagram illustrating a wide-angle converter lens according to Numerical Example 10.

FIG. 23 is a cross-sectional diagram illustrating a wide-angle converter lens according to a tenth exemplary embodiment (Numerical Example 10) of the invention. FIGS. 24A and 24B are longitudinal aberration diagrams at the zoom position of a wide-angle end and the zoom position of a telephoto end in the state where the wide-angle converter lens according to the tenth exemplary embodiment is mounted on the object side of a master lens at a distance of 4.00 mm on the optical axis.

In FIG. 23, in the wide-angle converter lens WC constituting a substantially afocal optical system, FG indicates a first negative lens unit having negative refractive power, and RG indicates a second positive lens unit having positive refractive power.

Among them, the first lens unit FG is configured with an element having negative refractive power and having a shape of meniscus of which the convex surface faces the object side (meniscus lens). In addition, the second lens unit RG is configured with a cemented positive lens formed by sequentially cementing an optical element GNL having positive refractive power and having a shape of meniscus of which the concave surface faces the image plane side (meniscus lens) and an element having positive refractive power and having a shape of biconvex. In addition, among the elements constituting the cemented positive lens in the lens unit RG, an object-side optical element GNL is formed by using an optical material having anomalous dispersion, and the optical material (1) in Table 1 is used.

The wide-angle converter lens according to the present exemplary embodiment includes one element having negative refractive power and a cemented positive lens formed by cementing a very thin positive lens which is an element having positive refractive power and an element having positive refractive power, and light weight thereof is achieved.

Moreover, the exemplary embodiment has a feature where the element having positive refractive power formed by using an optical material having anomalous dispersion is disposed at a position which is advantageous to correction of chromatic aberration of magnification. The effective disposition of the optical material can be determined by analyzing the paraxial arrangement of the lens. The principal standard of the analysis is a ratio of heights of optical paths of an axial light flux and an off-axis light flux from the optical axis in the lens. In the wide-angle converter lens according to the present exemplary embodiment, the optical element is disposed at the position where a product of the height of the optical path of the axial light flux and the height of the optical path of the off-axis light flux in the paraxial tracking at the wide-angle end is relatively large in a case where the wide-angle converter lens is mounted on the master lens, so that good achromatic balance is achieved. In addition, since the optical material (1) used for the optical element GNL in the exemplary embodiment has very high relative partial dispersion θgF of 0.689, the variation of chromatic aberration of magnification caused by zooming is effectively corrected. In Numerical Example 10, particularly, the suppression of the variation of chromatic aberration of magnification caused by zooming is achieved.

Figure 25:
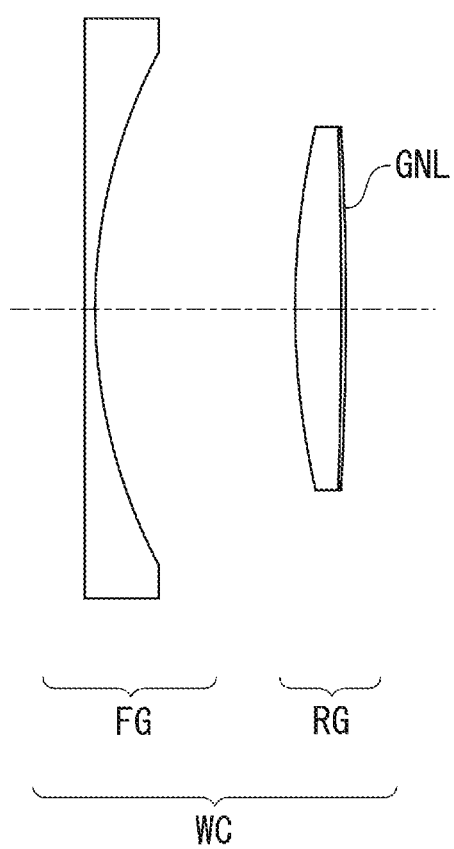
FIG. 25 is a lens cross-sectional diagram illustrating a wide-angle converter lens according to Numerical Example 11.
Figure 26B:
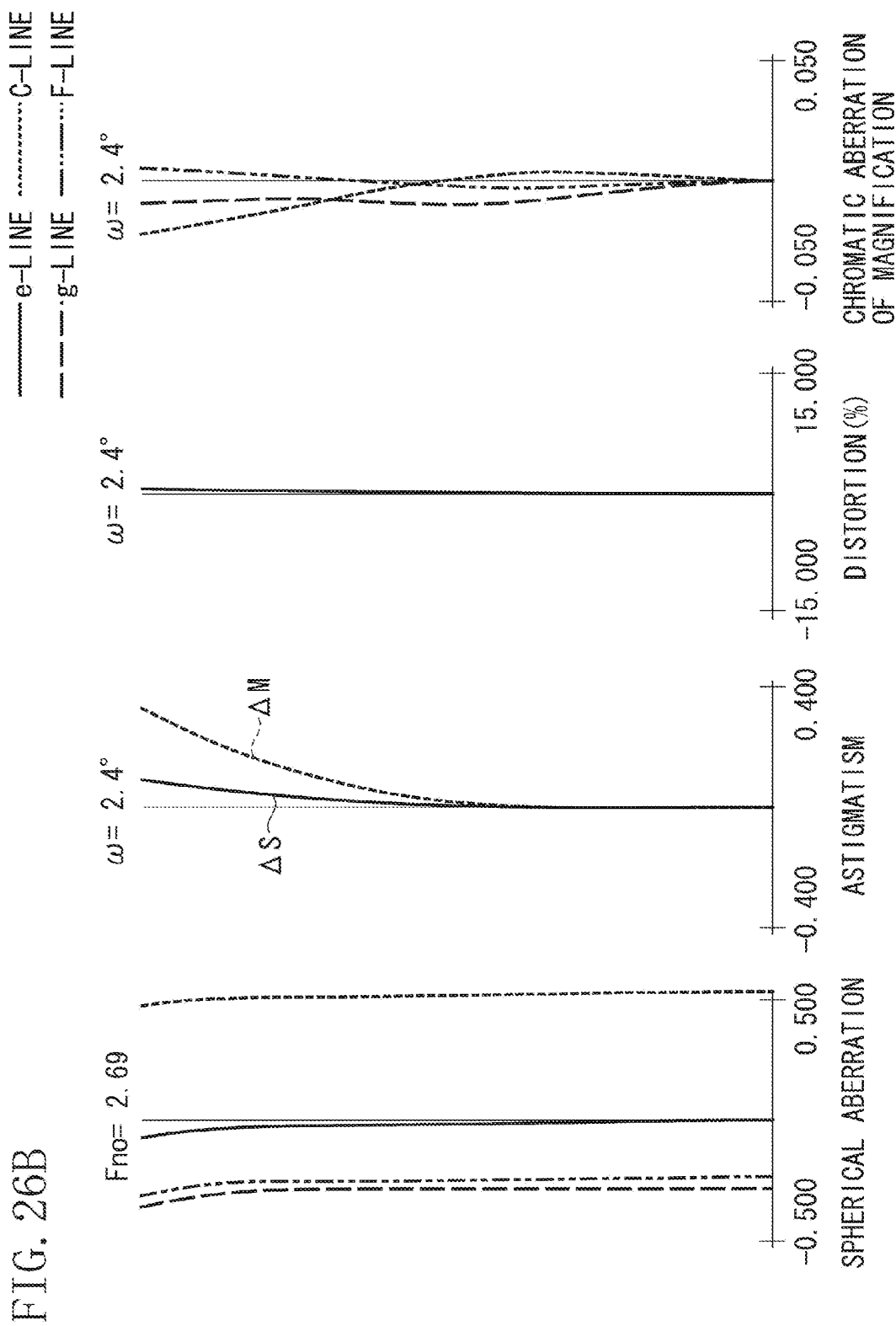
FIG. 26B is a longitudinal aberration diagram for a telephoto end in the state where the wide-angle converter lens according to Numerical Example 11 is mounted on the master lens.

FIG. 25 is a cross-sectional diagram illustrating a wide-angle converter lens according to an eleventh exemplary embodiment (Numerical Example 11) of the invention. FIGS. 26A and 26B are longitudinal aberration diagrams at the zoom position of a wide-angle end and the zoom position of a telephoto end in the state where the wide-angle converter lens according to the eleventh exemplary embodiment is mounted on the object side of a master lens at a distance of 8.00 mm on the optical axis.

In FIG. 25, in the wide-angle converter lens WC constituting a substantially afocal optical system, FG indicates a first negative lens unit having negative refractive power, and RG indicates a second positive lens unit having positive refractive power.

Among them, the first negative lens unit FG is configured with an element having negative refractive power and having a shape of meniscus of which the convex surface faces the object side. In addition, the second positive lens unit RG is configured with a cemented positive lens formed by sequentially cementing an element having positive refractive power and having a shape of biconvex and an optical element GNL having positive refractive power and having a shape of meniscus of which the concave surface faces the object side. In addition, among the elements constituting the cemented positive lens in the lens unit RG, an image-plane-side optical element GNL is formed by using an optical material having anomalous dispersion, and the optical material (3) in Table 1 is used.

The wide-angle converter lens according to the present exemplary embodiment includes one element having negative refractive power and a cemented positive lens formed by cementing an element having positive refractive power and a very thin element having positive refractive power, and light weight thereof is achieved.

Moreover, the exemplary embodiment has a feature where the element having positive refractive power formed by using an optical material having anomalous dispersion is disposed at a position which is advantageous to correction of chromatic aberration of magnification. The effective disposition of the optical material can be determined by analyzing the paraxial arrangement of the lens. The principal standard of the analysis is a ratio of heights of optical paths of an axial light flux and an off-axis light flux from the optical axis in the lens. In the wide-angle converter lens according to the present exemplary embodiment, the optical element is disposed at the position where a product of the height of the optical path of the axial light flux and the height of the optical path of the off-axis light flux in the paraxial tracking at the wide-angle end is relatively large in a case where the wide-angle converter lens is mounted on the master lens, so that good achromatic balance is achieved. In addition, since the optical material (3) used for the optical element GNL in the exemplary embodiment has high relative partial dispersion θgF of 0.633, the variation of chromatic aberration of magnification caused by zooming is effectively corrected. In Numerical Example 11, particularly, the suppression of the variation of chromatic aberration of magnification caused by zooming is achieved.

Figure 27:
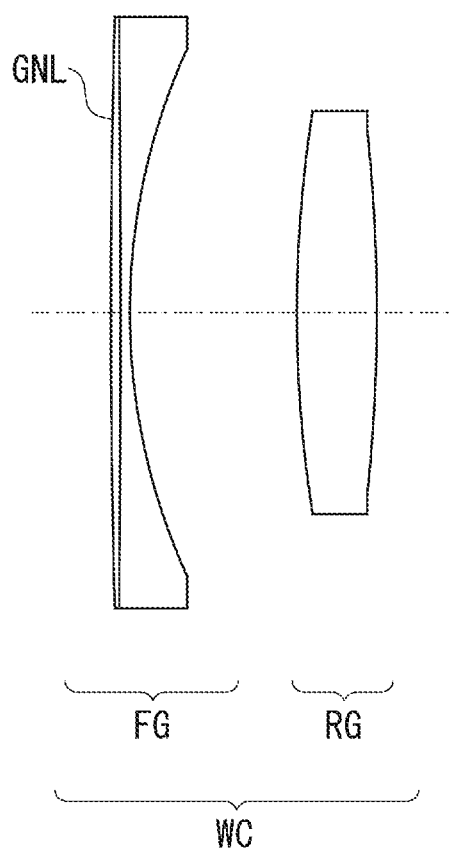
FIG. 27 is a lens cross-sectional diagram illustrating a wide-angle converter lens according to Numerical Example 12.
Figure 28A:
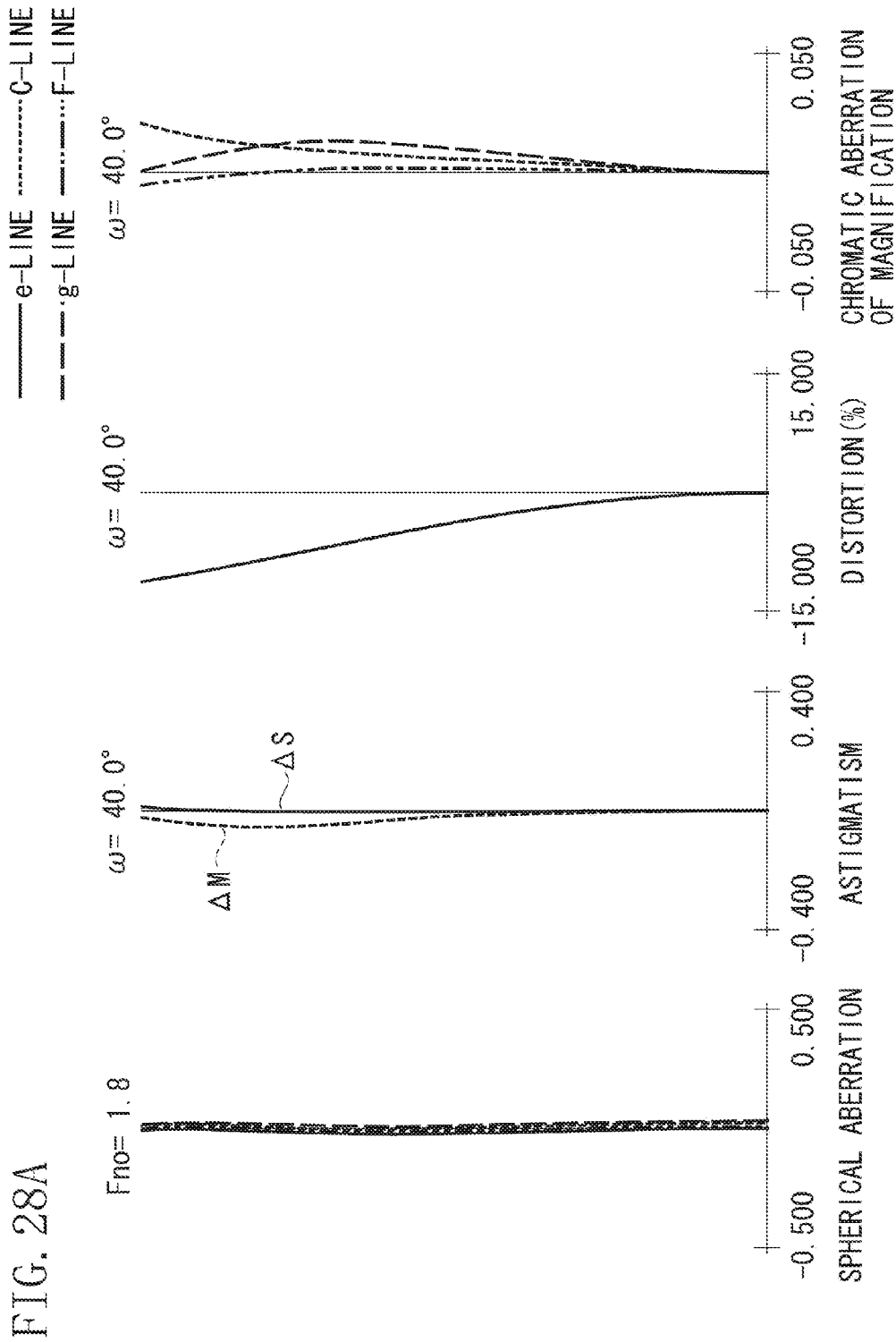
FIG. 28A is a longitudinal aberration diagram for a wide-angle end in the state where the wide-angle converter lens according to Numerical Example 12 is mounted on a master lens.
Figure 28B:
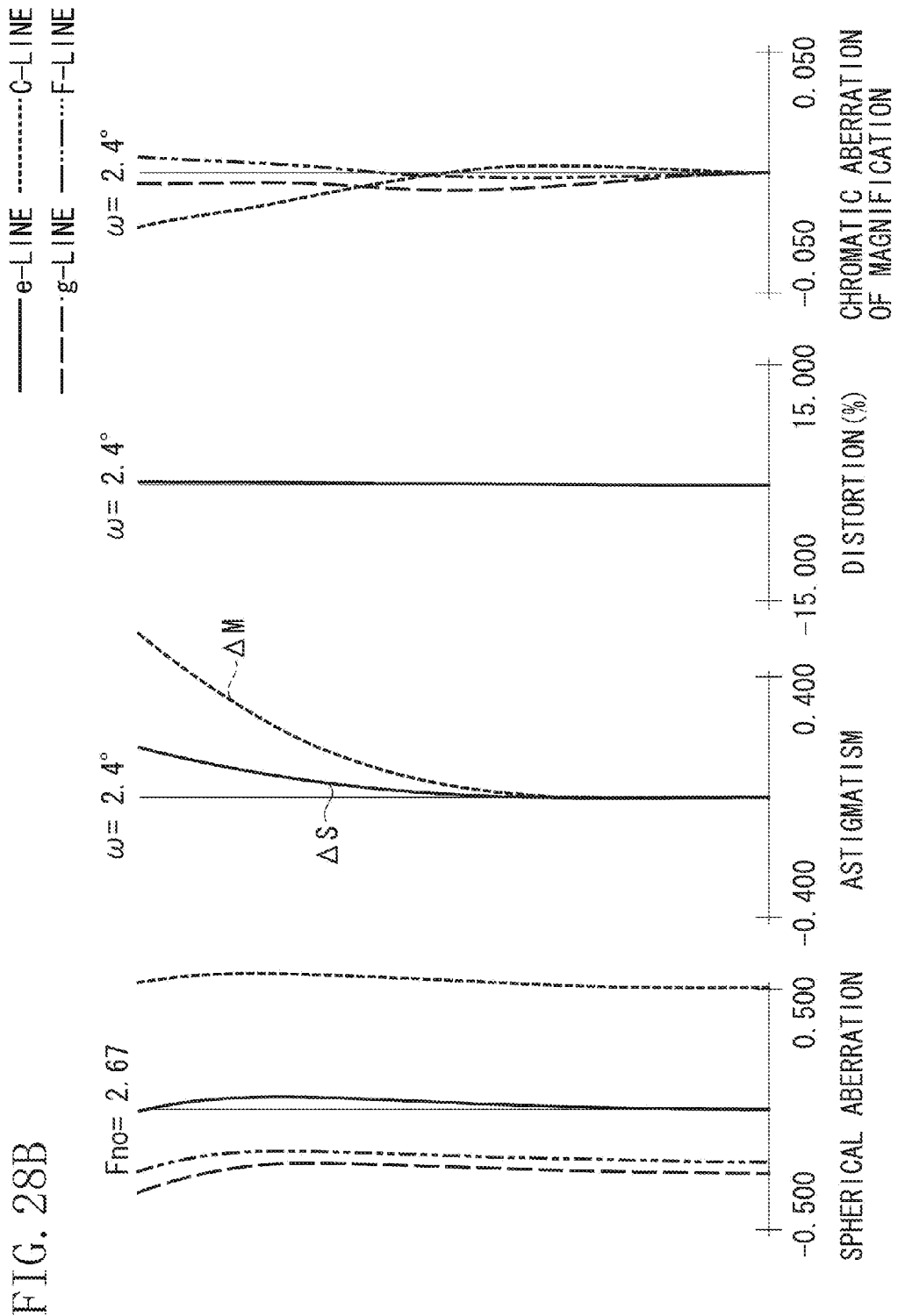
FIG. 28B is a longitudinal aberration diagram for a telephoto end in the state where the wide-angle converter lens according to Numerical Example 12 is mounted on the master lens.

FIG. 27 is a cross-sectional diagram illustrating a wide-angle converter lens according to a twelfth exemplary embodiment (Numerical Example 12) of the invention. FIGS. 28A and 28B are longitudinal aberration diagrams at the zoom position of a wide-angle end and the zoom position of a telephoto end in the state where the wide-angle converter lens according to the twelfth exemplary embodiment is mounted on the object side of a master lens at a distance of 20.00 mm on the optical axis.

In FIG. 27, in the wide-angle converter lens WC constituting a substantially afocal optical system, FG indicates a first negative lens unit having negative refractive power, and RG indicates a second positive lens unit having positive refractive power.

Among them, the first negative lens unit FG is configured with a cemented negative lens formed by cementing an element GNL having positive refractive power and having a shape of biconvex and an element having negative refractive power and having a shape of biconcave. In addition, the second positive lens unit RG is configured with an element having positive refractive power and having a shape of biconvex. In addition, among the elements constituting the cemented negative lens in the lens unit FG, an object-side element GNL is formed by using an optical material having anomalous dispersion, and the optical material (4) in Table 1 is used.

The wide-angle converter lens according to the present exemplary embodiment includes a cemented negative lens formed by cementing a very thin element having positive refractive power and one element having negative refractive power and a positive lens having positive refractive power, and light weight thereof is achieved.

Moreover, the exemplary embodiment has a feature where the element having positive refractive power formed by using an optical material having anomalous dispersion is disposed at a position which is advantageous to correction of chromatic aberration of magnification. The effective disposition of the optical material can be determined by analyzing the paraxial arrangement of the lens. The principal standard of the analysis is a ratio of heights of optical paths of an axial light flux and an off-axis light flux from the optical axis in the lens. In the wide-angle converter lens according to the present exemplary embodiment, the optical element is disposed at the position where a product of the height of the optical path of the axial light flux and the height of the optical path of the off-axis light flux in the paraxial tracking at the wide-angle end is very large in a case where the wide-angle converter lens is mounted on the master lens, so that good achromatic balance is achieved. In addition, since the optical material (4) used for the optical element GNL in the exemplary embodiment has a very low Abbe number of 17.8 and high dispersion, the variation of chromatic aberration of magnification caused by zooming is effectively corrected. In Numerical Example 12, particularly, the suppression of the variation of chromatic aberration of magnification caused by zooming is achieved.

Figure 29:
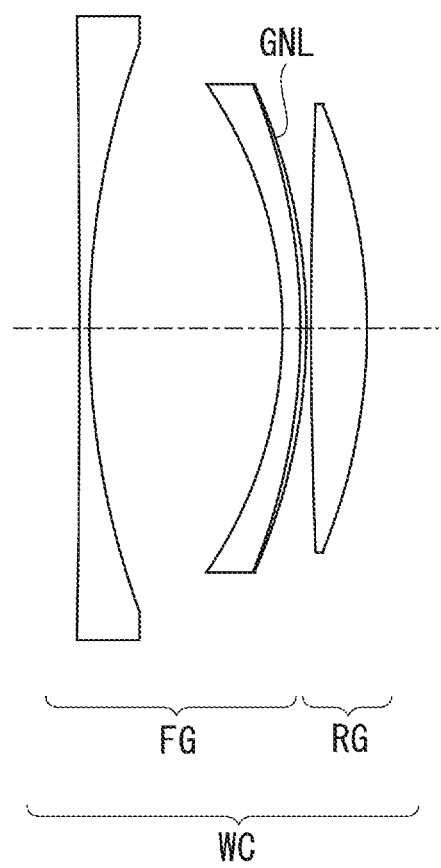
FIG. 29 is a lens cross-sectional diagram illustrating a wide-angle converter lens according to Numerical Example 13.
Figure 30A:
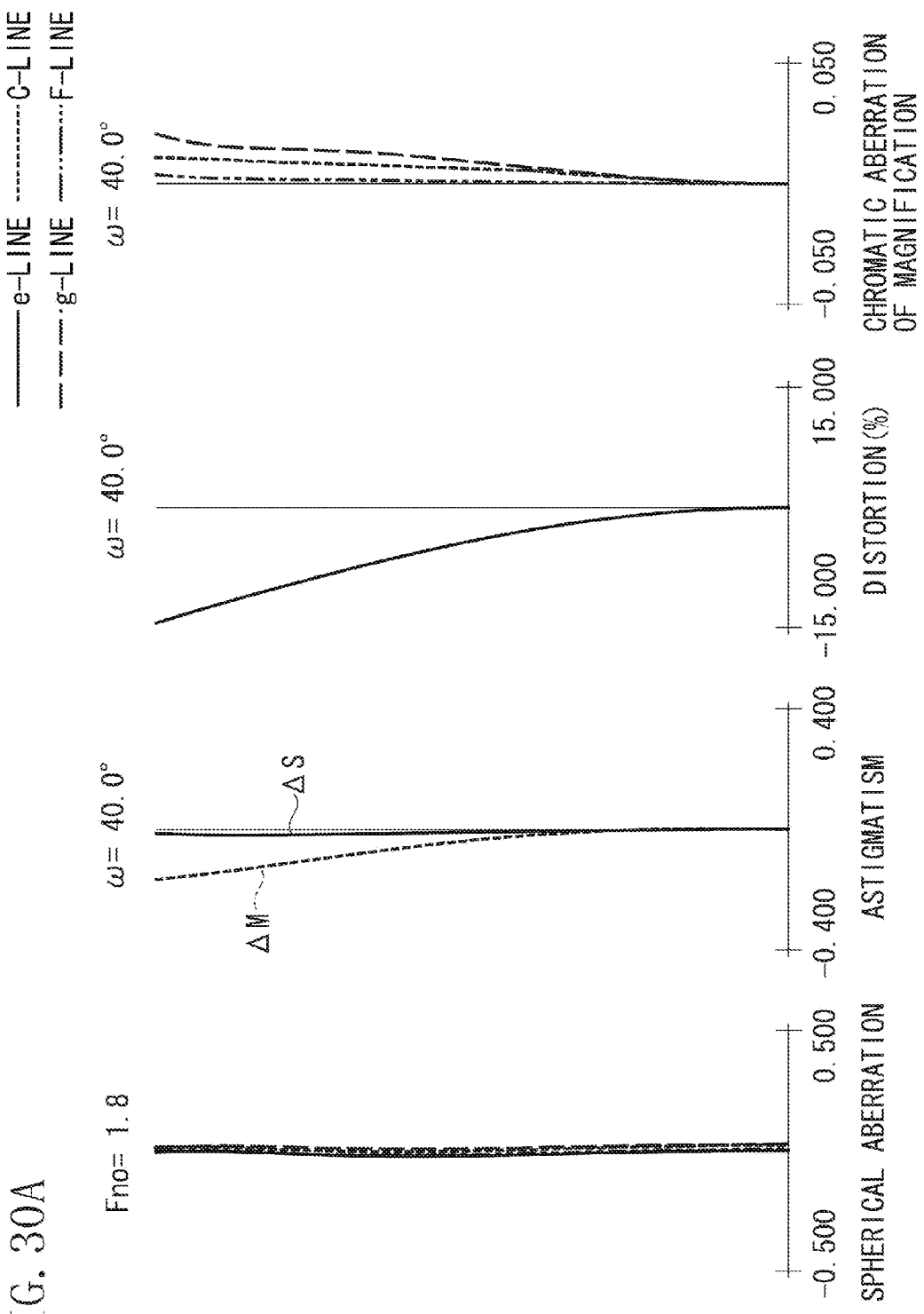
FIG. 30A is a longitudinal aberration diagram for a wide-angle end in the state where the wide-angle converter lens according to Numerical Example 13 is mounted on a master lens.

FIG. 29 is a cross-sectional diagram illustrating a wide-angle converter lens according to a thirteenth exemplary embodiment (Numerical Example 13) of the invention. FIGS. 30A and 30B are longitudinal aberration diagrams at the zoom position of a wide-angle end and the zoom position of a telephoto end in the state where the wide-angle converter lens according to the thirteenth exemplary embodiment is mounted on the object side of a master lens at a distance of 20.00 mm on the optical axis.

In FIG. 29, in the wide-angle converter lens WC constituting a substantially afocal optical system, FG indicates a first negative lens unit having negative refractive power, and RG indicates a second positive lens unit having positive refractive power.

The first negative lens unit FG includes an element having negative refractive power and having a shape of biconcave and a cemented negative lens formed by sequentially cementing an element having negative refractive power and having a shape of meniscus of which the convex surface faces the image plane side and an element GNL having positive refractive power and having a shape of meniscus of which the concave surface faces the object side. In addition, the second positive lens unit RG is configured with an element having positive refractive power and having a shape of biconvex. In addition, among the elements constituting the cemented negative lens in the lens unit FG, an image-plane-side element GNL is formed by using an optical material having anomalous dispersion, and the optical material (5) in Table 1 is used.

Moreover, the exemplary embodiment has a feature where the element having positive refractive power formed by using an optical material having anomalous dispersion is disposed at a position which is advantageous to correction of chromatic aberration of magnification. The effective disposition of the optical material can be determined by analyzing the paraxial arrangement of the lens. The principal standard of the analysis is a ratio of heights of optical paths of an axial light flux and an off-axis light flux from the optical axis in the lens. In the wide-angle converter lens according to the present exemplary embodiment, the optical element is disposed at the position where a product of the height of the optical path of the axial light flux and the height of the optical path of the off-axis light flux in the paraxial tracking at the wide-angle end is relatively large in a case where the wide-angle converter lens is mounted on the master lens, so that good achromatic balance is achieved. In addition, since the optical material (5) used for the optical element GNL in the exemplary embodiment has a very low Abbe number of 17.7 and high dispersion, the variation of chromatic aberration of magnification caused by zooming is effectively corrected. In Numerical Example 13, particularly, the suppression of the variation of chromatic aberration of magnification caused by zooming is achieved.

In the exemplary embodiment, the first negative lens unit includes the two elements having negative refractive power, so that it is possible to divide the refractive power of the element having negative refractive power disposed at the closest-to-object side. Therefore, the curvature of the element having negative refractive power disposed at the closest-to-object side can be loosened, so that it is possible to advantageously correct off-axis aberration such as astigmatism.

Figure 31:
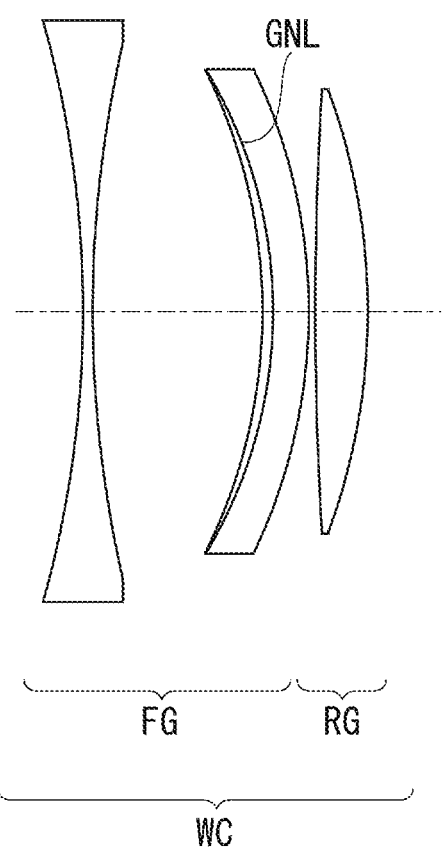
FIG. 31 is a lens cross-sectional diagram illustrating a wide-angle converter lens according to Numerical Example 14.
Figure 32A:
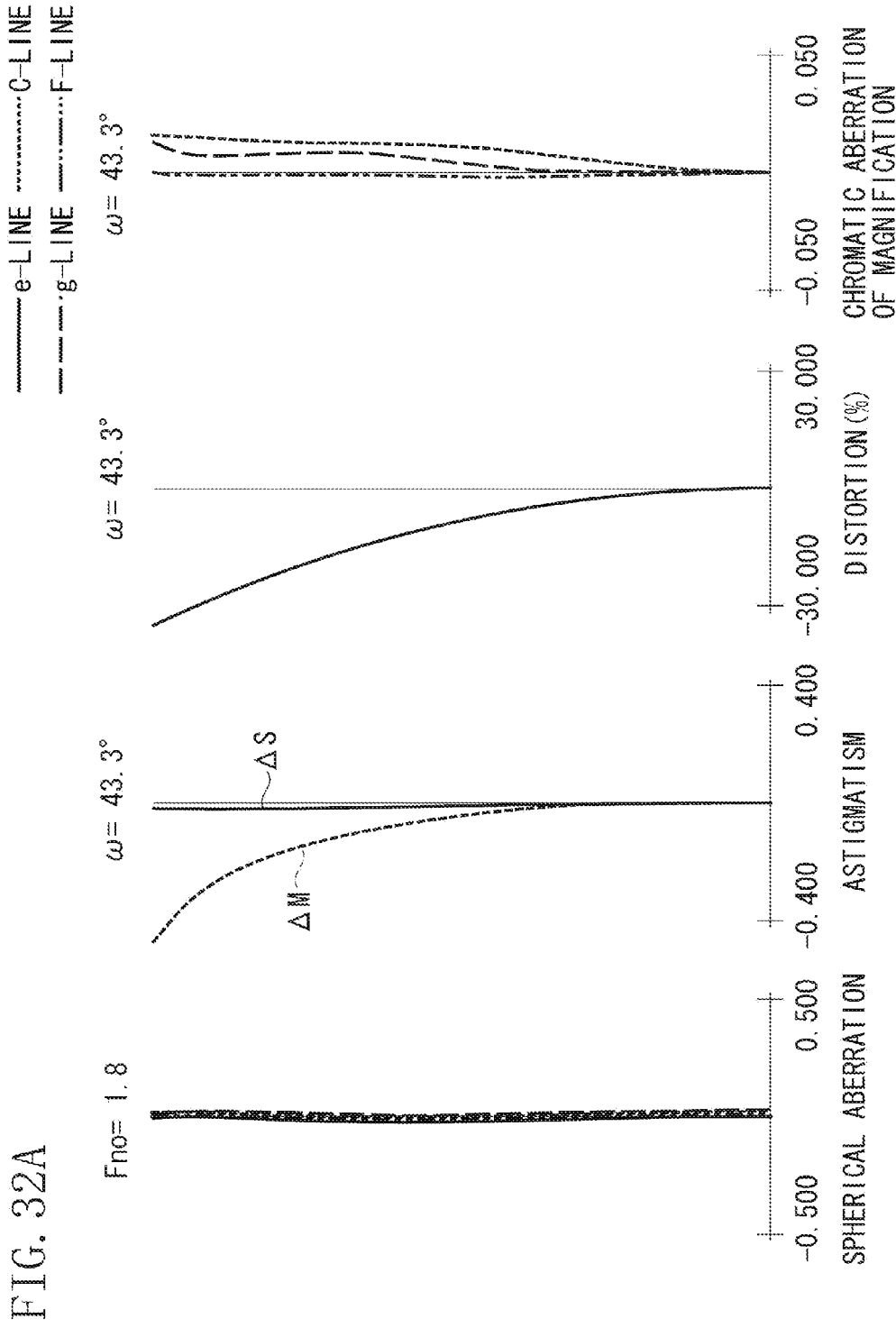
FIG. 32A is a longitudinal aberration diagram for a wide-angle end in the state where the wide-angle converter lens according to Numerical Example 14 is mounted on a master lens.
Figure 32B:
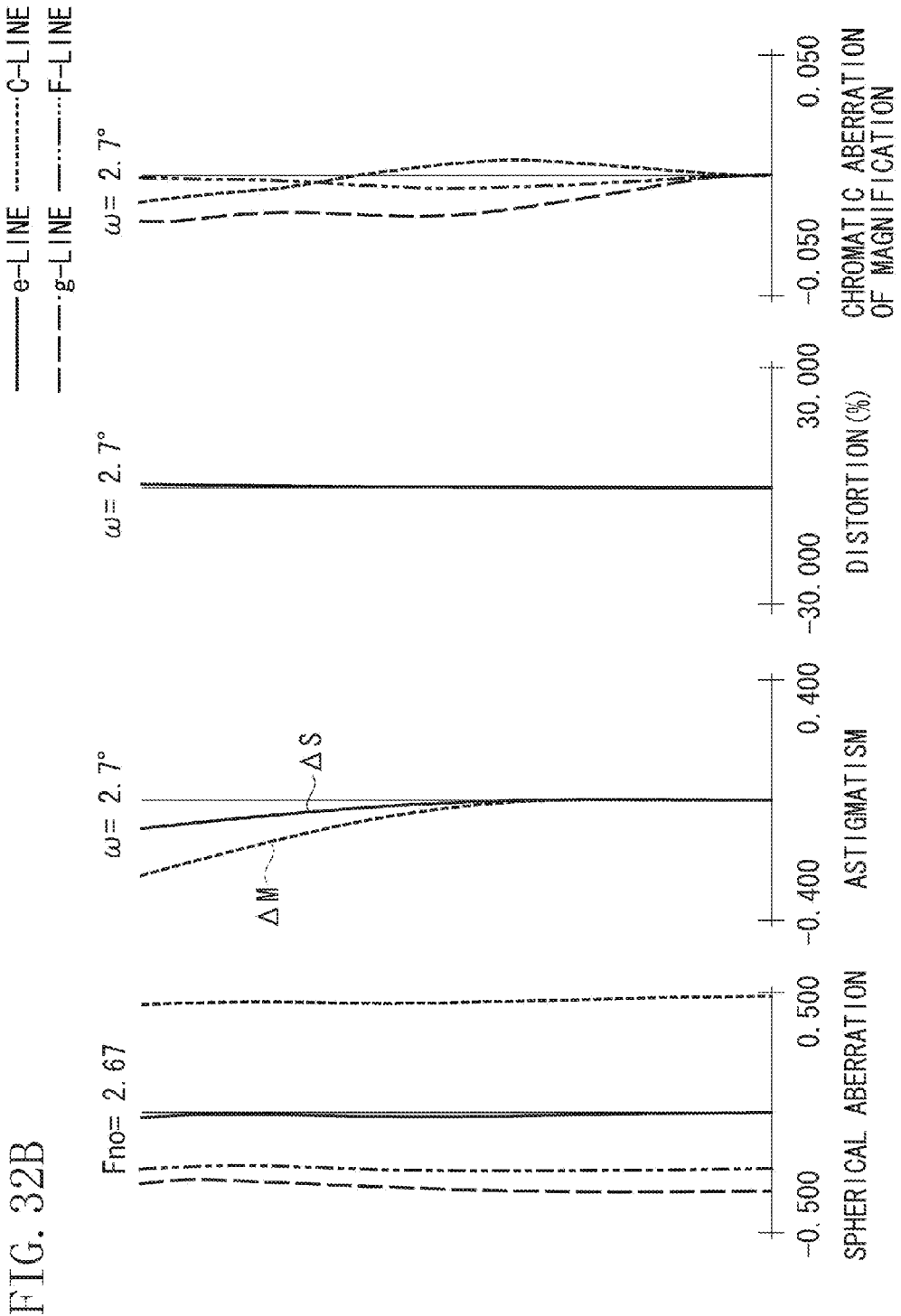
FIG. 32B is a longitudinal aberration diagram for a telephoto end in the state where the wide-angle converter lens according to Numerical Example 14 is mounted on the master lens.

FIG. 31 is a cross-sectional diagram illustrating a wide-angle converter lens according to a fourteenth exemplary embodiment (Numerical Example 14) of the invention. FIGS. 32A and 32B are longitudinal aberration diagrams at the zoom position of a wide-angle end and the zoom position of a telephoto end in the state where the wide-angle converter lens according to the fourteenth exemplary embodiment is mounted on the object side of a master lens at a distance of 20.02 mm on the optical axis.

In FIG. 31, in the wide-angle converter lens WC constituting a substantially afocal optical system, FG indicates a first negative lens unit having negative refractive power, and RG indicates a second positive lens unit having positive refractive power.

Among them, the lens unit FG includes an element having negative refractive power and having a shape of biconcave and a cemented negative lens formed by sequentially cementing an element GNL having positive refractive power and having a shape of meniscus of which the concave surface faces the object side and an element having negative refractive power and having a shape of meniscus of which the convex surface faces the image plane side. In addition, the lens unit RG is configured with an element having positive refractive power and having a shape of biconvex. In addition, among the elements constituting the cemented negative lens in the lens unit FG, an element GNL is formed by using an optical material having anomalous dispersion, and the optical material (5) in Table 1 is used.

Moreover, the exemplary embodiment has a feature where the element having positive refractive power formed by using an optical material having anomalous dispersion is disposed at a position which is advantageous to correction of chromatic aberration of magnification. The effective disposition of the optical material can be determined by analyzing the paraxial arrangement of the lens. The principal standard of the analysis is a ratio of heights of optical paths of an axial light flux and an off-axis light flux from the optical axis in the lens. In the wide-angle converter lens according to the present exemplary embodiment, the optical element is disposed at the position where a product of the height of the optical path of the axial light flux and the height of the optical path of the off-axis light flux in the paraxial tracking at the wide-angle end is relatively large in a case where the wide-angle converter lens is mounted on the master lens, so that good achromatic balance is achieved. In addition, since the optical material (5) used for the optical element GNL in the exemplary embodiment has a very low Abbe number of 17.7 and high dispersion, the variation of chromatic aberration of magnification caused by zooming is effectively corrected. In Numerical Example 14, particularly, the suppression of the variation of chromatic aberration of magnification caused by zooming is achieved.

In the exemplary embodiment, the first negative lens unit is configured with the two elements having negative refractive power, so that it is possible to provide a wide-angle converter lens having high reduction ratio.

In this manner, the embodiment of the invention is described by using a wide-angle converter lens configured with three elements in the ninth to twelfth exemplary embodiments or a wide-angle converter lens configured with four elements in the thirteenth and fourteenth exemplary embodiments. In the wide-angle converter lens configured with three elements, since it is configured with a small number of constituent lenses, it is possible to provide a compact, light-weighted wide-angle converter lens. In the wide-angle converter lens configured with four elements, since the function of the element having negative refractive power disposed at the closest-to-object side can be divided, it is possible to achieve good correction of aberration or high reduction ratio. In addition, it is apparent that good correction of aberration or high reduction ratio can be achieved by further increasing the number of constituent lenses of the wide-angle converter lens.

Hereinbefore, the embodiment of the invention is described, but the invention is not limited to the embodiment. Various changes and modifications can be made within the scope of the spirit.

Numerical data of the wide-angle converter lens WC of each of the exemplary embodiments described above are listed hereinafter. In the data, r denotes a radius of curvature of each lens surface; d denotes an intersurface distance between lens surfaces; nd denotes a refractive index of each lens with respect to d-line; and νd denotes Abbe number of each lens.

| Surface Number | r | d | nd | νd |
|---|---|---|---|---|
| (Numerical Example 9) | | | | |
| 1 | 1289.298 | 2.80 | 1.77250 | 49.6 |
| 2 | 145.077 | 1.40 | 1.6356 | 22.7 |
| 3 | 159.065 | 35.00 | | |
| 4 | 184.389 | 12.53 | 1.51742 | 52.4 |
| 5 | −449.648 | | | |
| (Numerical Example 10) | | | | |
| 1 | 996.093 | 2.70 | 1.69350 | 53.2 |
| 2 | 175.339 | 40.70 | | |
| 3 | 215.360 | 1.00 | 1.63560 | 22.7 |
| 4 | 231.571 | 12.00 | 1.51742 | 52.4 |
| 5 | −1162.866 | | | |
| (Numerical Example 11) | | | | |
| 1 | 92345.026 | 2.70 | 1.65160 | 58.5 |
| 2 | 143.844 | 52.13 | | |
| 3 | 213.060 | 12.00 | 1.60300 | 65.4 |
| 4 | −1418.496 | 1.00 | 1.78000 | 25.0 |
| 5 | −813.502 | | | |
| (Numerical Example 12) | | | | |
| 1 | 3308.737 | 2.87 | 2.14352 | 17.8 |
| 2 | −9647.955 | 2.80 | 1.77250 | 49.6 |
| 3 | 191.724 | 50.01 | | |
| 4 | 389.025 | 23.95 | 1.57135 | 53.0 |
| 5 | −528.213 | | | |
| (Numerical Example 13) | | | | |
| 1 | −5498.595 | 2.70 | 1.69680 | 55.5 |
| 2 | 232.115 | 53.78 | | |
| 3 | −120.532 | 5.00 | 1.51742 | 52.4 |
| 4 | −182.250 | 1.66 | 1.69591 | 17.7 |
| 5 | −167.534 | 1.29 | | |
| 6 | 1572.237 | 15.57 | 1.51633 | 64.1 |
| 7 | −164.315 | | | |
| (Numerical Example 14) | | | | |
| 1 | −304.149 | 2.70 | 1.88300 | 40.8 |
| 2 | 340.086 | 47.74 | | |
| 3 | −151.795 | 3.00 | 1.69591 | 17.7 |
| 4 | −132.498 | 10.00 | 1.69680 | 55.5 |
| 5 | −158.159 | 1.84 | | |
| 6 | 1052.018 | 14.74 | 1.59240 | 68.3 |
| 7 | −180.720 | | | |

TABLE 3

| | Numerical Example | | | | | |
|---|---|---|---|---|---|---|
| Condition | 9 | 10 | 11 | 12 | 13 | 14 |
| (9) | 0.623 | 0.623 | 0.587 | 0.607 | 0.611 | 0.616 |
| (10) | 0.04979 | 0.04979 | 0.00066 | 0.00431 | 0.03099 | 0.03099 |
| (11) | 22.7 | 22.7 | 25.0 | 17.8 | 17.7 | 17.7 |
| (12) | 11.73 | 15.28 | 11.05 | 8.86 | 8.92 | 7.76 |
| (13) | 0.88 | 0.88 | 0.80 | 0.80 | 0.80 | 0.71 |

The wide-angle converter lens according to the present exemplary embodiment of the invention is a wide-angle converter lens capable of being detachably mounted on an enlargement side of the imaging lens. The wide-angle converter lens includes a first lens unit having negative refractive power at the enlargement side (object side) and a second lens unit having positive refractive power at the reduction side (image plane side) which are separated by the largest air distance in the wide-angle converter lens. Herein, the first lens unit includes at least one optical element (first optical element) having positive refractive power, and the second lens unit includes at least one optical element (second optical element) having negative refractive power. In addition, although the aforementioned optical element may be cemented to other optical elements, the optical element itself does not denote a cemented lens which is formed by cementing two or more optical elements. In addition, it should be understood that the first lens unit having negative refractive power includes an optical element having negative refractive power besides the aforementioned first optical element and, similarly, the second lens unit having positive refractive power also includes an optical element having positive refractive power.

Herein, when the relative partial dispersion and Abbe number of the aforementioned first optical element are denoted by $\theta gF1$ and $vd1$, respectively; the relative partial dispersion, an Abbe number, and refractive power of the second optical element are denoted by $\theta gF2$, $vd2$, and $\phi_{GNL2}$; and the refractive power of the second lens unit is denoted by $\phi_2$, the wide-angle converter lens according to the present exemplary embodiment has a feature of satisfying the following conditions:

$$\theta gF1+0.0016 \times vd1-0.665>0 \quad (14\text{-}1)$$

$$vd1<30 \quad (15\text{-}1)$$

$$\theta gF2+0.0016 \times vd2-0.665>0 \quad (14\text{-}2)$$

$$vd2<30 \quad (15\text{-}2)$$

$$0.02<|\phi_{GNL2}/\phi_2|<0.20 \quad (16)$$

Since the wide-angle converter lens has the feature, it is possible to reduce the change in chromatic aberration over the entire zoom range of the imaging lens when the wide-angle converter lens is mounted on the imaging lens single body, and it is possible to provide a compact wide-angle converter lens. Herein, if the value is less than the lower limit, in a case where good correction of aberration is to be preformed over the entire zoom range, the number of lenses needs to be increased, or the refractive power of the element for correction of chromatic aberration needs to be strengthened, so that the size thereof is enlarged.

In addition, the condition (15) relates to the Abbe number of a material of the optical element GNL having anomalous dispersion. An optical element configured with an optical material having strong (high) dispersion is disposed in the first negative lens unit and the second positive lens unit, so that the difference in the Abbe number from a general glass material can be increased. As a result, it is possible to strengthen the effect of the correction of first-order chromatic aberration. If the value is more than the upper limit of the condition (15), the first-order chromatic aberration is insufficiently corrected, so that there is a possibility where sufficient optical performance may not be obtained.

In addition, the condition (16) is an expression defining a ratio of the refractive power of the element GNL2 having negative refractive power included in the second positive lens unit to the refractive power of the second positive lens unit. If the ratio of the refractive powers is increased to exceed the upper limit of the condition (16), the refractive power of the optical element GNL2 to the refractive power of the second positive lens unit is strengthened. As a result, the power of the second positive lens unit to the first negative lens unit is weakened, and thus, in order to maintain the afocal magnification ratio, a distance between the first negative lens unit and the second positive lens unit on the optical axis needs to be lengthened, so that the size of the optical system is enlarged. On the contrary, if the value is less than the lower limit, the refractive power of the optical element GNL2 is weakened, and thus, axial chromatic aberration at the telephoto end is insufficiently corrected, so that sufficient optical performance may not be obtained.

In addition, herein, Abbe numbers $vd$ and relative partial dispersions $\theta gF$ in the conditions (14-1), (14-2), (15-1), and (15-2) are physical quantities defined by the following expressions. In the expressions, Ng, NF, Nd, and NC are refractive indexes of a material with respect to the light of g-line (wavelength 435.8 nm), F-line (wavelength 486.1 nm), d-line (wavelength 587.6 nm), and C-line (wavelength 656.3 nm).

$$vd=(Nd-1)/(NF-NC)$$

$$\theta gF=(Ng-NF)/(NF-NC)$$

In addition, the refractive power is a reciprocal of the focal length.

Herein, more desirably, the following conditions may be satisfied:

$$0.0800>\theta gF1+0.0016 \times vd1-0.665>0.0020 \quad (14\text{-}1a)$$

$$15<vd1<24 \quad (15\text{-}1a)$$

$$0.0800>\theta gF2+0.0016 \times vd2-0.665>0.0020 \quad (14\text{-}2a)$$

$$15<vd2<24 \quad (15\text{-}2a)$$

$$0.04<|\phi_{GNL2}/\phi_2|<0.12 \quad (16a)$$

However, these conditions do not need to be simultaneously satisfied. Even if any one of the conditions (14-1), (14-2), (15-1), (15-2), and (16) is replaced with the conditions (14-1a), (14-2a), (15-1a), (15-2a), and (16a), the effect is increased.

In addition, more desirably, when the distance on the optical axis from the surface at the side closest to the object to the surface at the side closest to the image plane in the wide-angle converter lens is denoted by L and the effective diameter of the surface at the side closest to the object is denoted by EA, the following condition is satisfied:

$$1.65<EA/L<2.25 \quad (17)$$

The condition (17) is an expression defining a relationship between the total length L of the wide-angle converter lens on the optical axis and the effective diameter of the surface at the side closest to the object. In addition, the effective diameter EA of the wide-angle converter lens according to the present exemplary embodiment is determined so that, when the wide-angle converter lens is mounted on the master lens, an image-plane luminance ratio in the wide-angle end state is 40% or more. If the value is less than the lower limit of the condition (17), the total length to the effective diameter is lengthened. In other words, the size of the wide-angle converter lens is enlarged, so that it is difficult to achieve a compact wide-angle converter lens. On the contrary, if the value is more than the upper limit, in order to shorten the total length, the refractive power of the first negative lens unit and the refractive power of the second positive lens unit are increased. As a result, the curvature of the element constituting the wide-angle converter lens is tightened, so that it is difficult to correct the aberration with respect to off-axis light. Herein, more desirably, the following condition may be satisfied:

$$1.70 < EA/L < 2.15 \tag{17a}$$

In addition, when the refractive power of the first optical element described above is denoted by $\phi_{GNL1}$, it is desirable that the following condition is satisfied:

$$2 < |\phi_{GNL1}/\phi_{GNL2}| < 10 \tag{18}$$

The condition (18) is an expression defining a ratio of the refractive power of the element GNL1 having positive refractive power formed by using a material of the optical element GNL in the first negative lens unit to the refractive power of the element GNL2 having negative refractive power formed by using a material of the optical element GNL in the second positive lens unit. If the value is less than the lower limit of the condition (18), the refractive power of the optical element GNL2 is strengthened, and thus, axial chromatic aberration at the telephoto end is in the "greatly-over" state, and chromatic aberration of magnification at the telephoto end is in the "greatly-under" state, so that the balance of chromatic aberration is deteriorated. On the contrary, if the value is increased to exceed the upper limit of the condition (18), the refractive power of the optical element GNL2 is weakened, and thus, axial chromatic aberration at the telephoto end is in the "greatly under" state, so that the balance of chromatic aberration is deteriorated. Herein, more desirably, the following condition may be satisfied:

$$3.15 < |\phi_{GNL1}/\phi_{GNL2}| < 10.00 \tag{18a}$$

In addition, it is more desirable that, when an average value of relative partial dispersions and an average value of Abbe numbers of all optical elements having positive refractive power in the first lens unit are denoted by $\theta_{fp}$ and $\nu_{fp}$, respectively; and an average value of relative partial dispersions and an average value of Abbe numbers of all optical elements having negative refractive power in the first lens unit are denoted by $\theta_{fn}$ and $\nu_{fn}$, respectively, the following condition be satisfied:

$$2.8 \times 10^{-3} < (\theta_{fn} - \theta_{fp})/(\nu_{fp} - \nu_{fn}) < 6.0 \times 10^{-3} \tag{19}$$

In addition, it is more desirable that, when an average value of relative partial dispersions and an average value of Abbe numbers of all optical elements having positive refractive power in the second lens unit are denoted by $\theta_{rp}$ and $\nu_{rp}$, respectively; and an average value of relative partial dispersions and an average value of Abbe numbers of all optical elements having negative refractive power in the second lens unit are denoted by $\theta_{rn}$ and $\nu_{rn}$, respectively, the following condition be satisfied:

$$1.8 \times 10^{-3} < (\theta_{rn} - \theta_{rp})/(\nu_{rp} - \nu_{rn}) < 3.5 \times 10^{-3} \tag{20}$$

The conditions (19) and (20) are expressions defining the effect of achromatism among three wavelengths beside a reference wavelength and the effect of secondary achromatism in the first negative lens unit and the second positive lens unit in the wide-angle converter lens.

If the value is less than the lower limit of the condition (19), a difference in achromatism is small between a general material and the optical element GNL in the first negative lens unit, so that the effect of achromatism may not be effectively obtained. As a result, it is difficult to correct chromatic aberration of magnification, particularly, at the wide-angle end. On the contrary, if the value is more than the upper limit of the condition (19), chromatic aberration of magnification can be effectively corrected, but a secondary spectrum of axial chromatic aberration greatly occurs at the telephoto end, so that the balance of chromatic aberration is deteriorated. Herein, more desirably, the following condition may be satisfied:

$$3.7 \times 10^{-3} < (\theta_{fn} - \theta_{fp})/(\nu_{fp} - \nu_{fn}) < 6.0 \times 10^{-3} \tag{19a}$$

In additions, if the value is less than the lower limit of the condition (20), a difference in achromatism is small between a general material and the optical element GNL in the second positive lens unit, so that the effect of achromatism may not be effectively obtained. As a result, it is difficult to correct axial chromatic aberration, particularly, at the telephoto end. On the contrary, if the value is more than the upper limit of the condition (20), chromatic aberration of magnification is excessively corrected, particularly, at the telephoto end, so that the balance of chromatic aberration is deteriorated.

Herein, more desirably, the following condition may be satisfied:

$$2.0 \times 10^{-3} < (\theta_{rn} - \theta_{rp})/(\nu_{rp} - \nu_{rn}) < 3.5 \times 10^{-3} \tag{20a}$$

Moreover, if the effect of achromatism in the first negative lens unit and the second positive lens unit defined by the conditions (19) and (20) satisfies the following condition, the higher effect can be obtained.

$$0.6 \times 10^{-3} < (\theta_{fn} - \theta_{fp})/(\nu_{fp} - \nu_{fn}) - (\theta_{rn} - \theta_{rp})/(\nu_{rp} - \nu_{rn}) \tag{21}$$

If the condition (21) is satisfied, the aberration occurring in the optical element GNL1 having positive refractive power and the aberration occurring in the optical element GNL2 having negative refractive power are uniformly compensated for, so that the effect of correcting the aberration therebetween can be effectively used. Herein, more desirably, the following condition may be satisfied:

$$1.0 \times 10^{-3} < (\theta_{fn} - \theta_{fp})/(\nu_{fp} - \nu_{fn}) - (\theta_{rn} - \theta_{rp})/(\nu_{rp} - \nu_{rn}) < 2.8 \times 10^{-3} \tag{21a}$$

In addition, it is desirable that a focal length conversion magnification ratio $\beta$ of the wide-angle converter lens satisfies the condition.

$$0.7 < \beta < 0.9 \tag{22}$$

If the value is less than the lower limit of the condition (22), the reduction rate is too increased, so that it is difficult to achieve good correction of aberration. In addition, if the value is more than the upper limit of the condition (22), a sufficient effect of widening as a wide-angle converter lens may not be obtained. Herein, the focal length conversion magnification ratio is a value obtained by dividing a composite focal length in the state where the wide-angle converter lens is mounted on the imaging lens (wide-angle end) by a focal length of the imaging lens (wide-angle end) single body. Herein, more desirably, the following condition may be satisfied:

$$0.71 < \beta < 0.85 \tag{22a}$$

In addition, it is more desirable that the wide-angle converter lens according to the present exemplary embodiment satisfying the aforementioned conditions (14-1) to (22) be mounted on a master lens satisfying the following conditions, in which a variable magnification ratio is denoted by Z and a half angle of view in a wide-angle end state is denoted by $\omega$.

$$Z \geq 10 \tag{23}$$

$$\omega \geq 28° \tag{24}$$

More desirably, the following conditions may be satisfied:

$$300 \geq Z \geq 20 \quad (23a)$$

$$60° \geq \omega \geq 31° \quad (24a)$$

Moreover, it is desirable that the aforementioned first optical element have a shape of meniscus which is convex toward the enlargement side and the aforementioned second optical element have a shape of meniscus which is convex toward the reduction side. In addition, the first optical element may have a shape of meniscus which is convex toward the enlargement side, and the second optical element may have a shape of meniscus which is convex toward the enlargement side.

In addition, the first optical element may be cemented to a reduction-side surface of an optical element disposed at the most enlargement side of wide-angle converter lens. In addition, it is desirable that the second optical element be cemented to a biconvex lens disposed in the second lens unit.

As described above, the wide-angle converter lens according to the present exemplary embodiment has the feature where materials having anomalous dispersion are disposed with appropriate powers, so that a compact wide-angle converter lens in addition to good correction of chromatic aberration can be achieved. In a case where materials having high partial dispersion used in the exemplary embodiment are used for the element, it is possible to effectively use the effect of correction by defining appropriate power arrangement. On the other hand, in a case where appropriate power arrangement is not defined, excessive or insufficient correction of axial chromatic aberration or chromatic aberration of magnification may be caused, which is not desirable.

The optical system according to the present exemplary embodiment has the feature where a refractive optical element configured with an optical material having strong (large) anomalous dispersion is included and a relationship of achromatism of the wide-angle converter lens WC itself is defined. Accordingly, when the wide-angle converter lens WC is mounted on the master lens MS, it is possible to suppress a change in chromatic aberration before and after the mounting. In addition, the achromatism is effectively performed by using the material having anomalous dispersion, and the element for the purpose of the achromatism is configured with an element having low refractive power, so that it is possible to achieve a compact optical system. In addition, herein, the refractive optical element denotes, for example, a refractive lens of which the power is generated due to a refraction function, and thus, the refractive optical element does not include a diffractive optical element of which the power is generated due to a diffraction function. In addition, although the optical material is in the solid state in the state where the optical system is used, the state of the optical material may be any state before the optical system is used, for example, when it is manufactured. For example, when it is manufactured, the optical material may be a liquid-state material or a solid-state material obtained by curing the liquid-state material. For example, the optical element having strong anomalous dispersion (first optical element, second optical element, or the like) may be formed by curing a resin material or the like with illumination of UV rays or the like.

Figure 33:
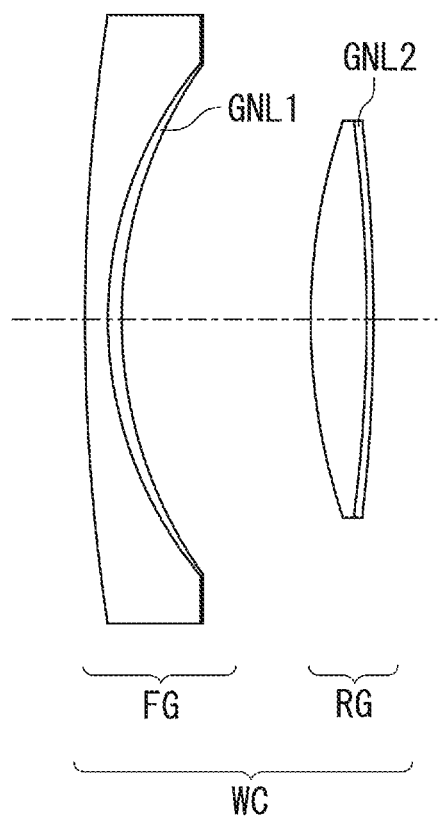
FIG. 33 is a lens cross-sectional diagram illustrating a wide-angle converter lens according to Numerical Example 15.
Figure 34:
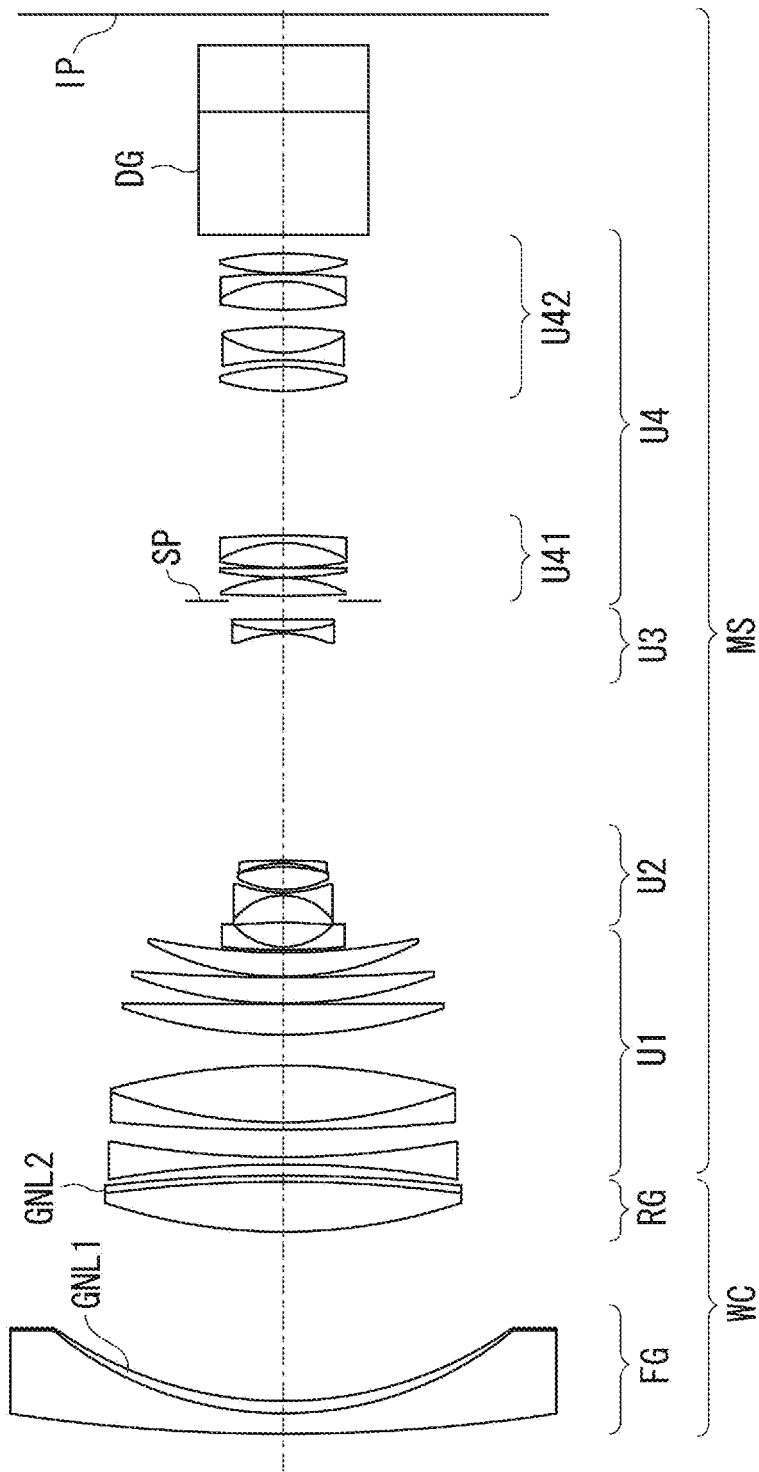
FIG. 34 is a lens cross-sectional diagram illustrating a state where a master lens is mounted on the wide-angle converter lens according to Numerical Example 15.

FIG. 33 is a cross-sectional diagram illustrating a wide-angle converter lens according to a fifteenth exemplary embodiment (Numerical Example 15) of the invention. FIG. 34 is a lens cross-sectional diagram illustrating a state where the wide-angle converter lens according to the fifteenth exemplary embodiment is mounted on the object side of a master lens at a distance of 2.71 mm on the optical axis. FIGS. 35A and 35B are longitudinal aberration diagrams at the zoom position of a wide-angle end and the zoom position of a telephoto end in the state where the wide-angle converter lens according to the fifteenth exemplary embodiment is mounted on the master lens.

In FIG. 33, in the wide-angle converter lens WC constituting a substantially afocal optical system, FG indicates a first negative lens unit (first lens unit) having negative refractive power, and RG indicates a second positive lens unit (second lens unit) having positive refractive power.

Among them, the first negative lens unit FG is configured with a cemented negative lens formed by sequentially cementing an element (optical element) having negative refractive power and having a shape of meniscus of which the convex surface faces the object side and an element (optical element) GNL1 having positive refractive power and having a shape of meniscus of which the convex surface faces the object side. In addition, the second positive lens unit RG is configured with a cemented positive lens formed by sequentially cementing an element having positive refractive power and having a shape of biconvex and an element GNL2 having negative refractive power and having a shape of meniscus of which the convex surface faces the image plane side. In addition, the optical elements GNL1 and GNL2 in the wide-angle converter lens are formed by using an optical material having anomalous dispersion, and the optical material (2) in Table 1 is used for the two optical elements.

In FIG. 34, in the master lens MS of which the variable magnification ratio is 20 and of which the half angle of view $\omega$ in the wide-angle end state is 33.9°, U1 denotes a first lens unit having positive refractive power which is fixed during the zooming. U2 denotes a second lens unit having negative refractive power which is moved in the optical axis direction to contribute to the zooming. U3 denotes a third lens unit having negative refractive power which corrects a change of the image plane according to the zooming. U4 denotes a fourth lens unit having positive refractive power which is fixed during the zooming and includes a first lens subunit (U41) having positive refractive power and a second lens subunit (U42) having positive refractive power which are separated by a large air distance in the fourth lens unit. In addition, SP denotes a stop; DG denotes a glass block representing a color separation prism or an optical filter; and IP denotes an imaging plane. In the imaging lens having a high variable magnification ratio and a wide angle of view, good balance of aberration is achieved over the entire zoom range. Therefore, in the converter lens mounted on the imaging lens, good correction of the aberration thereof is required to be achieved.

Figure 36:
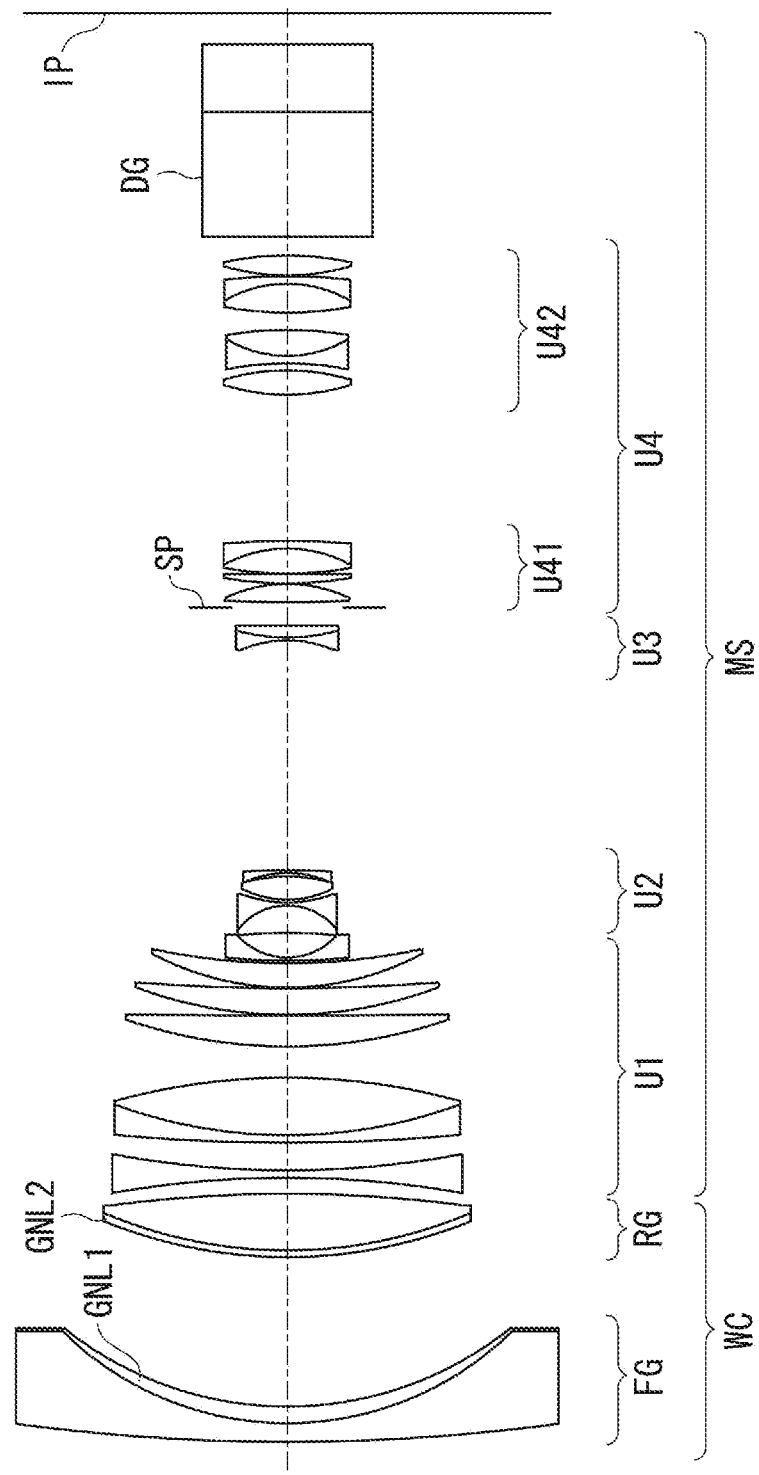
FIG. 36 is a lens cross-sectional diagram illustrating a state where a master lens is mounted on a wide-angle converter lens according to Numerical Example 16.
Figure 37B:
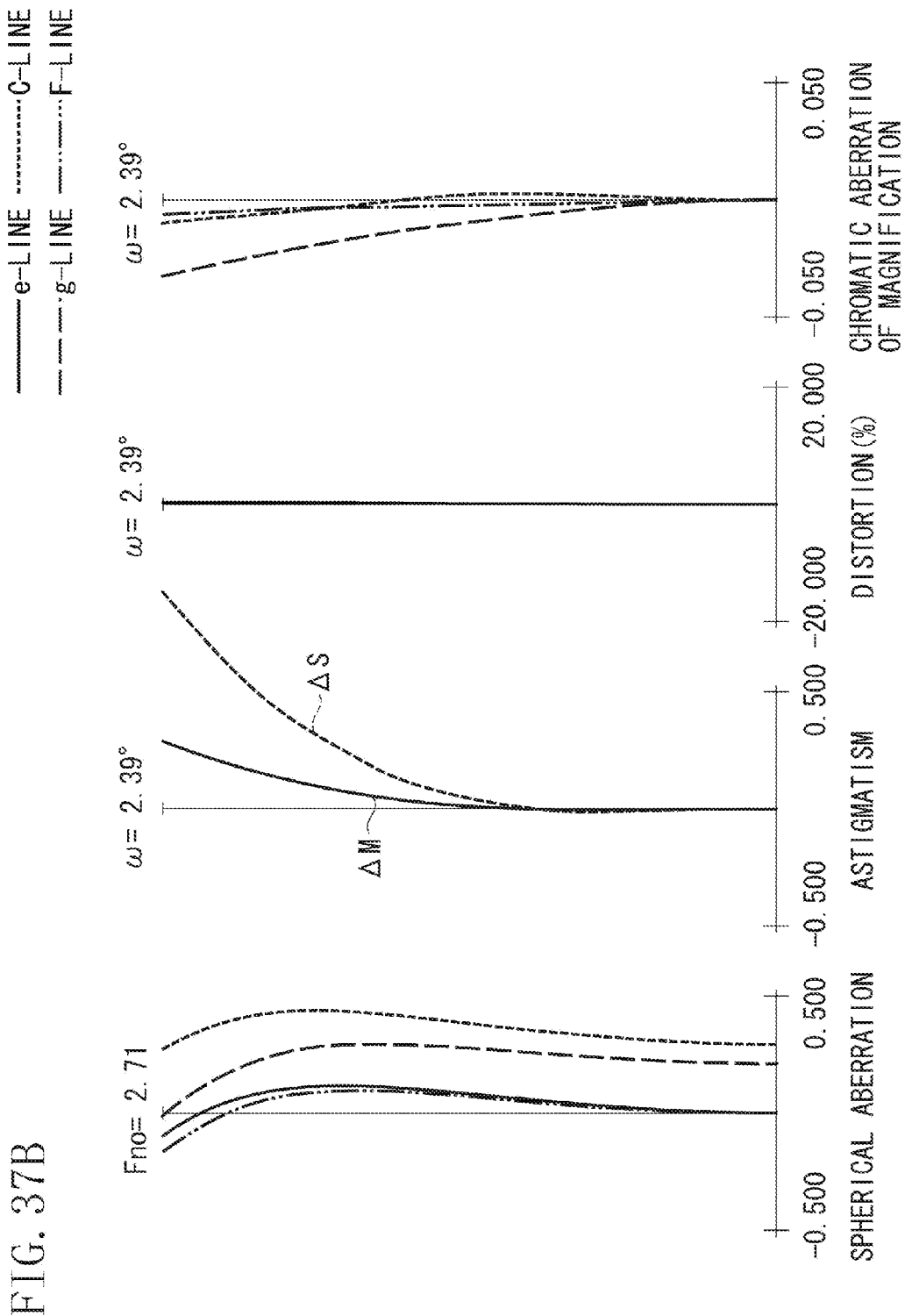
FIG. 37B is a longitudinal aberration diagram for a telephoto end in the state where the master lens is mounted on the wide-angle converter lens according to Numerical Example 16.

FIG. 36 is a lens cross-sectional diagram illustrating a state where a wide-angle converter lens according to the sixteenth exemplary embodiment of the invention is mounted on the object side of a master lens. FIGS. 37A and 37B are longitudinal aberration diagrams at the zoom position of a wide-angle end and the zoom position of a telephoto end in the state where the wide-angle converter lens according to the sixteenth exemplary embodiment is mounted on the master lens at a distance of 2.00 mm on the optical axis.

The sixteenth exemplary embodiment is different from the fifteenth exemplary embodiment in terms of configuration of a second positive lens unit (second lens unit). The second positive lens unit according to the sixteenth exemplary embodiment includes, in order from the object side (enlargement side), an element GNL2 having negative refractive power and having a shape of meniscus of which the convex surface faces the object side and an element having positive refractive power and having a shape of biconvex. In the sixteenth exemplary embodiment, similarly to the fifteenth exemplary embodiment, a cemented positive lens (cemented lens having positive refractive power) is configured by cementing the elements (optical elements).

In any one of the fifteenth and sixteenth exemplary embodiments described above, it is possible to solve the problems of the invention. In other words, an optical element having anomalous dispersion (optical element configured with an optical material having anomalous dispersion) may be disposed to the object side (enlargement side) in the second positive lens unit, or the optical element may be disposed at the image plane side (reduction side).

However, in a case where the optical element GNL2 having anomalous dispersion in the second positive lens unit is configured with, for example, a material such as a resin, a configuration which is advantageous to environmental resistance is obtained by disposing the optical element GNL2 to the object side. In addition, similarly to the fifteenth exemplary embodiment, optical elements GNL1 and GNL2 in the embodiment is formed by using an optical material having anomalous dispersion, and the optical material (2) in Table 1 is used.

Figure 38:
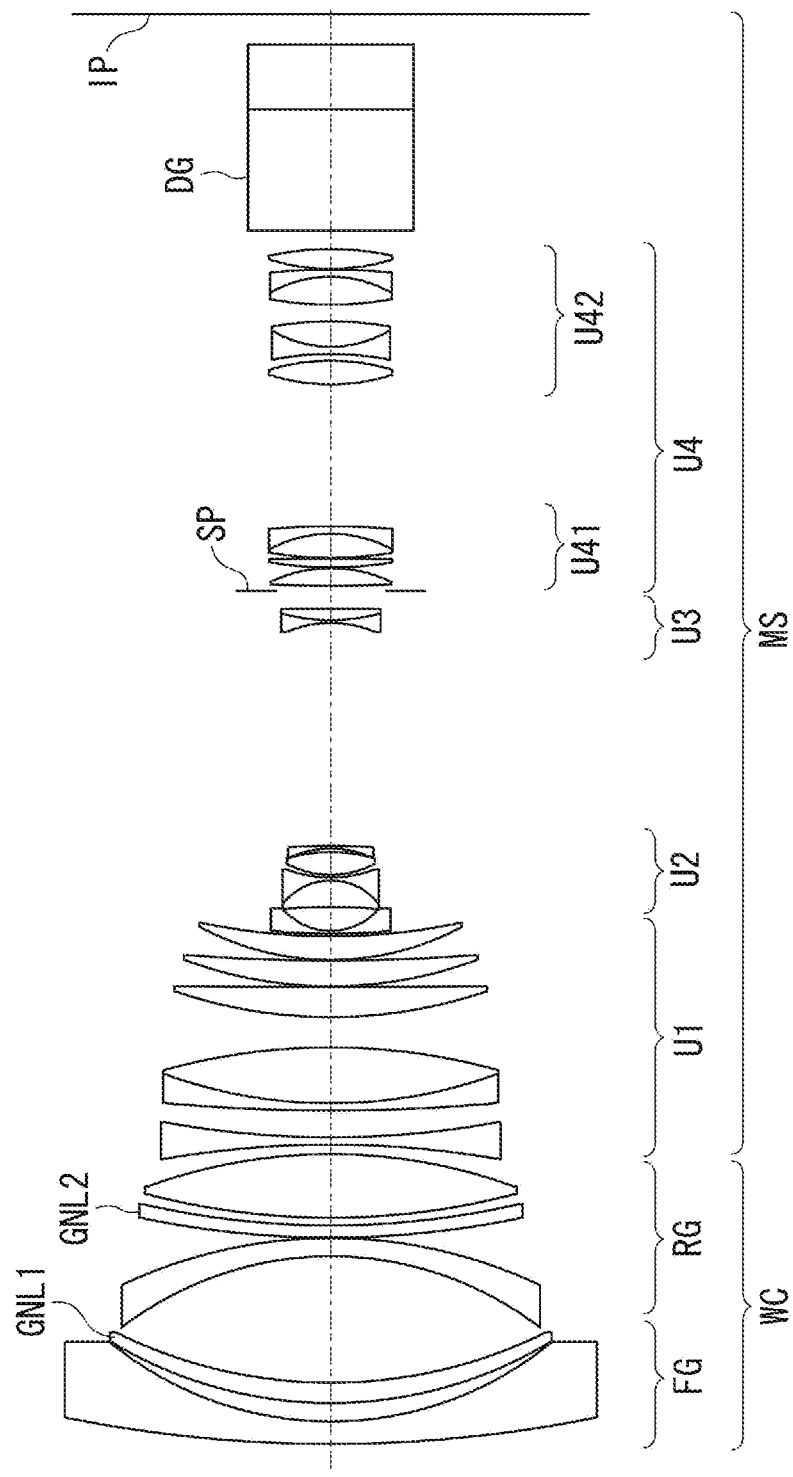
FIG. 38 is a lens cross-sectional diagram illustrating a state where a master lens is mounted on a wide-angle converter lens according to Numerical Example 17.

FIG. 38 is a lens cross-sectional diagram illustrating a state where a wide-angle converter lens according to a seventeenth exemplary embodiment of the invention is mounted on the object side of a master lens at a distance of 2.34 mm on the optical axis. FIGS. 39A and 39B are longitudinal aberration diagrams at the zoom position of a wide-angle end and the zoom position of a telephoto end in the state where the wide-angle converter lens according to the seventeenth exemplary embodiment is mounted on the master lens.

In FIG. 38, in the wide-angle converter lens WC constituting a substantially afocal optical system, FG indicates a first negative lens unit having negative refractive power, and RG indicates a second positive lens unit having positive refractive power.

Among them, the first negative lens unit FG is configured by sequentially disposing an element having negative refractive power and having a shape of meniscus of which the convex surface faces the object side and an element GNL1 having positive refractive power and having a shape of meniscus of which the convex surface faces the object side. In addition, the second positive lens unit RG is configured by sequentially disposing an element having negative refractive power and having a shape of meniscus of which the convex surface faces the image plane side and an element GNL2 having negative refractive power and having a shape of meniscus of which the convex surface faces the object side, and an element having a shape of biconvex. In addition, optical elements GNL1 and GNL2 in the embodiment are formed by using an optical material having anomalous dispersion, and the optical material (2) in Table 1 is used.

In the exemplary embodiment, the element having negative refractive power is disposed on the object side of the second positive lens unit, so that it is possible to divide the refractive power of the element having negative refractive power disposed at the closest-to-object side. Therefore, the curvature of the element having negative refractive power disposed at the closest-to-object side can be loosened, so that it is possible to advantageously correct (reduce) off-axis aberration. In addition, in the exemplary embodiment, the element GNL having anomalous dispersion is disposed as a single-element lens, it is possible to obtain the effect of correction of the chromatic aberration similarly to the case where a cemented lens is used.

Figure 40:
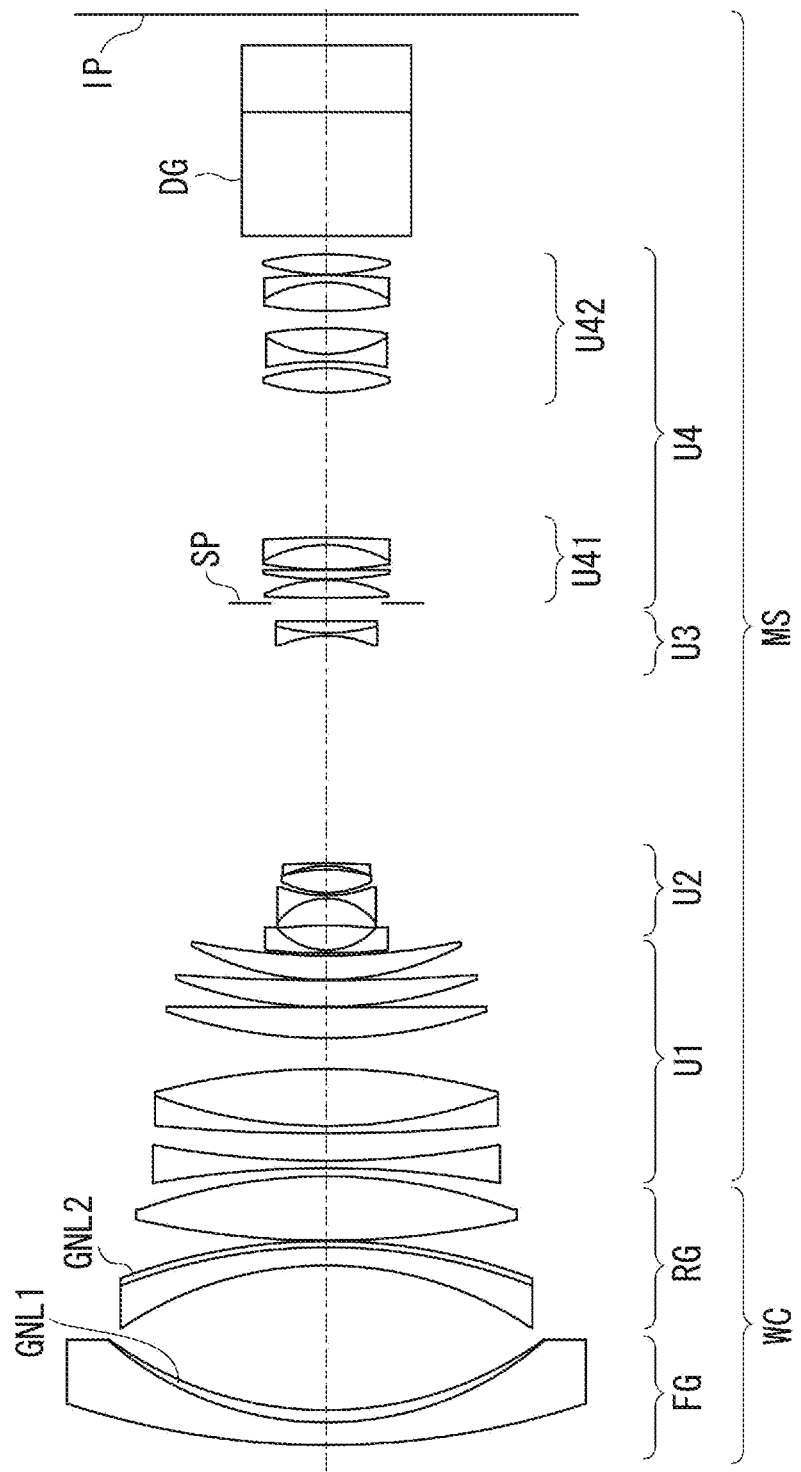
FIG. 40 is a lens cross-sectional diagram illustrating a state where a master lens is mounted on a wide-angle converter lens according to Numerical Example 18.
Figure 41B:
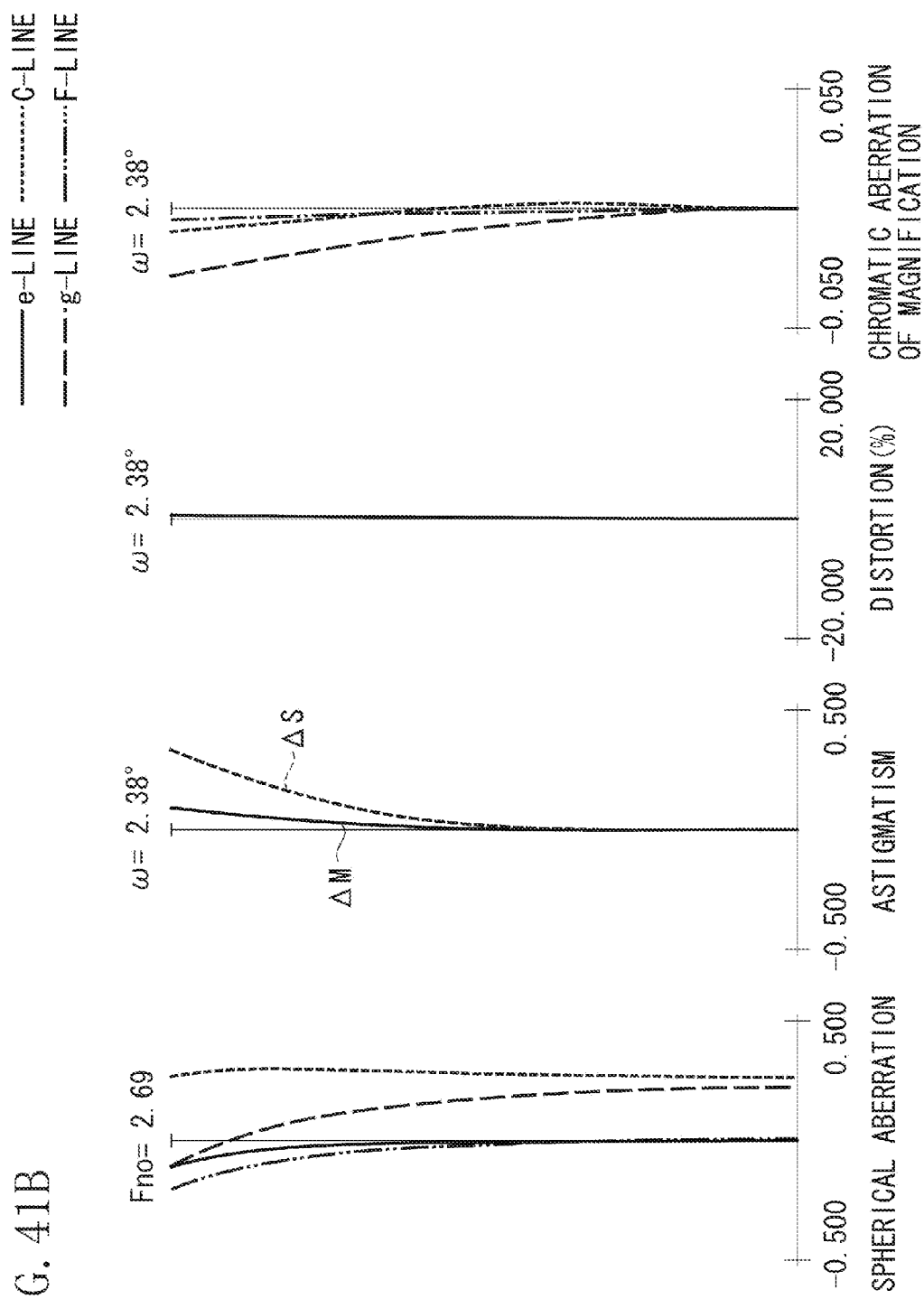
FIG. 41B is a longitudinal aberration diagram for a telephoto end in the state where the master lens is mounted on the wide-angle converter lens according to Numerical Example 18.

FIG. 40 is a lens cross-sectional diagram illustrating a state where a wide-angle converter lens according to an eighteenth exemplary embodiment of the invention is mounted on the object side of a master lens at a distance of 2.00 mm on the optical axis. FIGS. 41A and 41B are longitudinal aberration diagrams at the zoom position of a wide-angle end and the zoom position of a telephoto end in the state where the wide-angle converter lens according to the eighteenth exemplary embodiment is mounted on the master lens.

The eighteenth exemplary embodiment has a feature where, with respect to a lens configuration similar to that of the seventeenth exemplary embodiment, the element GNL2 having anomalous dispersion in the RG is configured as a cemented element which is cemented to the element having negative refractive power disposed at the closest-to-object side.

Figure 42:
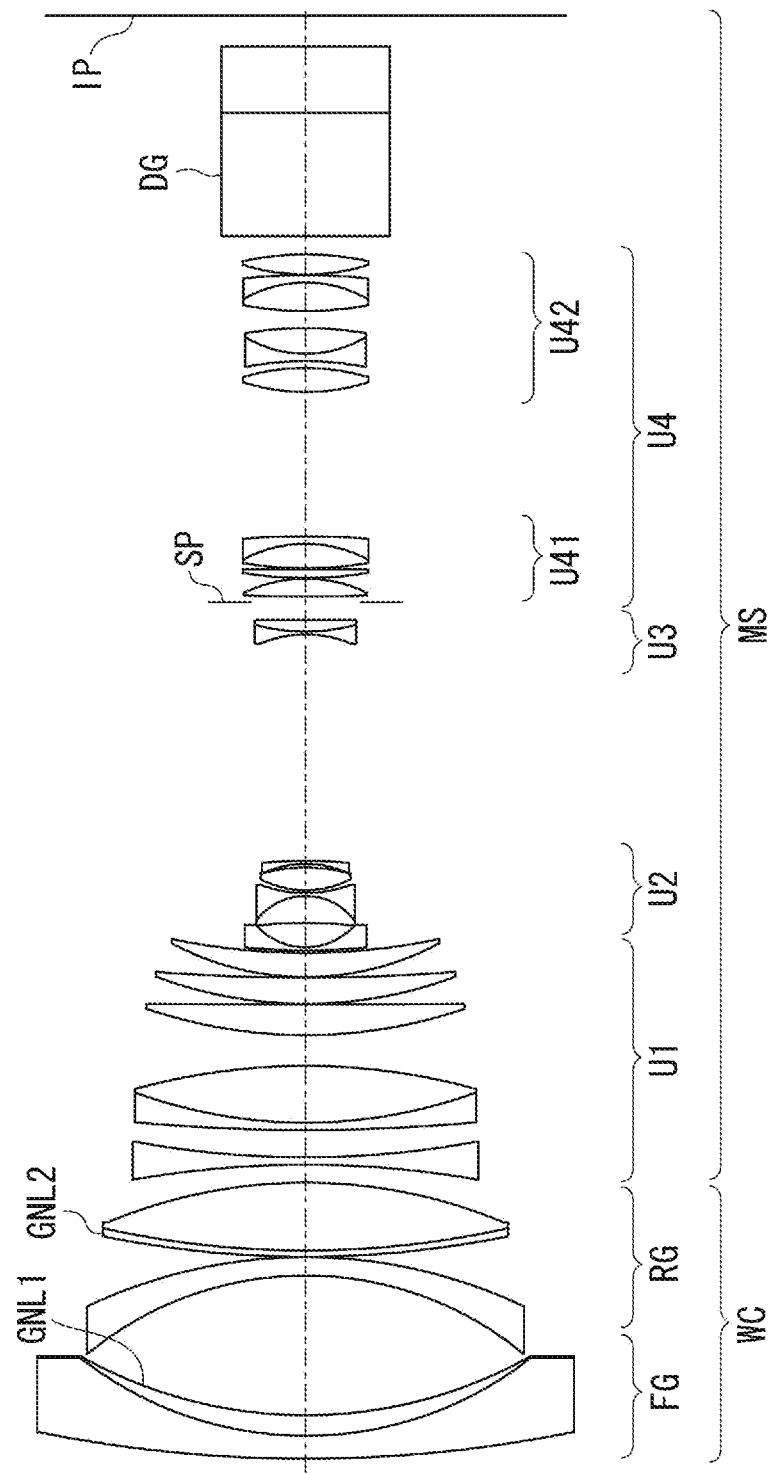
FIG. 42 is a lens cross-sectional diagram illustrating a state where a master lens is mounted on a wide-angle converter lens according to Numerical Example 19.
Figure 43A:
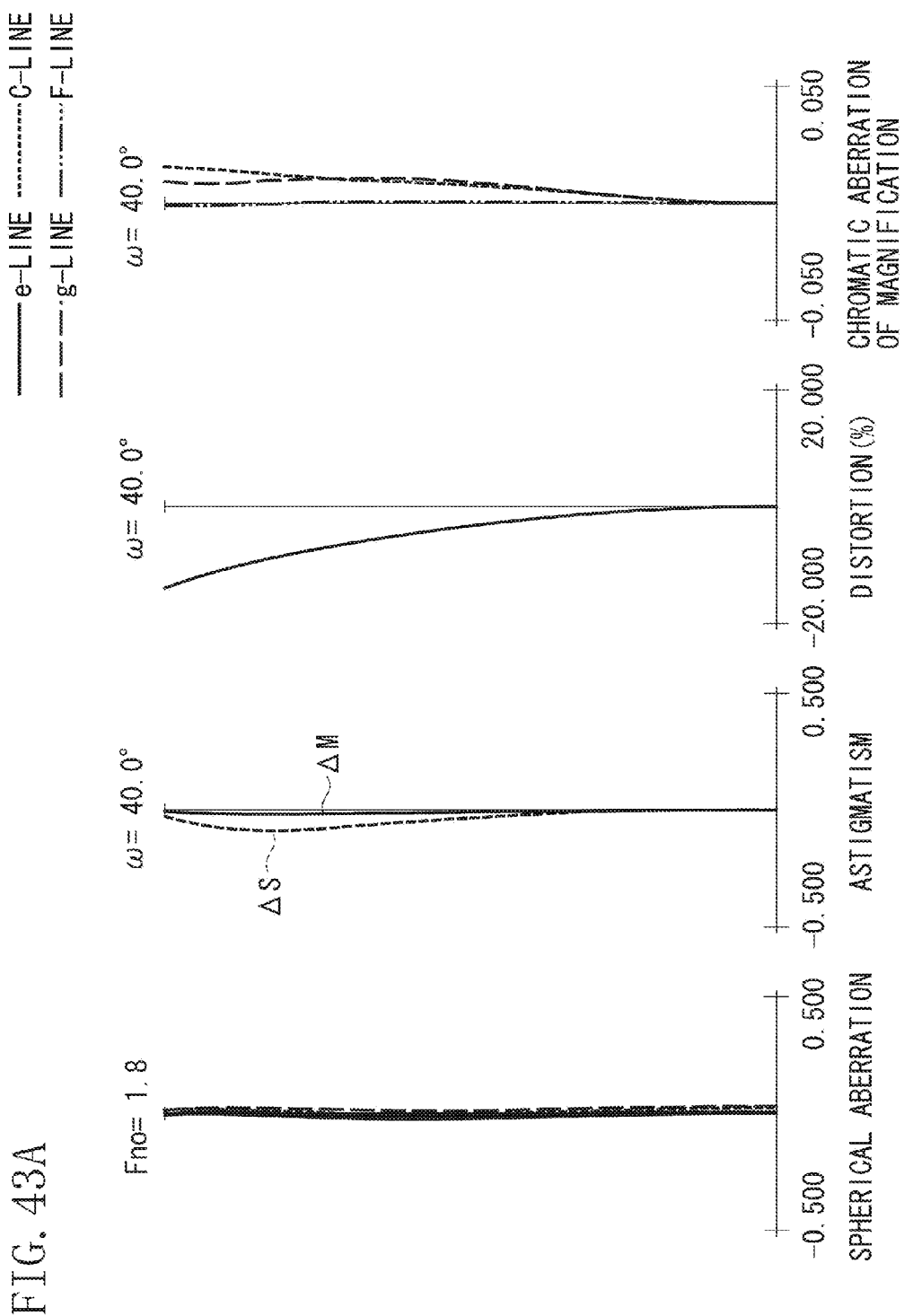
FIG. 43A is a longitudinal aberration diagram for a wide-angle end in the state where the master lens is mounted on the wide-angle converter lens according to Numerical Example 19.

FIG. 42 is a lens cross-sectional diagram illustrating a state where a wide-angle converter lens according to a nineteenth exemplary embodiment of the invention is mounted on the object side of a master lens at a distance of 4.37 mm on the optical axis. FIGS. 43A and 43B are longitudinal aberration diagrams at the zoom position of a wide-angle end and the zoom position of a telephoto end in the state where the wide-angle converter lens according to the nineteenth exemplary embodiment is mounted on the master lens.

The nineteenth exemplary embodiment has a feature where, with respect to a lens configuration similar to those of the seventeenth and eighteenth exemplary embodiments, an optical material (1) in Table 1 is used for elements GNL1 and GNL2 having anomalous dispersion. Since the optical material (1) has a very high relative partial dispersion $\theta gF$ of 0.69, the achromatism effects defined by the conditions (18), (19), and (22) can be further strengthened.

Figure 44:
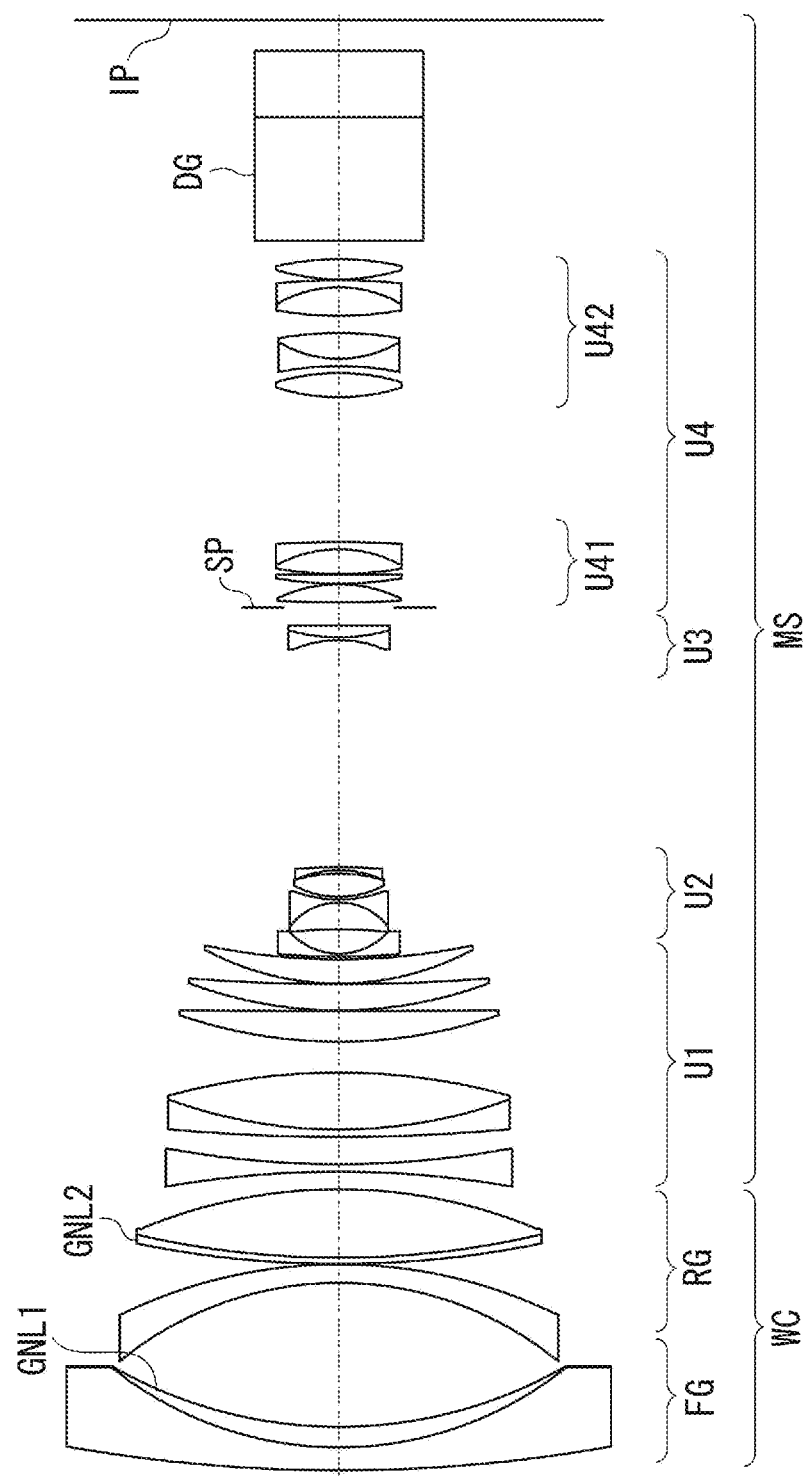
FIG. 44 is a lens cross-sectional diagram illustrating a state where a master lens is mounted on a wide-angle converter lens according to Numerical Example 20.
Figure 45A:
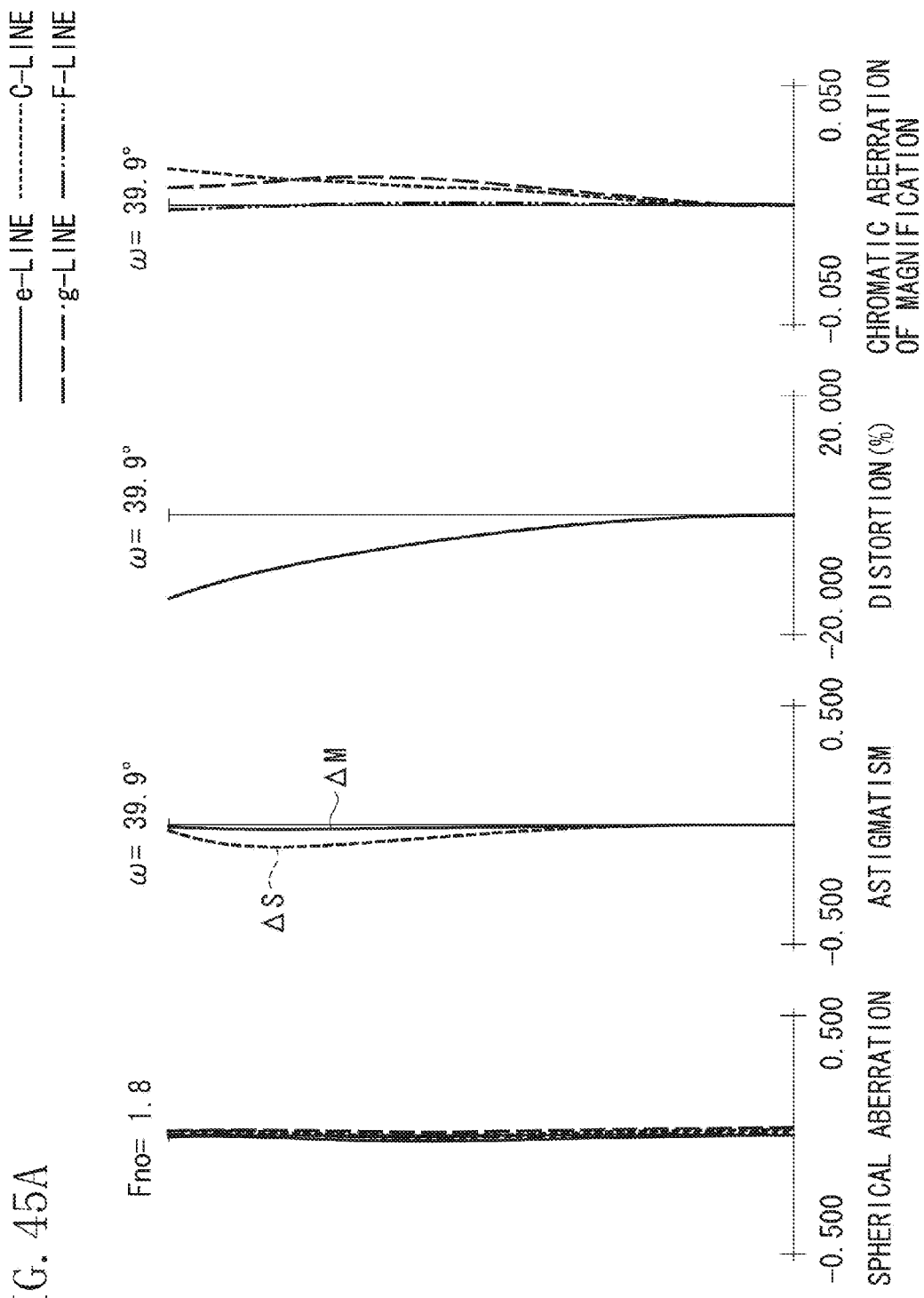
FIG. 45A is a longitudinal aberration diagram for a wide-angle end in the state where the master lens is mounted on the wide-angle converter lens according to Numerical Example 20.

FIG. 44 is a lens cross-sectional diagram illustrating a state where a wide-angle converter lens according to a twentieth exemplary embodiment of the invention is mounted on the object side of a master lens at a distance of 4.28 mm on the optical axis. FIGS. 45A and 45B are longitudinal aberration diagrams at the zoom position of a wide-angle end and the zoom position of a telephoto end in the state where the wide-angle converter lens according to the twentieth exemplary embodiment is mounted on the master lens.

The twentieth exemplary embodiment has a feature where, with respect to a lens configuration similar to those of the seventeenth to nineteenth exemplary embodiments, an optical material (6) in Table 1 is used for elements GNL1 and GNL2 having anomalous dispersion. Since the optical material (6) has a high relative partial dispersion $\theta gF$ of 0.63, good correction of chromatic aberration is achieved.

Figure 46:
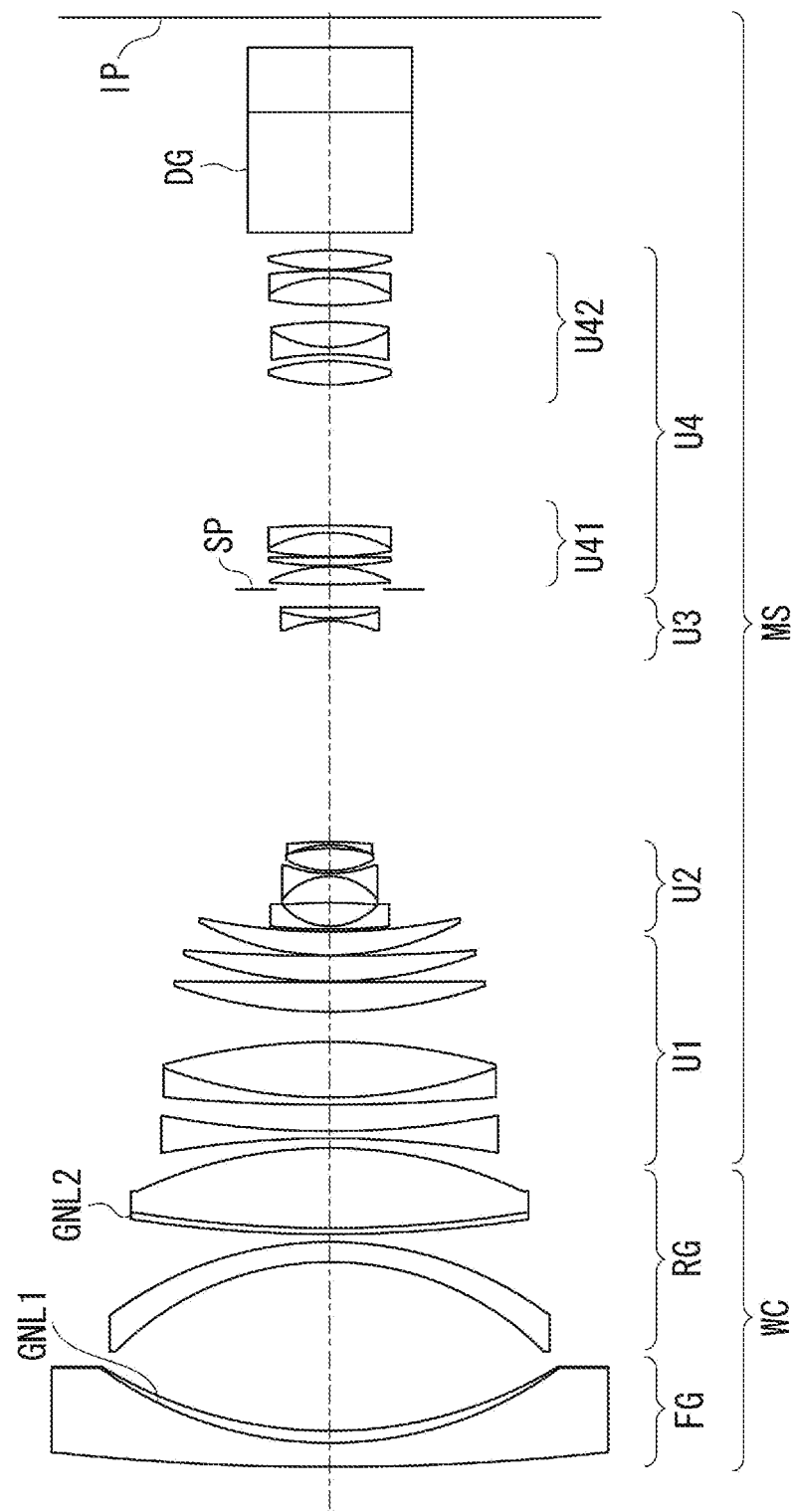
FIG. 46 is a lens cross-sectional diagram illustrating a state where a master lens is mounted on a wide-angle converter lens according to Numerical Example 21.
Figure 47B:
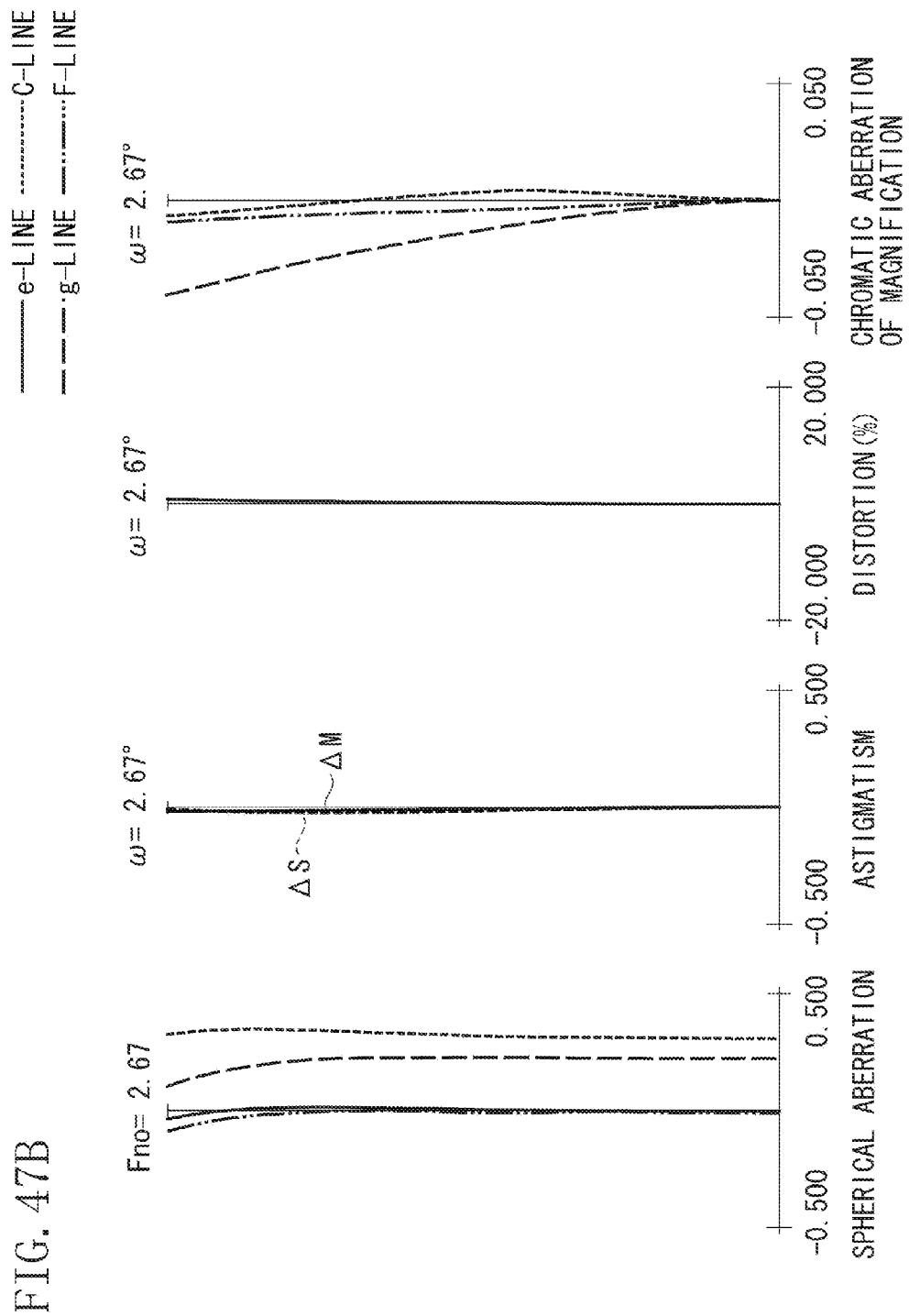
FIG. 47B is a longitudinal aberration diagram for a telephoto end in the state where the master lens is mounted on the wide-angle converter lens according to Numerical Example 21.

FIG. 46 is a lens cross-sectional diagram illustrating a state where a wide-angle converter lens according to a twenty-first exemplary embodiment of the invention is mounted on the object side of a master lens at a distance of 2.41 mm on the optical axis. FIGS. 47A and 47B are longitudinal aberration diagrams at the zoom position of a wide-angle end and the zoom position of a telephoto end in the state where the wide-angle converter lens according to the twenty-first exemplary embodiment is mounted on the master lens.

The twenty-first exemplary embodiment has a feature where, with respect to a lens configuration similar to those of the seventeenth to twentieth exemplary embodiments, an afocal magnification ratio is 0.72, and the focal length can be further reduced. In addition, optical elements GNL1 and GNL2 in the present exemplary embodiment are configured with an optical material (2) having anomalous dispersion.

In the exemplary embodiments of the invention, by increasing the number of constituent lenses, much better correction of aberration can be achieved, and the focal length conversion magnification ratio can be reduced. In addition, in each embodiment, the same optical material is used for the optical element having anomalous dispersion, but the invention is not limited thereto. The material of the optical element GNL1 having anomalous dispersion in the first negative lens unit (first lens unit) may be different from the material of the optical element GNL2 having anomalous dispersion in the second positive lens unit (second lens unit). If the materials of the optical elements GNL1 and GNL2 are the optical materials used in the fifteenth to twenty-first exemplary embodiments, that is, any one of the optical materials (1), (2), and (6), the two materials may be the same or different. In the present exemplary embodiment, if the material of the optical element GNL1 having anomalous dispersion in the first negative lens unit and the material of optical element GNL2 having anomalous dispersion in the second positive lens unit satisfy the conditions (14) and (15), the materials may be different from the optical materials (1), (2), and (6).

Hereinafter, numerical data of the wide-angle converter lens WC of each of the exemplary embodiments are listed. In the data, r denotes a radius of curvature of each lens surface; d denotes an intersurface distance between lens surfaces; nd denotes a refractive index of each lens with respect to d-line; and vd denotes Abbe number of each lens. In addition, all units of r, d, L, and EA are mm.

| Surface Number | r | d | nd | vd |
|---|---|---|---|---|
| (Numerical Example 15) | | | | |
| 1 | 450.102 | 5.01 | 1.79952 | 42.2 |
| 2 | 87.743 | 3.02 | 1.94087 | 17.4 |
| 3 | 96.370 | 41.22 | | |
| 4 | 136.873 | 12.18 | 1.52249 | 59.8 |
| 5 | −334.162 | 1.50 | 1.94087 | 17.4 |
| 6 | −381.808 | | | |

Total Length L = 62.9, Effective Diameter of First Surface of First Lens EA = 128.8

| (Numerical Example 16) | | | | |
|---|---|---|---|---|
| 1 | 499.510 | 4.49 | 1.74400 | 44.8 |
| 2 | 78.152 | 4.00 | 1.94087 | 17.4 |
| 3 | 87.005 | 35.98 | | |
| 4 | 118.888 | 1.60 | 1.94087 | 17.4 |
| 5 | 114.000 | 13.63 | 1.48749 | 70.2 |
| 6 | −326.450 | | | |

Total Length L = 59.7, Effective Diameter of First Surface of First Lens EA = 127.4

| (Numerical Example 17) | | | | |
|---|---|---|---|---|
| 1 | 339.322 | 5.58 | 1.78800 | 47.4 |
| 2 | 87.344 | 4.56 | | |
| 3 | 107.009 | 5.00 | 1.94087 | 17.4 |
| 4 | 121.900 | 31.37 | | |
| 5 | −86.073 | 4.50 | 1.51823 | 58.9 |
| 6 | −123.131 | 0.13 | | |
| 7 | 232.974 | 3.00 | 1.94087 | 17.4 |
| 8 | 212.000 | 1.91 | | |
| 9 | 183.766 | 15.76 | 1.48749 | 70.2 |
| 10 | −134.348 | | | |

Total Length L = 71.8, Effective Diameter of First Surface of First Lens EA = 128.9

| (Numerical Example 18) | | | | |
|---|---|---|---|---|
| 1 | 204.225 | 5.49 | 1.78800 | 47.4 |
| 2 | 81.123 | 3.00 | 1.94087 | 17.4 |
| 3 | 90.579 | 35.13 | | |
| 4 | −89.961 | 4.41 | 1.59551 | 39.2 |
| 5 | −140.010 | 1.50 | 1.94087 | 17.4 |
| 6 | −144.389 | 0.16 | | |
| 7 | 215.427 | 15.55 | 1.48749 | 70.2 |
| 8 | −133.016 | | | |

Total Length L = 65.2, Effective Diameter of First Surface of First Lens EA = 122.6

| (Numerical Example 19) | | | | |
|---|---|---|---|---|
| 1 | 334.603 | 5.58 | 1.78800 | 47.4 |
| 2 | 89.789 | 5.00 | 1.63555 | 22.7 |
| 3 | 112.941 | 34.07 | | |
| 4 | −84.233 | 4.50 | 1.51742 | 52.4 |
| 5 | −124.860 | 0.10 | | |
| 6 | 249.682 | 1.50 | 1.63555 | 22.7 |
| 7 | 229.152 | 16.55 | 1.48749 | 70.2 |
| 8 | −126.455 | | | |

Total Length L = 67.3, Effective Diameter of First Surface of First Lens EA = 127.7

| (Numerical Example 20) | | | | |
|---|---|---|---|---|
| 1 | 387.086 | 5.58 | 1.78800 | 47.4 |
| 2 | 89.378 | 5.00 | 1.80809 | 22.8 |
| 3 | 112.292 | 35.04 | | |
| 4 | −84.820 | 4.50 | 1.51742 | 52.4 |
| 5 | −123.145 | 0.10 | | |
| 6 | 250.257 | 1.50 | 1.80809 | 22.8 |
| 7 | 220.625 | 16.65 | 1.48749 | 70.2 |
| 8 | −126.946 | | | |

Total Length L = 68.4, Effective Diameter of First Surface of First Lens EA = 129.3

| (Numerical Example 21) | | | | |
|---|---|---|---|---|
| 1 | 668.962 | 6.00 | 1.81600 | 46.6 |
| 2 | 98.420 | 3.00 | 1.94087 | 17.4 |
| 3 | 110.889 | 42.20 | | |
| 4 | −76.048 | 5.00 | 1.72000 | 43.7 |
| 5 | −92.892 | 2.00 | | |
| 6 | 339.488 | 1.50 | 1.94087 | 17.4 |
| 7 | 313.833 | 20.00 | 1.48749 | 70.2 |
| 8 | −113.966 | | | |

Total Length L = 79.7, Effective Diameter of First Surface of First Lens EA = 136.1

The results of calculation of the conditions (14-1), (14-2), (15-1), (15-2), (16) to (20), and (22) with respect to the aforementioned fifteenth to twenty-first exemplary embodiments (Numerical Examples 15 to 21) are listed in Table 4.

TABLE 4

| | Numerical Example | | | | | | |
|---|---|---|---|---|---|---|---|
| Condition | 15 | 16 | 17 | 18 | 19 | 20 | 21 |
| (14-1), (14-2) | 0.04084 | 0.04084 | 0.04084 | 0.04084 | 0.06032 | 0.00248 | 0.04084 |
| (15-1), (15-2) | 17.4 | 17.4 | 17.4 | 17.4 | 22.7 | 22.8 | 17.4 |
| (16) | 0.07 | 0.05 | 0.09 | 0.05 | 0.06 | 0.11 | 0.05 |
| (17) | 2.05 | 2.14 | 1.79 | 1.88 | 1.90 | 1.89 | 1.71 |
| (18) | 3.26 | 5.24 | 3.34 | 8.47 | 7.23 | 4.77 | 5.55 |
| (19) | 0.0044 | 0.0041 | 0.0041 | 0.0410 | 0.0054 | 0.0030 | 0.0041 |
| (20) | 0.0031 | 0.0028 | 0.0025 | 0.0024 | 0.0028 | 0.0019 | 0.0024 |
| (22) | 0.79 | 0.80 | 0.77 | 0.81 | 0.80 | 0.80 | 0.72 |

According to the exemplary embodiments of the invention described above, it is possible to provide a wide-angle converter lens capable of maintaining good balance of chromatic aberration of magnification at a wide-angle end and maintaining good balance of axial chromatic aberration over the entire zoom range when the wide-angle converter lens is mounted on an imaging lens.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2011-172970 filed Aug. 8, 2011, No. 2011-172971 filed Aug. 8, 2011, and No. 2011-172972 filed Aug. 8, 2011, which are hereby incorporated by reference herein in their entirety.

What is claimed is:

1. A wide-angle converter lens capable of being detachably mounted on an enlargement side of an imaging lens, the wide-angle converter lens comprising:
    a first optical element;
    at least one optical element having negative refractive power; and
    at least one optical element having positive refractive power,
    wherein, when an average value of relative partial dispersions of the first optical element and all optical elements of which the sign of refractive power is the same as that of the first optical element is denoted by θgF_ave, a relative partial dispersion of the first optical element is denoted by θgF1, and an Abbe number of the first optical element is denoted by vd1, the following conditions are satisfied:

$\theta gF\_ave > 0.58$ $\theta gF1 - (2.35 \times 10^{-3} \times vvd1^2 - 4.11 \times 10^{-3} \times vvd1 + 0.7204) > 0$ $vd1 < 30.$ 2. The wide-angle converter lens according to claim 1,
    wherein the first optical element has negative refractive power, and
    wherein, when a radius of curvature of an enlargement-side surface of the first optical element is denoted by r1, and a radius of curvature of a reduction-side surface of the first optical element is denoted by r2, the following condition is satisfied:

$10 < ABS[(r1+r2)/(r1-r2)]$ where ABS[ ] is the absolute value of the expression in [ ].

3. The wide-angle converter lens according to claim 1,
    wherein the first optical element has positive refractive power, and
    wherein, when refractive power of the first optical element is denoted by φp_max, and refractive power of an optical element of which the absolute value of the refractive power is greatest among the at least one optical element having negative refractive power is denoted by φn, the following condition is satisfied:

$7 < ABS[\phi n/\phi p\_max] < 16$ where ABS[ ] is the absolute value of the expression in [ ].

4. The wide-angle converter lens according to claim 1,
    wherein the wide-angle converter lens comprises a first lens unit and a second lens unit which are separated by the largest air distance in the wide-angle converter lens, the first lens unit having negative refractive power and being disposed at an enlargement side of the air distance, and the second lens unit having positive refractive power and being disposed at a reduction side of the air distance,
    wherein the first lens unit includes the first optical element having positive refractive power,
    wherein the second lens unit includes the second optical element having negative refractive power, and
    wherein, when a relative partial dispersion and Abbe number of the first optical element are denoted by θgF1 and vd1, respectively, a relative partial dispersion, an Abbe number, and refractive power of the second optical element are denoted by θgF2, vd2, and $\phi_{GNL2}$, respectively, and refractive power of the second lens unit is denoted by $\phi_2$, the following conditions are satisfied:

$\theta gF1 - (2.35 \times 10^{-5} \times vd1^2 - 4.11 \times 10^{-3} \times vd1 + 0.7204) > 0$ $vd1 < 30$ $\theta gF2 - (2.35 \times 10^{-5} \times vd2^2 - 4.11 \times 10^{-3} \times vd2 + 0.7204) > 0$ $vd2 < 30$ $0.02 < |\phi_{GNL2}/\phi_2| < 0.2.$ 5. The wide-angle converter lens according to claim 4, wherein, when the refractive power of the first optical element is denoted by $\phi_{GNL1}$, the following condition is satisfied:

$2 < |\phi_{GNL1}/\phi_{GNL2}| < 10.$

6. The wide-angle converter lens according to claim 1, wherein a focal length conversion magnification ratio β of the wide-angle converter lens satisfies the following condition:

$0.7 < \beta < 0.92.$

7. The wide-angle converter lens according to claim 1,
    wherein the wide-angle converter lens comprises a first lens unit and a second lens unit which are separated by the largest air distance in the wide-angle converter lens, the first lens unit having negative refractive power and being disposed at an enlargement side of the air distance, and the second lens unit having positive refractive power and being disposed at a reduction side of the air distance, and
    wherein the first optical element is disposed at the most reduction side of the first lens unit, and the first optical element is cemented to an adjacent optical element.

8. The wide-angle converter lens according to claim 1,
    wherein the wide-angle converter lens comprises a first lens unit and a second lens unit which are separated by the largest air distance in the wide-angle converter lens, the first lens unit having negative refractive power and being disposed at an enlargement side of the air distance, and the second lens unit having positive refractive power and being disposed at a reduction side of the air distance, and
    wherein the first optical element is disposed at the most enlargement side of the second lens unit, and the first optical element is cemented to an adjacent optical element.

9. The wide-angle converter lens according to claim 1,
    wherein the wide-angle converter lens comprises a first lens unit and a second lens unit which are separated by the largest air distance in the wide-angle converter lens, the first lens unit having negative refractive power and being disposed at an enlargement side of the air distance, and the second lens unit having positive refractive power and being disposed at a reduction side of the air distance, and wherein the first lens unit includes a meniscus lens having negative refractive power which is convex toward the enlargement side and the first optical element, and the first optical element is a meniscus lens which is convex toward the enlargement side.

10. The wide-angle converter lens according to claim 1, wherein the wide-angle converter lens comprises a first lens unit and a second lens unit which are separated by the largest air distance in the wide-angle converter lens, the first lens unit having negative refractive power and being disposed at an enlargement side of the air distance, and the second lens unit having positive refractive power and being disposed at a reduction side of the air distance, and wherein the second lens unit includes an optical element having positive refractive power and having a shape of biconvex and the first optical element, and the optical element having a shape of biconvex is cemented to the first optical element.

11. The wide-angle converter lens according to claim 1, wherein the wide-angle converter lens comprises a first lens unit and a second lens unit which are separated by the largest air distance in the wide-angle converter lens, the first lens unit having negative refractive power and being disposed at an enlargement side of the air distance, and the second lens unit having positive refractive power and being disposed at a reduction side of the air distance, wherein the second lens unit is configured with a single-element lens having positive refractive power, and wherein the first lens unit includes the first optical element and an optical element having negative refractive power which is cemented to the first optical element.

12. The wide-angle converter lens according to claim 4, wherein, when a distance on an optical axis from a surface at a side closest to an object to a surface at a side closest to an image plane in the wide-angle converter lens is denoted by L, and an effective diameter of the surface at the side closest to the object is denoted by EA, the following condition is satisfied:

$1.65 < EA/L < 2.25$.

13. The wide-angle converter lens according to claim 4, wherein an average value of relative partial dispersions and an average value of Abbe numbers of all optical elements having positive refractive power in the first lens unit are denoted by $\theta_{fp}$ and $\nu_{fp}$, respectively, an average value of relative partial dispersions and an average value of Abbe numbers of all optical elements having negative refractive power in the first lens unit are denoted by $\theta_{fn}$ and $\nu_{fn}$, respectively, an average value of relative partial dispersions and an average value of Abbe numbers of all optical elements having positive refractive power in the second lens unit are denoted by $\theta_{rp}$ and $\nu_{rp}$, respectively, and an average value of relative partial dispersions and an average value of Abbe numbers of all optical elements having negative refractive power in the second lens unit are denoted by $\theta_{rn}$ and $\nu_{rn}$, respectively, the following conditions are satisfied:

$2.8 \times 10^{-3} < (\theta_{fn} - \theta_{fp})/(\nu_{fp} - \nu_{fn}) < 6.0 \times 10^{-3}$ $1.8 \times 10^{-3} < (\theta_{rn} - \theta_{rp})/(\nu_{rp} - \nu_{rn}) < 3.5 \times 10^{-3}$.

14. The wide-angle converter lens according to claim 4, wherein, when a focal length conversion magnification ratio of the wide-angle converter lens is denoted by $\beta$, the following condition is satisfied:

$0.7 < \beta < 0.9$.

15. The wide-angle converter lens according to claim 4, wherein the first optical element has a shape of meniscus which is convex toward the enlargement side, and the second optical element has a shape of meniscus which is convex toward the reduction side.

16. The wide-angle converter lens according to claim 4, wherein the first optical element has a shape of meniscus which is convex toward the enlargement side, and the second optical element has a shape of meniscus which is convex toward the enlargement side.

17. The wide-angle converter lens according to claim 4, wherein the first optical element is cemented to a reduction-side surface of an optical element disposed at the most enlargement side of the wide-angle converter lens.

18. The wide-angle converter lens according to claim 4, wherein the second optical element is cemented to a biconvex lens disposed in the second lens unit.

* * * * *